(12) United States Patent
Jia et al.

(10) Patent No.: US 11,431,462 B2
(45) Date of Patent: Aug. 30, 2022

(54) INDICATION METHOD, NETWORK DEVICE, AND USER EQUIPMENT

(71) Applicant: Huawei Technologies Co., Ltd., Shenzhen (CN)

(72) Inventors: Qiong Jia, Shanghai (CN); Jun Zhu, Shenzhen (CN); Ji Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/990,712

(22) Filed: Aug. 11, 2020

(65) Prior Publication Data
US 2020/0389277 A1    Dec. 10, 2020

Related U.S. Application Data

(63) Continuation of application No. PCT/CN2018/121983, filed on Dec. 19, 2018.

(30) Foreign Application Priority Data

Feb. 12, 2018  (CN) .......................... 201810146866.1

(51) Int. Cl.
*H04L 5/00* (2006.01)
*H04W 72/04* (2009.01)
*H04W 72/08* (2009.01)

(52) U.S. Cl.
CPC ....... *H04L 5/0055* (2013.01); *H04W 72/0413* (2013.01); *H04W 72/082* (2013.01)

(58) Field of Classification Search
None
See application file for complete search history.

(56) References Cited

U.S. PATENT DOCUMENTS 10,064,168 B2 * 8/2018 Yang ..................... H04L 5/0032
2012/0076017 A1   3/2012 Luo et al.
(Continued)

FOREIGN PATENT DOCUMENTS

CN    101720533 A    6/2010
CN    101981999 A    2/2011
(Continued)

OTHER PUBLICATIONS

"HARQ Management and Feedback," 3GPP TSG RAN WG1 Meeting NR#3, Nagoya, Japan, R1-1716005, pp. 1-10, 3rd Generation Partnership Project, Valbonne, France (Sep. 18-21, 2017).
(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

This application provides an indication method, a network device, and user equipment. The network device explicitly or implicitly indicates, by using indication information (including but not limited to a bitmap, information indicating a quantity Wt, and information indicating an index) carried on one or more downlink transmission units, a reception response for one or more downlink transmission unit sets that needs to be received by the network device, that is, a reception response for one or more downlink transmission unit sets that needs to be sent by the UE to the network device, so that the UE can correctly send, on a correct uplink transmission unit, the reception response that is for the downlink transmission unit sets and that the network device indicates the UE to send. In this way, errors and unnecessary retransmission are reduced, quality of service is ensured, and communication efficiency is improved.

23 Claims, 27 Drawing Sheets

(56) References Cited

U.S. PATENT DOCUMENTS

| | | | |
|---|---|---|---|
| 2013/0039197 A1 | 2/2013 | Pan et al. | |
| 2014/0050176 A1* | 2/2014 | Lin | H04L 1/1861 370/329 |
| 2015/0117271 A1* | 4/2015 | Liang | H04L 5/001 370/280 |
| 2015/0117272 A1* | 4/2015 | Gao | H04L 1/1861 370/280 |
| 2017/0041123 A1* | 2/2017 | Yang | H04L 5/14 |
| 2018/0054280 A1* | 2/2018 | Fu | H04W 72/0446 |
| 2018/0323907 A1* | 11/2018 | Takeda | H04L 1/1812 |
| 2020/0280969 A1* | 9/2020 | Liu | H04W 76/27 |
| 2020/0328849 A1* | 10/2020 | Noh | H04W 72/0413 |
| 2020/0344012 A1* | 10/2020 | Karaki | H04L 1/1854 |
| 2021/0029731 A1* | 1/2021 | Kundu | H04L 5/0053 |

FOREIGN PATENT DOCUMENTS

| | | |
|---|---|---|
| CN | 102082625 A | 6/2011 |
| CN | 102136894 A | 7/2011 |
| CN | 102377541 A | 3/2012 |
| CN | 102647261 A | 8/2012 |
| CN | 102823180 A | 12/2012 |
| CN | 103580824 A | 2/2014 |
| CN | 110166179 A | 8/2019 |
| CN | 110166183 A | 8/2019 |
| CN | 111492707 A | 8/2020 |
| JP | 2013527647 A | 6/2013 |
| JP | 2021512516 A | 5/2021 |
| WO | 2012154013 A2 | 11/2012 |
| WO | 2013168828 A1 | 11/2013 |
| WO | 2019003635 A1 | 1/2019 |

OTHER PUBLICATIONS

"HARQ-ACK Feedback with Flexible Timing," 3GPP TSG RAN WG1 NR Ad-Hoc Meeting, Spokane, USA, R1-1700957, 1-3, 3rd Generation Partnership Project, Valbonne, France (Jan. 16-20, 2017).

"3rd Generation Partnership Project; Technical Specification Group Radio Access Network; Evolved Universal Terrestrial Radio Access (E-UTRA); Physical layer procedures (Release 15)," 3GPP TS 36.213 V15.0.0, total 493 pages, 3rd Generation Partnership Project, Valbonne, France (Dec. 2017).

"3rd Generation Partnership Project;Technical Specification Group Radio Access Network; NR; Physical layer procedures for control (Release 15)," 3GPP TS 38.213 V15.0.0, total 56 pages, 3rd Generation Partnership Project, Valbonne, France (Dec. 2017).

IN/202017039224, Office Action, dated Nov. 30, 2021.

Ericsson, "On HARQ Management," 3GPP TSG RAN1 WG1 Meeting #91, Reno, USA, R1-1721013, total 11 pages (Nov. 27-Dec. 1, 2017).

"Discussion on CB group based HARQ-ACK feedback," 3GPP TSG RAN WG1 Meeting #88bis, R1-1704918, Spokane, USA, Total 4 pages, 3rd Generation Partnership Project, Valbonne, France (Apr. 3-7, 2017).

"HARQ-ACK Feedback for CBG-Based Retransmissions," 3GPP TSG RAN WG1 NR Ad-Hoc#2, R1-1710727, Qingdao, P. R. China, pp. 1-4, 3rd Generation Partnership Project, Valbonne, France (Jun. 27-30, 2017).

"Other issues on NR CA and DC including SRS switching and SUL," 3GPP TSG RAN WG1 Meeting #90bis, R1-1717080, Prague, Czech Republic, Total 9 pages, 3rd Generation Partnership Project, Valbonne, France (Oct. 9-13, 2017).

CN/201811300443.7, Notice of Allowance, dated May 7, 2022.

\* cited by examiner

INDICATION METHOD, NETWORK DEVICE, AND USER EQUIPMENT

CROSS-REFERENCE TO RELATED APPLICATIONS

This application is a continuation of International Application No. PCT/CN 2018/121983, filed on Dec. 19, 2018, which claims priority to Chinese Patent Application No. 201810146866.1, filed on Feb. 12, 2018. The disclosures of the aforementioned applications are hereby incorporated by reference in their entireties.

TECHNICAL FIELD

Embodiments of this application relate to the communications field, and more specifically, to an indication method, a network device, and user equipment.

BACKGROUND

In a cellular communications system, signal transmission may fail due to time-varying characteristics of a radio channel, impact of multipath fading on signal transmission, and some unpredictable interference. Therefore, an indication method such as a hybrid automatic repeat request (HARQ) mechanism or an automatic repeat request (ARQ) mechanism may be usually used to implement error control. When data arrives at a receive end, the receive end performs error detection on the data, and returns an acknowledgment (ACK) if the data is received correctly, or returns a negative acknowledgment (NACK) if the data is received incorrectly. However, because the foregoing channel-related factor, signal-related factor, unpredictable interference, and the like cause a transmission failure, the ACK or the WtACK sent by the receive end cannot be received by a transmit end, affecting subsequent transmission. Currently, no solution is available to resolve this problem.

SUMMARY

This application provides an indication method, a network device, and user equipment. The network device explicitly or implicitly indicates, by using indication information (including but not limited to a bitmap, information indicating a quantity Wt, and information indicating an index) carried on one or more downlink transmission units, a reception response for one or more downlink transmission unit sets that needs to be received by the network device, that is, a reception response for one or more downlink transmission unit sets that needs to be sent by the UE to the network device, so that the UE can correctly send, on a correct uplink transmission unit, the reception response that is for the downlink transmission unit sets and that the network device indicates the UE to send. In this way, errors and unnecessary retransmission are reduced, quality of service is ensured, and communication efficiency is improved. In particular, on an unlicensed listen-before-talk uplink transmission unit (channel), an error rate of an entire communications system can be further reduced, and communication quality and efficiency can be improved.

According to a first aspect, an indication method is provided, where the indication method includes: receiving, by user equipment UE on one or more downlink transmission units included in a downlink transmission unit set, a bitmap sent by a network device, where the bitmap is used to indicate the UE to send a reception response for one or more downlink transmission unit sets on an uplink transmission unit corresponding to the downlink transmission unit set.

With reference to the first aspect, in a possible implementation of the first aspect, one downlink transmission unit set corresponds to one uplink transmission unit.

With reference to the first aspect and any one or more of the foregoing possible implementations, in another possible implementation, if the network device supports a maximum of M downlink transmission unit sets, where if M is a positive integer greater than or equal to 1, a quantity of bits in the bitmap is M.

With reference to the first aspect and any one or more of the foregoing possible implementations, in another possible implementation, one bit in the bitmap is used to indicate whether the UE sends a reception response for one downlink transmission unit set.

With reference to the first aspect and any one or more of the foregoing possible implementations, in another possible implementation, the indication method further includes: obtaining, by the UE, an index of the downlink transmission unit set, where one index corresponds to one downlink transmission unit set.

With reference to the first aspect and any one or more of the foregoing possible implementations, in another possible implementation, the indication method further includes: sending, by the UE, on the uplink transmission unit corresponding to the downlink transmission unit set, the reception response for the one or more downlink transmission unit sets indicated in the bitmap.

With reference to the first aspect and any one or more of the foregoing possible implementations, in another possible implementation, the indication method further includes: monitoring, by the UE, whether the uplink transmission unit is idle; and the sending, by the UE, on the uplink transmission unit corresponding to the downlink transmission unit set, the reception response for the one or more downlink transmission unit sets indicated in the bitmap includes: if the uplink transmission unit is idle, sending, by the UE, on the uplink transmission unit corresponding to the downlink transmission unit set, the reception response for the one or more downlink transmission unit sets indicated in the bitmap.

According to a second aspect, an indication method is provided, where the indication method includes: determining, by a network device, a bitmap, where the bitmap is used to indicate that the network device needs to receive a reception response for one or more downlink transmission unit sets; and sending, by the network device, the bitmap to user equipment UE on one or more first downlink transmission units included in a downlink transmission unit set.

With reference to the second aspect, in a possible implementation of the second aspect, the reception response for the one or more downlink transmission unit sets that needs to be received includes:

a reception response for a downlink transmission unit set to which a current downlink transmission unit belongs; and a reception response for one or more downlink transmission unit sets that is unsuccessfully received by the network device historically.

With reference to the second aspect and any one or more of the foregoing possible implementations, in another possible implementation, the reception response for the one or more downlink transmission unit sets that is unsuccessfully received by the network device historically does not include: a reception response, unsuccessfully received by the network device, for one or more downlink transmission unit sets that have been indicated by the network device in a bitmap on one or more downlink transmission units before the downlink transmission unit set.

With reference to the second aspect and any one or more of the foregoing possible implementations, in another possible implementation, if the network device supports a maximum of M downlink transmission unit sets, where if M is a positive integer greater than or equal to 1, a quantity of bits in the bitmap is M.

With reference to the second aspect and any one or more of the foregoing possible implementations, in another possible implementation, one bit in the bitmap is used to indicate one downlink transmission unit set.

With reference to the second aspect and any one or more of the foregoing possible implementations, in another possible implementation, the network device further sends an index of the downlink transmission unit set to the UE on the one or more downlink transmission units included in the downlink transmission unit set; and one index corresponds to one downlink transmission unit set.

With reference to the second aspect and any one or more of the foregoing possible implementations, in another possible implementation, the network device receives the reception response for the one or more downlink transmission unit sets on an uplink transmission unit corresponding to the downlink transmission unit set.

With reference to the second aspect and any one or more of the foregoing possible implementations, in another possible implementation, after the receiving, by the network device, the reception response for the one or more downlink transmission unit sets on an uplink transmission unit corresponding to the downlink transmission unit set, the indication method further includes: if the network device successfully receives the reception response for the one or more downlink transmission unit sets, unbinding, by the network device, the one or more downlink transmission unit sets from an index or indexes of the one or more downlink transmission unit sets.

With reference to the second aspect and any one or more of the foregoing possible implementations, in another possible implementation, the information indicating the quantity Wt is indicated by using downlink control information DCI carried on the one or more downlink transmission units.

With reference to the second aspect and any one or more of the foregoing possible implementations, in another possible implementation, the DCI includes a downlink assignment index DAI, and the DAI is used to indicate the UE to send a reception response for Wu downlink transmission units on the uplink transmission unit corresponding to the first downlink transmission unit set.

With reference to the second aspect and any one or more of the foregoing possible implementations, in another possible implementation, the method further includes: receiving, by the UE on the one or more downlink transmission units included in the first downlink transmission unit set, information that is sent by the network device and that indicates a quantity Wu, where Wu is a positive integer or 0; and the information indicating the quantity Wu is used to indicate the UE to send a reception response for Wu downlink transmission units on the uplink transmission unit corresponding to the first downlink transmission unit set.

With reference to the second aspect and any one or more of the foregoing possible implementations, in another possible implementation, the information indicating the quantity Wu is indicated by using a DAI index in downlink control information DCI carried on the one or more downlink transmission units.

With reference to the second aspect and any one or more of the foregoing possible implementations, in another possible implementation, a total DAI in the DAI is used to indicate the UE to send the reception response for the Wu downlink transmission units on the uplink transmission unit corresponding to the first downlink transmission unit set.

According to a third aspect, an indication method is provided, where the indication method includes: receiving, by user equipment UE on one or more downlink transmission units included in a first downlink transmission unit set, information that is sent by a network device and that indicates a quantity Wt, where Wt is a positive integer greater than or equal to 1; and the information for indicating the quantity Wt is used to indicate the UE to send a reception response for Wt downlink transmission unit sets on an uplink transmission unit corresponding to the first downlink transmission unit set.

With reference to the third aspect, in a possible implementation of the third aspect, one downlink transmission unit set corresponds to one uplink transmission unit.

With reference to the third aspect and any one or more of the foregoing possible implementations, in another possible implementation, if Wt is equal to 1, the Wt downlink transmission unit sets are the first downlink transmission unit set.

With reference to the third aspect and any one or more of the foregoing possible implementations, in another possible implementation, the UE sends, on the uplink transmission unit corresponding to the first downlink transmission unit set, the reception response for the Wt downlink transmission unit sets based on the information that indicates the quantity Wt and that is received on the one or more downlink transmission units.

With reference to the third aspect and any one or more of the foregoing possible implementations, in another possible implementation, if the first downlink transmission unit set includes at least two downlink transmission units, the sending, by the UE on the uplink transmission unit corresponding to the first downlink transmission unit set, the reception response for the Wt downlink transmission unit sets based on the information that indicates the quantity Wt and that is received on the one or more downlink transmission units includes: sending, by the UE on the uplink transmission unit corresponding to the first downlink transmission unit set, the reception response for the Wt downlink transmission unit sets based on the information that indicates the quantity Wt and that is received on the last downlink transmission unit included in the first downlink transmission unit set.

With reference to the third aspect and any one or more of the foregoing possible implementations, in another possible implementation, if Wt is greater than or equal to 2, and Wt on all downlink transmission units in the first downlink transmission unit set is the same, the reception response for the Wt downlink transmission unit sets includes: a reception response for a first set and a reception response for a third set, where the reception response for the first set includes a reception response for the first downlink transmission unit set; the reception response for the third set includes a reception response for Wt−1 downlink transmission unit sets; and the reception response for the Wt−1 downlink transmission unit sets includes: a response that is for the Wt−1 downlink transmission unit sets and that the network device indicates the UE to send on E uplink transmission units, where the E uplink transmission units are located before the first downlink transmission unit set, and E is less than or equal to Wt−1.

With reference to the third aspect and any one or more of the foregoing possible implementations, in another possible implementation, if Wt is greater than or equal to 2, and Wt on in the first downlink transmission unit set changes for B times, the reception response for the Wt downlink transmission unit sets includes a reception response for a first set, a reception response for a second set, and a reception response for a third set, where the reception response for the first set includes a reception response for the first downlink transmission unit set; the reception response for the second set includes a reception response for A downlink transmission unit sets, and the reception response for the A downlink transmission unit sets includes: a reception response that is for C downlink transmission unit sets and that the network device indicates the UE to send on an uplink transmission unit before the $1^{st}$ downlink transmission unit existing after each of the B changes, where A, B, and C are integers greater than or equal to 1, B is less than or equal to A, and C is less than or equal to A; the third set includes a reception response for D downlink transmission unit sets, and the reception response for the D downlink transmission unit sets includes: a reception response that is for the D downlink transmission unit sets and that the network device indicates the UE to send on E uplink transmission units, where E and D are integers greater than or equal to 0, E is less than or equal to D, the D downlink transmission unit sets do not include a downlink transmission unit set included in the first set or the second set, and the E uplink transmission units are located before the first downlink transmission unit set; and A+D+1=Wt.

With reference to the third aspect and any one or more of the foregoing possible implementations, in another possible implementation, the uplink transmission unit before the $1^{st}$ downlink transmission unit existing after each of the B changes specifically includes: an uplink transmission unit exactly before the $1^{st}$ downlink transmission unit existing after each of the B changes.

With reference to the third aspect and any one or more of the foregoing possible implementations, in another possible implementation, the E uplink transmission units are determined by time.

With reference to the third aspect and any one or more of the foregoing possible implementations, in another possible implementation, the E uplink transmission units are determined in reverse chronological order.

With reference to the third aspect and any one or more of the foregoing possible implementations, in another possible implementation, $A=\Sigma_i C_i$, where $i=1, \ldots, B$, and $C_i$ is a reception response for Ci downlink transmission unit sets that is sent on an uplink transmission unit before the $1^{st}$ downlink transmission unit existing after the $i^{th}$ change in the B changes.

With reference to the third aspect and any one or more of the foregoing possible implementations, in another possible implementation, the indication method further includes: obtaining, by the UE, information about an indication offset K, where K is a positive integer greater than or equal to 0; and that the E uplink transmission units are located before the first downlink transmission unit set includes: the E uplink transmission units are located before a downlink transmission unit obtained by offsetting the $1^{st}$ downlink transmission unit included in the first downlink transmission unit set forward by K transmission units.

With reference to the third aspect and any one or more of the foregoing possible implementations, in another possible implementation, the UE obtains information indicating an indication delay J of the network device, where J is a positive integer greater than or equal to 0. If J is greater than or equal to 1, the E uplink transmission units before the first downlink transmission unit set include: E uplink transmission units before a downlink transmission unit obtained by offsetting the first downlink transmission unit set forward by J−1 transmission units.

With reference to the third aspect and any one or more of the foregoing possible implementations, in another possible implementation, the indication method further includes: obtaining, by the UE, information about an indication offset K, where K is a positive integer greater than or equal to 0; and the uplink transmission unit before the $1^{st}$ downlink transmission unit existing after each change includes: an uplink transmission unit before a downlink transmission unit obtained by offsetting the $1^{st}$ downlink transmission unit, existing after each change, forward by K transmission units.

With reference to the third aspect and any one or more of the foregoing possible implementations, in another possible implementation, the UE obtains information indicating an indication delay J of the network device, where J is a positive integer greater than or equal to 0; and the uplink transmission unit before the $1^{st}$ downlink transmission unit existing after each change includes: an uplink transmission unit before a downlink transmission unit obtained by offsetting the $1^{st}$ downlink transmission unit, existing after each change, forward by J−1 transmission units.

With reference to the third aspect and any one or more of the foregoing possible implementations, in another possible implementation, K+1=J.

With reference to the third aspect and any one or more of the foregoing possible implementations, in another possible implementation, the UE obtains an index, where one index corresponds to one downlink transmission unit set.

With reference to the third aspect and any one or more of the foregoing possible implementations, in another possible implementation, the sending, by the UE on the uplink transmission unit corresponding to the first downlink transmission unit set, the reception response for the Wt downlink transmission unit sets based on the information that indicates the quantity Wt and that is received on the one or more downlink transmission units includes: sending, by the UE on an uplink transmission unit corresponding to the index, the reception response for the Wt downlink transmission unit sets based on the information that indicates the quantity Wt and that is received on the one or more downlink transmission units.

With reference to the third aspect and any one or more of the foregoing possible implementations, in another possible implementation, monitoring, by the UE, whether the uplink transmission unit is idle; and the sending, by the UE on the uplink transmission unit corresponding to the first downlink transmission unit set, the reception response based on the information that indicates the quantity Wt and that is received on the one or more downlink transmission units includes: if the uplink transmission unit is idle, sending, by the UE on the uplink transmission unit corresponding to the first downlink transmission unit set, the reception response based on the information that indicates the quantity Wt and that is received on the one or more downlink transmission units.

With reference to the third aspect and any one or more of the foregoing possible implementations, in another possible implementation, the information indicating the quantity Wt is indicated by using downlink control information DCI carried on the one or more downlink transmission units.

With reference to the third aspect and any one or more of the foregoing possible implementations, in another possible implementation, the DCI includes a downlink assignment index DAI, and the DAI is used to indicate that the network device needs to receive a reception response for Wu downlink transmission units.

With reference to the third aspect and any one or more of the foregoing possible implementations, in another possible implementation, the method further includes: sending, by the network device, information indicating a quantity Wu on one or more downlink transmission units included in a first downlink transmission unit set, where Wu is a positive integer or 0; and the information indicating the quantity Wu is used to indicate that the network device needs to receive a reception response for Wu downlink transmission units.

With reference to the third aspect and any one or more of the foregoing possible implementations, in another possible implementation, the information indicating the quantity Wu is indicated by using a DAI index in downlink control information DCI carried on the one or more downlink transmission units.

With reference to the third aspect and any one or more of the foregoing possible implementations, in another possible implementation, a total DAI in the DAI is used to indicate that the network device needs to receive the reception responses for the Wu downlink transmission units.

According to a fourth aspect, an indication method is provided, where the indication method includes: receiving, by user equipment UE on one or more downlink transmission units included in a first downlink transmission unit set, information that is sent by a network device and that indicates a quantity Q, where Q is a positive integer greater than or equal to 0; and the information for indicating the quantity Q is used to indicate the UE to send a reception response for Q+1 downlink transmission unit sets on an uplink transmission unit corresponding to the first downlink transmission unit set.

With reference to the fourth aspect, in a possible implementation of the fourth aspect, if Q is equal to 0, the Q+1 downlink transmission unit sets are the first downlink transmission unit set.

With reference to the fourth aspect and any one or more of the foregoing possible implementations, in another possible implementation, the UE sends, on the uplink transmission unit corresponding to the first downlink transmission unit set, the reception response for the Q+1 downlink transmission unit sets based on the information that indicates the quantity Q and that is received on the one or more downlink transmission units.

With reference to the fourth aspect and any one or more of the foregoing possible implementations, in another possible implementation, if the first downlink transmission unit set includes at least two downlink transmission units, the sending, by the UE on the uplink transmission unit corresponding to the first downlink transmission unit set, the reception response for the Q+1 downlink transmission unit sets based on the information that indicates the quantity Q and that is received on the one or more downlink transmission units includes: sending, by the UE on the uplink transmission unit corresponding to the first downlink transmission unit set, the reception response for the Q+1 downlink transmission unit sets based on the information that indicates the quantity Q and that is received on the last downlink transmission unit included in the first downlink transmission unit set.

With reference to the fourth aspect and any one or more of the foregoing possible implementations, in another possible implementation, if Q is greater than or equal to 1, and Q on all downlink transmission units in the first downlink transmission unit set is the same, the reception response for the Q downlink transmission unit sets includes a reception response for a third set, where the reception response for the third set includes a reception response for Q downlink transmission unit sets, and the reception response for the Q downlink transmission unit sets includes: a response that is for the Q downlink transmission unit sets and that the network device indicates the UE to send on E uplink transmission units, where the E uplink transmission units are located before the first downlink transmission unit set, and E is less than or equal to Q.

With reference to the fourth aspect and any one or more of the foregoing possible implementations, in another possible implementation, if Q is greater than or equal to 1, and Q on all downlink transmission units in the first downlink transmission unit set changes for B times, the reception response for the Q downlink transmission unit sets includes a reception response for a second set and a reception response for a third set, where the reception response for the second set includes a reception response for A downlink transmission unit sets, and the reception response for the A downlink transmission unit sets includes: a reception response that is for C downlink transmission unit sets and that the network device indicates the UE to send on an uplink transmission unit before the $1^{st}$ downlink transmission unit existing after each of the B changes, where A, B, and C are integers greater than or equal to 1, B is less than or equal to A, and C is less than or equal to A; and the third set includes a reception response for D downlink transmission unit sets, and the reception response for the D downlink transmission unit sets includes: a reception response that is for D downlink transmission unit sets and that the network device indicates the UE to send on E uplink transmission units, where E and D are integers greater than or equal to 0, E is less than or equal to D, and the D downlink transmission unit sets do not include a downlink transmission unit set included in the first set or the second set.

The E uplink transmission units are located before the first downlink transmission unit set, and A+D=Q.

With reference to the fourth aspect and any one or more of the foregoing possible implementations, in another possible implementation, the uplink transmission unit before the $1^{st}$ downlink transmission unit existing after each of the B changes specifically includes: an uplink transmission unit exactly before the $1^{st}$ downlink transmission unit existing after each of the B changes.

With reference to the fourth aspect and any one or more of the foregoing possible implementations, in another possible implementation, the E uplink transmission units are determined by time.

With reference to the fourth aspect and any one or more of the foregoing possible implementations, in another possible implementation, the E uplink transmission units are determined in reverse chronological order.

With reference to the fourth aspect and any one or more of the foregoing possible implementations, in another possible implementation, $A=\Sigma_i C_i$, where i=1, . . . , B, and $C_i$ is a reception response for Ci downlink transmission unit sets that is sent on an uplink transmission unit before the $1^{st}$ downlink transmission unit existing after the $i^{th}$ change in the B changes.

With reference to the fourth aspect and any one or more of the foregoing possible implementations, in another possible implementation, the indication method further includes: obtaining, by the UE, information about an indication offset K, where K is a positive integer greater than or equal to 0; and that the E uplink transmission units are located before the first downlink transmission unit set includes: the E uplink transmission units are located before a downlink transmission unit obtained by offsetting the $1^{st}$ downlink transmission unit included in the first downlink transmission unit set forward by K transmission units.

With reference to the fourth aspect and any one or more of the foregoing possible implementations, in another possible implementation, the UE obtains information indicating an indication delay J of the network device, where J is a positive integer greater than or equal to 0. If J is greater than or equal to 1, the E uplink transmission units before the first downlink transmission unit set include: E uplink transmission units before a downlink transmission unit obtained by offsetting the first downlink transmission unit set forward by J−1 transmission units. With reference to the fourth aspect and any one or more of the foregoing possible implementations, in another possible implementation, the indication method further includes: obtaining, by the UE, information about an indication offset K, where K is a positive integer greater than or equal to 0; and the uplink transmission unit before the $1^{st}$ downlink transmission unit existing after each change includes: an uplink transmission unit before a downlink transmission unit obtained by offsetting the $1^{st}$ downlink transmission unit, existing after each change, forward by K transmission units.

With reference to the fourth aspect and any one or more of the foregoing possible implementations, in another possible implementation, the UE obtains information indicating an indication delay J of the network device, where J is a positive integer greater than or equal to 0; and the uplink transmission unit before the $1^{st}$ downlink transmission unit existing after each change includes: an uplink transmission unit before a downlink transmission unit obtained by offsetting the $1^{st}$ downlink transmission unit, existing after each change, forward by J−1 transmission units.

With reference to the fourth aspect and any one or more of the foregoing possible implementations, in another possible implementation, K+1=J.

With reference to the fourth aspect and any one or more of the foregoing possible implementations, in another possible implementation, the UE obtains an index, where one index corresponds to one downlink transmission unit set.

With reference to the fourth aspect and any one or more of the foregoing possible implementations, in another possible implementation, the sending, by the UE on the uplink transmission unit corresponding to the first downlink transmission unit set, the reception response for the Q+1 downlink transmission unit sets based on the information that indicates the quantity Q and that is received on the one or more downlink transmission units includes: sending, by the UE on an uplink transmission unit corresponding to the index, the reception response for the Q+1 downlink transmission unit sets based on the information that indicates the quantity Q and that is received on the one or more downlink transmission units.

With reference to the fourth aspect and any one or more of the foregoing possible implementations, in another possible implementation, the indication method further includes: monitoring, by the UE, whether the uplink transmission unit is idle; and the sending, by the UE on the uplink transmission unit corresponding to the first downlink transmission unit set, the reception response based on the information that indicates the quantity Q and that is received on the one or more downlink transmission units includes: if the uplink transmission unit is idle, sending, by the UE on the uplink transmission unit corresponding to the first downlink transmission unit set, the reception response based on the information that indicates the quantity Q and that is received on the one or more downlink transmission units.

According to a fifth aspect, an indication method is provided, where the indication method includes: determining, by a network device, information indicating a quantity Wt, where Wt is a positive integer greater than or equal to 1; and the information indicating the quantity Wt is used to indicate that the network device needs to receive a reception response for Wt downlink transmission unit sets; and sending, by the network device to user equipment UE, the information indicating the quantity Wt on one or more downlink transmission units included in a downlink transmission unit set.

With reference to the fifth aspect, in a possible implementation of the fifth aspect, the reception response for the Wt downlink transmission unit sets that needs to be received includes: a reception response for a downlink transmission unit set to which a current downlink transmission unit belongs, and a reception response for Wt−1 downlink transmission unit sets that is unsuccessfully received by the network device historically.

With reference to the fifth aspect and any one or more of the foregoing possible implementations, in another possible implementation, the reception response for the Wt−1 downlink transmission unit sets that is unsuccessfully received by the network device historically does not include: a reception response, unsuccessfully received by the network device, for one or more downlink transmission unit sets that have been indicated by the network device on one or more downlink transmission units before the downlink transmission unit set.

With reference to the fifth aspect and any one or more of the foregoing possible implementations, the indication method further includes: receiving, by the network device on an uplink transmission unit corresponding to the downlink transmission unit set, the reception response for the Wt downlink transmission unit sets that is sent by the UE, where one downlink transmission unit set corresponds to one uplink transmission unit.

With reference to the fifth aspect and any one or more of the foregoing possible implementations, if the network device unsuccessfully receives a reception response for one or more downlink transmission unit sets on any one of a plurality of consecutive uplink transmission units, a reception response for one or more downlink transmission unit sets that needs to be received by the network device on each of the plurality of consecutive uplink transmission units is the reception response for the one or more downlink transmission unit sets that is unsuccessfully received.

With reference to the fifth aspect and any one or more of the foregoing possible implementations, the network device further sends an index of the downlink transmission unit set to the UE on the one or more downlink transmission units included in the downlink transmission unit set, where one index corresponds to one downlink transmission unit set.

With reference to the fifth aspect and any one or more of the foregoing possible implementations, the receiving, by the network device on an uplink transmission unit corresponding to the downlink transmission unit set, the reception response for the Wt downlink transmission unit sets that is sent by the UE includes: receiving, by the network device on an uplink transmission unit corresponding to the index, the reception response for the Wt downlink transmission unit sets that is sent by the UE.

According to a sixth aspect, an indication method is provided, where the indication method includes: obtaining, by a network device, information indicating a quantity Q, where Q is a positive integer greater than or equal to 0; and the information indicating the quantity Q is used to indicate that the network device needs to receive a reception response for Q+1 downlink transmission unit sets; and sending, by the network device to user equipment UE, the information indicating the quantity Q on one or more downlink transmission units included in a downlink transmission unit set.

With reference to the sixth aspect, in a possible implementation of the sixth aspect, the reception response for the Q+1 downlink transmission unit sets that needs to be received includes: a reception response for a downlink transmission unit set to which a current downlink transmission unit belongs, and a reception response for Q downlink transmission unit sets that is unsuccessfully received by the network device historically.

With reference to the sixth aspect and any one or more of the foregoing possible implementations, in another possible implementation, the reception response for the Q−1 downlink transmission unit sets that is unsuccessfully received by the network device historically does not include: a reception response, unsuccessfully received by the network device, for one or more downlink transmission unit sets that have been indicated by the network device on one or more downlink transmission units before the downlink transmission unit set.

With reference to the sixth aspect and any one or more of the foregoing possible implementations, the indication method further includes: receiving, by the network device on an uplink transmission unit corresponding to the downlink transmission unit set, the reception response for the Q+1 downlink transmission unit sets that is sent by the UE, where one downlink transmission unit set corresponds to one uplink transmission unit.

With reference to the sixth aspect and any one or more of the foregoing possible implementations, if the network device unsuccessfully receives a reception response for one or more downlink transmission unit sets on any one of a plurality of consecutive uplink transmission units, a reception response for one or more downlink transmission unit sets that needs to be received by the network device on each of the plurality of consecutive uplink transmission units is the reception response for the one or more downlink transmission unit sets that is unsuccessfully received.

With reference to the sixth aspect and any one or more of the foregoing possible implementations, the network device further sends an index of the downlink transmission unit set to the UE on the one or more downlink transmission units included in the downlink transmission unit set, where one index corresponds to one downlink transmission unit set.

With reference to the sixth aspect and any one or more of the foregoing possible implementations, the receiving, by the network device on an uplink transmission unit corresponding to the downlink transmission unit set, the reception response for the Q+1 downlink transmission unit sets that is sent by the UE includes: receiving, by the network device on an uplink transmission unit corresponding to the index, the reception response for the Q+1 downlink transmission unit sets that is sent by the UE.

With reference to any one of the foregoing aspects or one or more of the foregoing possible implementations of the foregoing aspects, in another possible implementation, a reception response for a downlink transmission unit set includes a reception response for one or more downlink transmission units included in the downlink transmission unit set.

With reference to any one of the foregoing aspects or one or more of the foregoing possible implementations of the foregoing aspects, in another possible implementation, if a downlink transmission unit includes one or more carriers, the reception response for the downlink transmission unit set includes a reception response for one or more carriers included in the one or more downlink transmission units included in the downlink transmission unit set.

With reference to any one of the foregoing aspects and/or one or more of the foregoing possible implementations of the foregoing aspects, in another possible implementation, the reception response includes an acknowledgment ACK and/or a negative acknowledgment NACK.

According to a seventh aspect, a computer-readable storage medium is provided. The computer-readable storage medium includes an instruction. When the instruction is run on a computer, the computer is enabled to perform the indication method according to any one of the foregoing aspects and/or one or more of the foregoing possible implementations of the foregoing aspects.

According to an eighth aspect, a program product is provided. The program product includes an instruction. When the instruction is run on a computer, the computer is enabled to perform the indication method according to any one of the foregoing aspects and/or one or more of the foregoing possible implementations of the foregoing aspects.

According to a ninth aspect, a chip is provided, where the chip includes: at least one circuit, where the circuit is configured to execute program code that enables a computer to perform the indication method according to any one of the foregoing aspects and/or one or more of the foregoing possible implementations of the foregoing aspects.

According to a tenth aspect, a chip is provided, where the chip includes: a processor and a memory, where the memory stores an instruction to be executed by the processor, and the instruction enables a computer to perform the indication method according to any one of the foregoing aspects and/or one or more of the foregoing possible implementations of the foregoing aspects.

According to an eleventh aspect, a chip is provided, where the chip includes a processor. When the processor runs an instruction, a computer is enabled to perform the indication method according to any one of the foregoing aspects and/or one or more of the foregoing possible implementations of the foregoing aspects.

According to an eleventh aspect, a communications device is provided, where the communications device includes a memory, a processor, and a transceiver. The memory is configured to store an instruction. The instruction is run on the processor, to perform the indication method according to any one of the foregoing aspects and/or one or more of the foregoing possible implementations of the foregoing aspects. The communications device may be a network device or UE.

According to a twelfth aspect, a communications system is provided, including a network device and UE. The communications system is configured to perform the indication method according to any one of the foregoing aspects and/or one or more of the foregoing possible implementations of the foregoing aspects.

According to a thirteenth aspect, an indication method is provided, where the indication method includes: receiving, by user equipment UE on one or more downlink transmission units included in a first downlink transmission unit set, information that is sent by a network device and that indicates a quantity Wu, where Wu is a positive integer or 0; and the information indicating the quantity Wu is used to indicate the UE to send a reception response for Wu downlink transmission units on the uplink transmission unit corresponding to the first downlink transmission unit set.

With reference to the thirteenth aspect and any one or more of the foregoing possible implementations, the indication method further includes: sending, by the UE on the uplink transmission unit corresponding to the first downlink transmission unit set, the reception response for the Wu downlink transmission units based on the information that indicates the quantity Wu and that is received on the one or more downlink transmission units.

With reference to the thirteenth aspect and any one or more of the foregoing possible implementations, the information indicating the quantity Wu is indicated by using a DAI index in downlink control information DCI carried on the one or more downlink transmission units.

According to a fourteenth aspect, an indication method is provided, where the indication method includes: determining, by a network device, information indicating a quantity Wu, where Wu is a positive integer or 0; and the information indicating the quantity Wu is used to indicate that the network device needs to receive a reception response for Wu downlink transmission units; and sending, by the network device to user equipment UE, the information indicating the quantity Wu on one or more downlink transmission units included in a downlink transmission unit set.

With reference to the fourteenth aspect and any one or more of the foregoing possible implementations, the information indicating the quantity Wu is indicated by using a DAI index in downlink control information DCI carried on the one or more downlink transmission units.

It should be understood that the thirteenth aspect and/or the fourteenth aspect may be combined with any one of the foregoing aspects.

DESCRIPTION OF EMBODIMENTS

Figure 1:
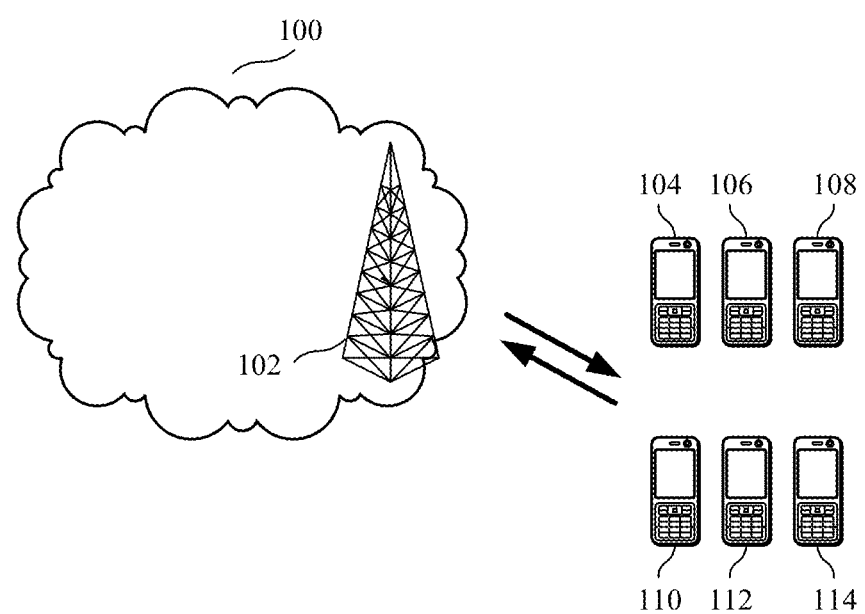
FIG. 1 is a schematic structural diagram of a system according to this application.

The terms used in this application are merely for the purpose of describing a specific possible implementation, but are not intended to limit this application. The terms "a", "an" and "the" of singular forms used in this application and the appended claims are also intended to include plural forms, unless otherwise specified in the context clearly. The term "and/or" used in this application refers to and includes one or more associated listed items or all possible combinations thereof. The term "include" adopted in this application specifies presence of features, data, information, integers, steps, operations, elements, and/or components, but does not exclude presence or attachment of one or more (pieces of) other features, data, information, integers, steps, operations, components, elements, and/or their combinations. The term "indication" used in this application may include "explicit indication" and/or "implicit indication". A sequence of steps in this application may be freely arranged. This is not limited in this application. Even if a step is marked with a sequence number, the sequence number is used only to simplify description. In practice, steps may not be performed according to sequence numbers or may be simultaneously performed.

Some terms in this application are first described, to help a person skilled in the art have a better understanding.

(1) A network device may be any device with a wireless sending/receiving function. The network device includes, but is not limited to, a network device (for example, a network device NodeB, an evolved network device eNodeB, a network device (gNB) in a fifth generation (5G) communications system, a network device in a future communications system, an access node in a Wi-Fi system, a wireless relay node, or a wireless backhaul node), and the like. The network device may alternatively be a radio controller in a cloud radio access network (CRAN) scenario. Alternatively, the network device may be a network device in a 5G network or a network device in a future evolved network, or may be a wearable device, a vehicle-mounted device, or the like. The network device may alternatively be a small cell, a transmission node (TRP), or the like. Certainly, this application is not limited thereto. (2) A base station may also be referred to as a base station device, and is a device deployed in a radio access network to provide a wireless communication function. The base station may have different names in different radio access systems. For example, a base station in a universal mobile telecommunications system (UMTS) network is referred to as a NodeB, a base station in an LTE network is referred to as an evolved NodeB (eNB or eNodeB for short), and a base station in a future 5G system may be referred to as a transmission reception point (TRP), a network node, or a g-NodeB (gNB). (3) User equipment (UE) is a device that has a wireless transmission and receiving function and may interact with a network device. The UE may be deployed on the land, including an indoor or outdoor device and a handheld or vehicle-mounted device, may be deployed on the water (for example, on a ship), or may be deployed in the air (for example, on a plane, a balloon, or a satellite). The UE may be a mobile phone, a tablet computer (Pad), a computer with a wireless transmission and receiving function, a virtual reality (VR) UE device, an augmented reality (AR) UE device, wireless UE in industrial control, wireless UE in self driving, wireless UE in remote medical, wireless UE in a smart grid, wireless UE in transportation safety, wireless UE in a smart city, wireless UE in a smart home, or the like. An application scenario is not limited in the embodiments of this application. The UE may be a device that can communicate with the network device. Sometimes, the UE may also be referred to as a terminal device, an access terminal device, a UE unit, a UE station, a mobile station, a mobile console, a remote station, a remote terminal device, a mobile device, a wireless communications device, a UE agent, a terminal apparatus, or the like.

The nouns "network" and "system" are usually interchangeably used or used in a same document, but meanings of the nouns can be understood by a person skilled in the art. The terms "information", "signal", "message", and "channel" may be mixedly used sometimes. It should be noted that meanings expressed by the terms are consistent when differences of the terms are not emphasized. The terms "of", "corresponding (relevant)", and "corresponding" may be mixedly used sometimes. It should be noted that meanings expressed by the terms are consistent when differences of the terms are not emphasized.

The following describes technical solutions of this application with reference to accompanying drawings.

FIG. 1 is a schematic diagram of a system to which this application is applied. As shown in FIG. 1, the system 100 may include a network device 102 and UEs 104, 106, 108, 110, 112, and 114 (for ease of description, the UE 104 is used below to represent any one or more of the UEs 104, 106, 108, 110, 112, and 114). The network device 102 is wirelessly connected to the UE 104. It should be understood that FIG. 1 is described by using only an example in which the system includes one network device. However, this is not limited in this application. For example, the system may further include more network devices. Similarly, the system may also include more or fewer UEs. It should be further understood that the system may also be referred to as a network or a network system. This is not limited in this application.

Figure 2:
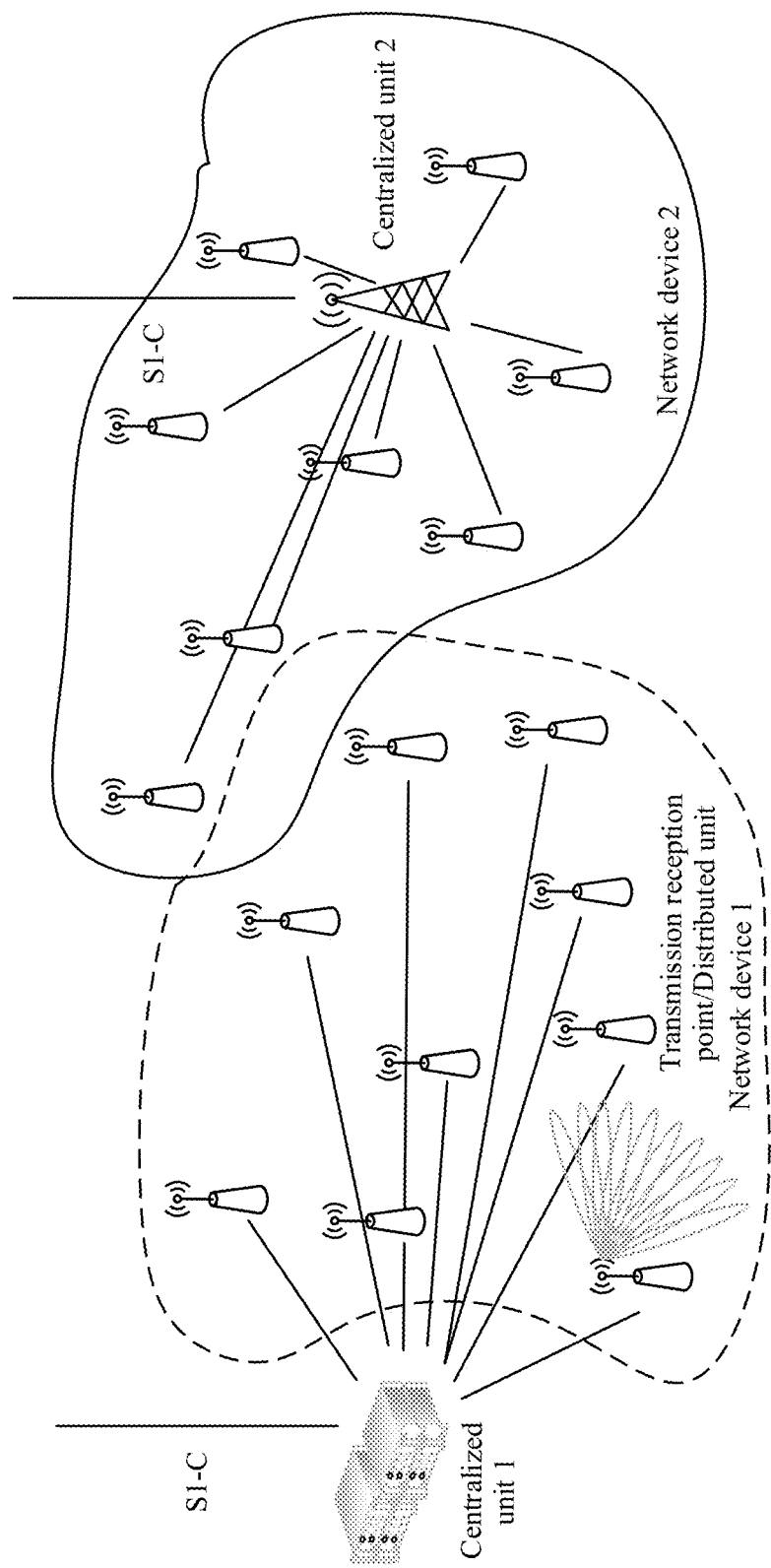
FIG. 2 is a schematic architecture diagram of another network to which this application is applicable.

FIG. 2 is a schematic architecture diagram of another network to which this application is applicable. The schematic architecture diagram of the network may be an NR network architecture diagram of a next-generation wireless communications system. In the schematic architecture diagram of the network, a network device may be divided into one centralized unit (CU) and a plurality of transmission reception points (TRP)/distributed units (DU). In other words, a bandwidth based unit (BBU) of the network device is reconstructed as DU and CU function entities. It should be noted that forms and quantities of centralized units and TRPs/DUs do not constitute a limitation on this application. Although forms of centralized units respectively corresponding to a network device 1 and a network device 2 shown in FIG. 2 are different, functions of the network device 1 and the network device 2 are not affected. It may be understood that a centralized unit 1 and TRPs/DUs in a dashed line range are composition elements of the network device 1, a centralized unit 2 and TRPs/DUs in a solid line range are composition elements of the network device 2, and the network device 1 and the network device 2 are network devices (or referred to as base stations) in an NR system. The CU may process a protocol stack function of a wireless higher layer, such as a radio resource control (RRC) layer or a packet data convergence protocol (PDCP) layer, and even can support sinking of some core network functions to an access network, where the access network is termed as an edge computing network, to meet higher network latency requirements of a future communications network for emerging services such as videos, online shopping, and virtual/augmented reality. The DU may mainly process a physical layer function and a layer 2 function with a higher real-time requirement. Some physical layer functions of the DU may be moved up to an RRU in consideration of transmission resources of the radio remote unit (RRU) and the DU. With miniaturization of the RRU, even more radically, the DU may be combined with the RRU. CUs may be deployed in a centralized manner. Deployment of DUs depends on an actual network environment. In a core urban area with high traffic density, small station spacing, and limited equipment room resources, such as a university or a large-scale performance venue, the DUs may also be deployed in a centralized manner. However, in a region with sparse traffic and relatively large station spacing and the like, such as a suburban county or a mountainous area, the DUs may be deployed in a distributed manner. An S1-C interface shown in FIG. 2 may be a standard interface between a network device and a core network, and specific devices connected via S1-C are not shown in FIG. 2.

Figure 3:
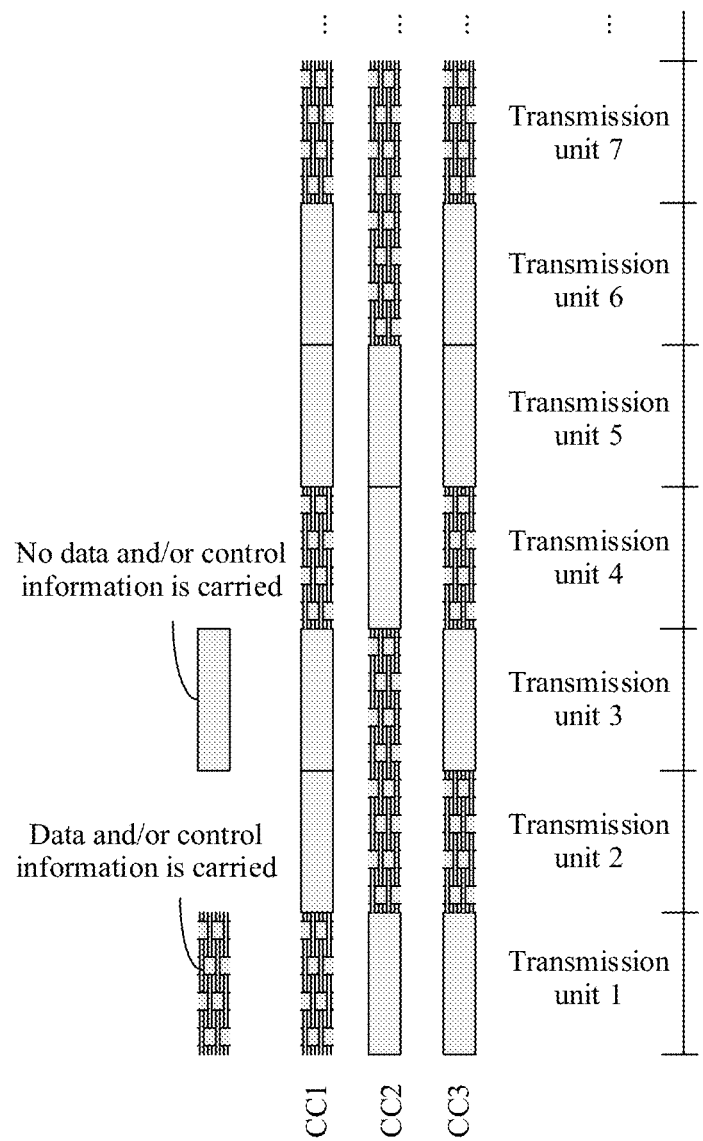
FIG. 3 is a schematic structural diagram of a transmission unit according to this application.

With reference to FIG. 1 and FIG. 2, the network device sends data and/or control information to the UE, where the control information may be used to indicate receiving and sending of related data. The data and/or the control information may be transmitted on a same transmission unit, or may be transmitted on different transmission units. When the control information and the data are transmitted on different transmission units, the control information may include corresponding information of the control information and data corresponding to the control information. The transmission unit corresponds to a time domain granularity used when a device (including but not limited to the network device and/or the UE) allocates a resource and/or transmits data, or corresponds to a minimum time unit used when a device transmits or sends data. The transmission unit corresponds to at least one consecutive transmission time interval (TTI), subframe, slot, or time domain symbol. Each TTI included in the transmission unit may be a complete TTI (to be specific, all time domain resources corresponding to the TTI are occupied to send information), or may be a partial TTI (to be specific, some time domain resources corresponding to the TTI are occupied to send information, and the other time domain resources are retained as idle). Optionally, the slot may be a 1 ms slot, or may be referred to as a subframe with a length of 1 ms or less than 1 ms. The slot may correspond to 14 time domain symbols, or may correspond to fewer than 14 time domain symbols. When the slot includes fewer than 14 time domain symbols, the slot corresponds to a short transmission time interval (short TTI, sTTI). In this case, the slot is referred to as a mini-slot or a non-slot. As shown in FIG. 3, one transmission unit may include one or more carriers (or referred to as component carriers (CC)). These carriers may include a carrier corresponding to a primary cell (or referred to as a primary serving cell (PCell)), and may further include one or more carriers corresponding to a secondary cell (SCell). The network device sends data and/or control information to the UE on a downlink transmission unit, and the UE sends data/or control information to the network device on an uplink transmission unit. A plurality of downlink transmission units may form a downlink transmission unit set, and one downlink transmission unit set includes at least one downlink transmission unit.

Figure 4:
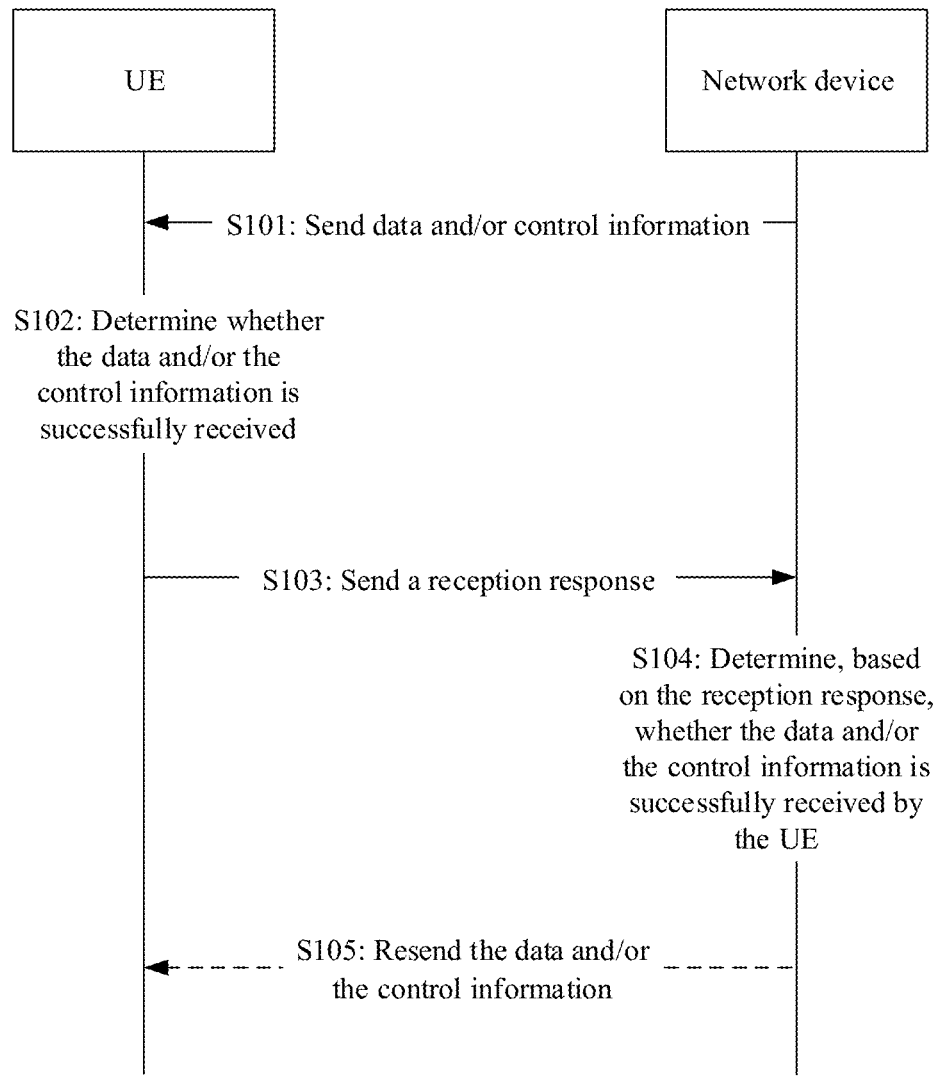
FIG. 4 is a schematic flowchart of a downlink retransmission indication method.

FIG. 4 is a schematic flowchart of a downlink retransmission indication method. As shown in FIG. 4, S101: A network device sends data and/or control information to UE on a downlink transmission unit. S102: The UE determines whether the data and/or the control information is successfully received. S103: The UE sends a reception response. If the UE successfully receives the data and/or the control information, the UE may send, to the network device on an uplink transmission unit such as a physical uplink control channel (PUCCH)/physical uplink shared channel (PUSCH), a reception response, for example, an ACK, indicating successful reception. If the UE unsuccessfully receives the data and/or the control information, the UE may send, to the network device on an uplink transmission unit, a reception response, for example, a NACK, indicating failed reception. S104: If the UE successfully sends the reception response, the network device determines, based on the reception response, whether the data and/or the control information is successfully received by the UE. For example, if the network device receives the ACK, the network device determines that the data and/or the control information is successfully received by the UE 102, and no longer sends the data and/or the control information. If the network device receives the NACK, the network device may resend the data and/or the control information. In addition to sending or resending the data and/or the control information, the network device may further send control information of the data and/or the control information, to indicate a manner in which the UE is to send the reception response. The control information and the data and/or the control information indicated in the control information may be or may not be sent on a same downlink transmission unit, may be or may not be sent by using a same piece of information or signaling, and may be or may not be sent at the same time. These are not limited in this application. With reference to FIG. 3 and FIG. 4, in this application, the reception response may be a reception response for a carrier, may be a reception response for a downlink transmission unit, or may be a reception response for a downlink transmission unit set.

It should be understood that an HARQ and an ARQ may be applicable to this application. When the HARQ is applicable to this application, the downlink transmission unit set is a set of downlink transmission units scheduled by the network device to the UE, and HARQ responses corresponding to data carried in the downlink transmission units are located on a same uplink transmission unit. The determining of the uplink transmission unit may be indicated by the network device. Optionally, the network device indicates, by using signaling on each downlink transmission unit in the downlink transmission unit set, an uplink transmission unit on which the UE is to feed back an HARQ response corresponding to the downlink transmission unit. The signaling may be downlink control information (DCI) or other signaling. If DCI signaling is used for indication, a quantity of downlink transmissions that need to be fed back may be indicated based on a downlink assignment index (DAI) field in the DCI signaling, and a quantity of indicated bits is a quantity of bits to be fed back by the UE. Alternatively, a PDSCH-to-HARQ feedback timing indicator field defined in a DCI format in 38.213 may be used for indication. Further, when the UE receives, on an $n^{th}$ downlink transmission unit, DCI that is included in the PDSCH-to-HARQ_feedback timing indicator and schedules a downlink transmission for the UE, the UE feeds back, on an uplink transmission unit in n+k transmission units, an HARQ response for the downlink transmission bit based on a value k indicated by the PDSCH-to-HARQ_feedback timing indicator. Optionally, the network device may indicate a configuration mode through preconfiguration, for example, TDD configuration in LTE. The network device notifies configuration information of the TDD configuration by using a system message, and the UE can learn of, based on the configuration indication, an uplink transmission unit on which an HARQ response corresponding to a downlink transmission on each downlink transmission unit should be transmitted. Optionally, the preconfiguration may alternatively be indicated in another manner. For example, the preconfigured configuration information is notified to the UE by using common control information (group common DCI) and/or higher layer configuration information (RRC signaling). Based on the information, the UE can learn of an uplink transmission unit on which an HARQ response corresponding to a downlink transmission on each downlink transmission unit should be transmitted. Optionally, a default mechanism may also be used. For a downlink transmission received on an $n^{th}$ transmission unit, the UE sends, by default, an HARQ response for the downlink transmission on an $(n+k)^{th}$ transmission unit (for example, k=4). Optionally, a correspondence between the downlink transmission unit and the uplink transmission unit on which the corresponding HARQ response is located may also be indicated in some other manners. This is not specifically limited in the present invention.

In a communications network using a time division duplex (time division duplex, TDD) mode, reception responses for a plurality of downlink transmission units may be sent on a same uplink transmission unit. The UE feeds back a reception response at a granularity of a downlink transmission unit set. When the UE unsuccessfully sends a reception response or the network device unsuccessfully receives a reception response, the network device needs to request the UE to resend the reception response. If a manner used by the UE to resend the reception response is not defined, disorder or an error may occur in subsequent communication, wasting a communication resource. That the UE unsuccessfully sends a reception response includes that the UE does not send the reception response and/or the reception response sent by the UE is unsuccessfully received by the network device. That the network device unsuccessfully receives the reception response includes that the network device does not receive the reception response and/or the reception response received by the network device cannot be correctly parsed. If the network device and/or the UE are/is deployed in a system in which an unlicensed spectrum is used, before sending the reception response, the UE monitors whether the unlicensed spectrum is idle (for example, monitors whether an uplink transmission unit is idle). If the unlicensed spectrum is not idle, the UE does not send the reception response. This mechanism in which monitoring is performed before sending is performed is referred to as listen before talk (LBT for short). During LBT, because a channel (uplink transmission unit) occupation status is uncertain, the network device or the UE cannot always send a reception response in time. Consequently, disorder or an error is more likely to occur in subsequent transmission. For example, when the UE has not sent a reception response for a previous downlink transmission unit set, and the UE needs to send a reception response for a current downlink transmission unit set, the UE does not know how to send the two reception responses.

According to the indication method provided in this application, a quantity of downlink transmission unit sets and/or downlink transmission unit sets for which a reception response is sent and an uplink transmission unit on which the reception response is sent are indicated to the UE. This avoids a problem of communication disorder that occurs when a reception response is not sent or is not successfully received by the network device. It should be understood that a downlink transmission unit set in this application may be understood as a feedback window or a window.

The following describes the technical solutions in this application with reference to the accompanying drawings.

Figure 5:
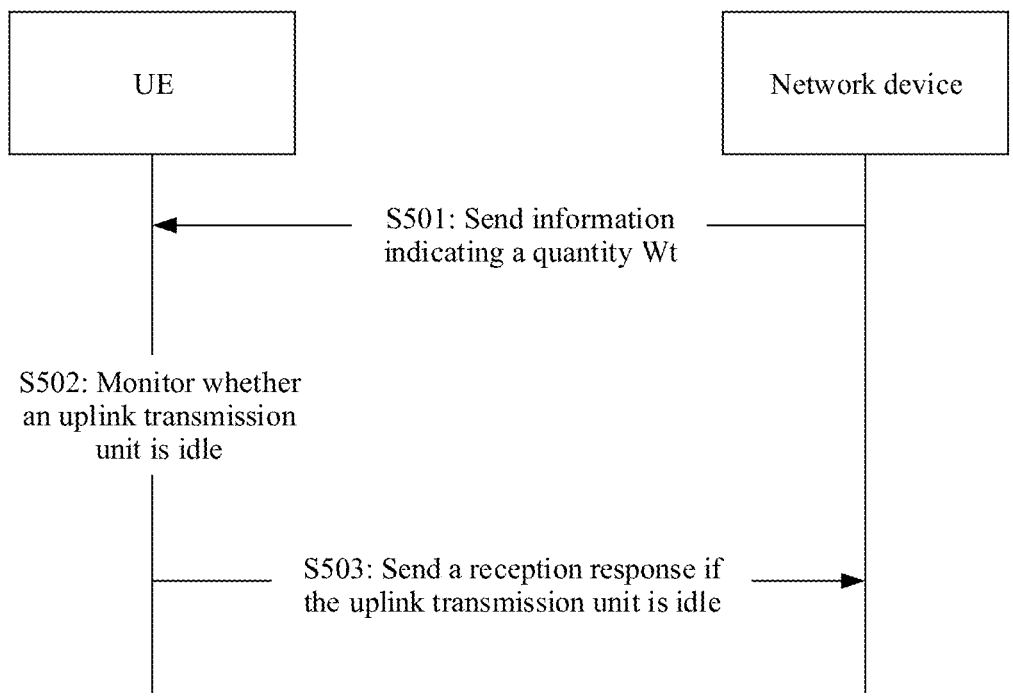
FIG. 5 is a schematic flowchart of an indication method according to this application.

FIG. 5 is a schematic flowchart of an indication method according to this application. As shown in FIG. 5, the indication method includes the following steps.

Figure 7A:
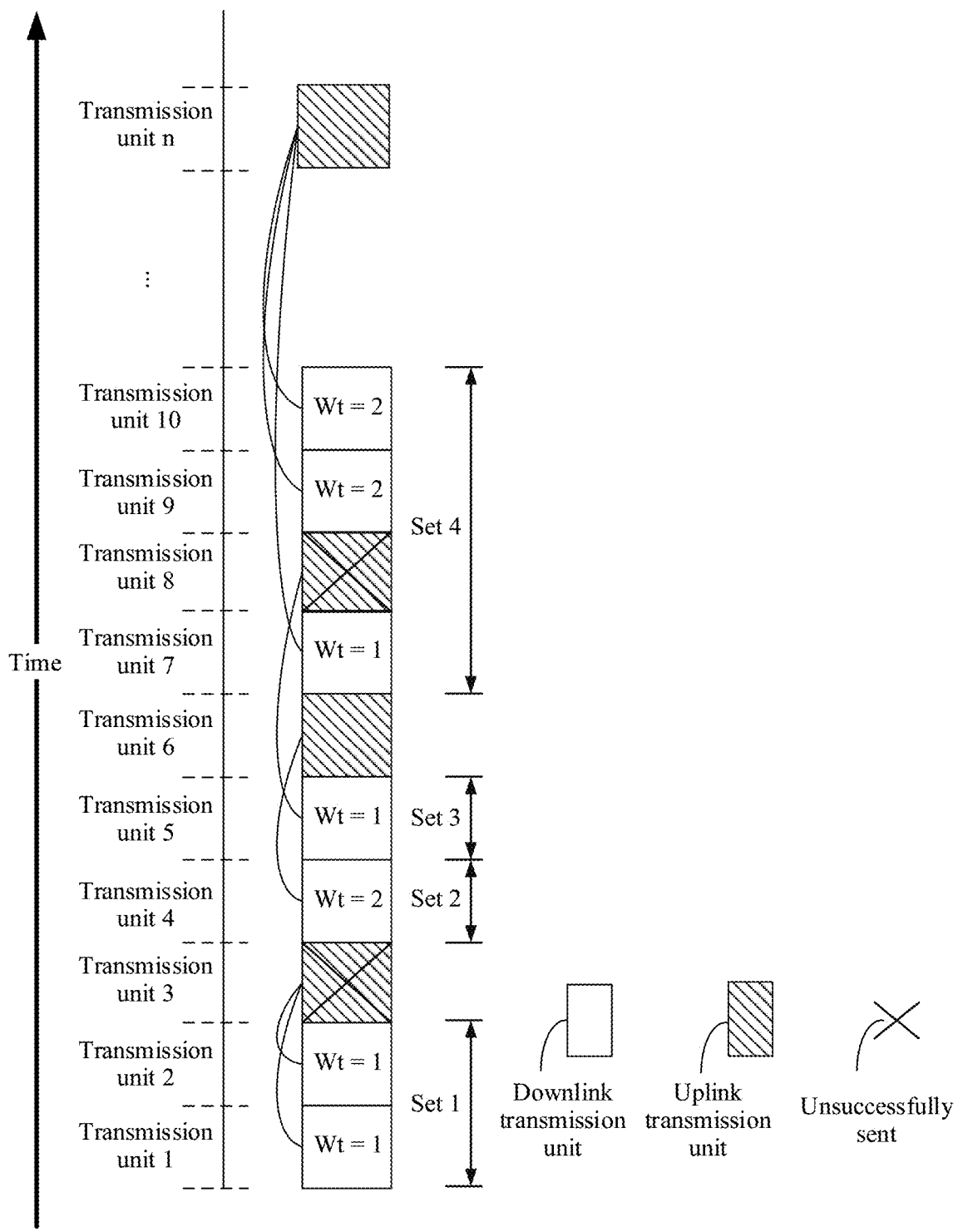
FIG. 7A to 7D are a schematic diagram of an indication method according to this application.

S501: UE receives, on one or more downlink transmission units included in a first downlink transmission unit set, information that is sent by a network device and that indicates a quantity Wt, where Wt is a positive integer greater than or equal to 1. It should be understood that Wt may alternatively be a negative integer, 0, or the like. This is not limited in this application. When Wt is 0, it may be indicated that a reception response for a current downlink transmission unit set is not to be transmitted, or a reception response for a current downlink transmission unit set needs to wait for an indication of other signaling before being transmitted. The information for indicating the quantity Wt is used to indicate the UE to send a reception response for Wt downlink transmission unit sets on an uplink transmission unit corresponding to the first downlink transmission unit set. FIG. 7A is used as an example. The UE receives, on two downlink transmission units, namely, a transmission unit 1 and a transmission unit 2, included in a downlink transmission unit set 1, the information that is sent by the network device and that indicates the quantity Wt. Alternatively, the UE may receive, on a downlink transmission unit, namely, a transmission unit 4, included in a downlink transmission unit set 2, the information that is sent by the network device and that indicates the quantity Wt.

In the foregoing content, how the UE learns of a quantity of downlink transmission unit sets for which feedback is required is mainly described. In the present invention, it may be further indicated that feedback needs to be made for Wu downlink transmission units. For example, DCI signaling may be used to indicate that a reception response for the Wu downlink transmission units needs to be fed back. A quantity of downlink transmission units for which a reception response needs to be fed back in one or more downlink transmission unit sets, or a quantity of information bits (which may be referred to as a quantity of bits in an HARQ-ACK feedback codebook) included in a reception response corresponding to one or more downlink transmission unit sets, may be determined based on a related indication in the DCI signaling. For example, a DAI field in DCI signaling defined in an LTE/NR system may be used. Specifically, the DAI field includes a counter DAI and a total DAI index. Optionally, the indicators of the DAI field should be updated with reference to the quantity Wt of downlink transmission unit sets that need to be responded to. For example, the total DAI is used to indicate the total quantity (Wu) of downlink transmission units that need to be responded to by the UE, where the quantity is equal to a total quantity of downlink transmission units included in the downlink transmission unit sets that need to be responded to. It may be understood that the counter DAI may also be updated with reference to the quantity Wt of downlink unit sets that need to be responded to.

According to the indication method provided in this application, a quantity of downlink transmission unit sets for which a reception response is sent and an uplink transmission unit on which the reception response is sent are indicated to the UE. This avoids a problem that communication disorder occurs when the UE does not send a reception response or a sent reception response is not successfully received by the network device, thereby reducing an error rate of an entire communications system, and improving communication quality and efficiency.

Optionally, in S502, the UE monitors whether the uplink transmission unit is idle. If the uplink transmission unit is idle, S503 is performed. If the uplink transmission unit is not idle, S503 is not performed. Generally, before sending a signal, the UE monitors whether an uplink transmission unit (for example, an unlicensed spectrum or an unlicensed channel) is idle. A busy/idle state of the unlicensed spectrum/channel may be determined based on receive power on the unlicensed spectrum/channel. If the receive power is less than a threshold, it is considered that the unlicensed spectrum/channel is in an idle state, and a signal may be sent on the unlicensed spectrum/channel; otherwise, no signal is sent.

S503: The UE sends, on the uplink transmission unit corresponding to the first downlink transmission unit set, the reception response for the Wt downlink transmission unit sets based on the information that indicates the quantity Wt and that is received on the one or more downlink transmission units. If the first downlink transmission unit set includes at least two downlink transmission units, the UE sends, on the uplink transmission unit corresponding to the first downlink transmission unit set, the reception response for the Wt downlink transmission unit sets based on the information that indicates the quantity Wt and that is received on the last downlink transmission unit included in the first downlink transmission unit set. FIG. 7A is used as an example. A downlink transmission unit set 4 includes three downlink transmission units (transmission units 7, 9, and 10). In this case, the UE sends, on an uplink transmission unit (a transmission unit n) corresponding to the downlink transmission unit set 4, a reception response for two downlink transmission unit sets, namely, a reception response for a downlink transmission unit set 3 and the downlink transmission unit set 4 based on information that indicates the quantity Wt and that is received on the last downlink transmission unit, namely, the transmission unit 10, included in the downlink transmission unit set 4.

On the unlicensed spectrum/channel/transmission unit, a probability that the UE unsuccessfully sends a reception response increases. When the UE unsuccessfully sends the reception response, the network device needs to indicate, to the UE in subsequent transmission, downlink transmission unit sets for which a reception response needs to be sent and an uplink transmission unit on which the reception response needs to be sent, thereby avoiding communication disorder and improving communication quality and efficiency.

If Wt is equal to 1, the Wt downlink transmission unit sets are the first downlink transmission unit set. FIG. 7A is used as an example. If the information that indicates the quantity Wt and that is received by the UE on the transmission units 1 and 2 is 1, that is, Wt=1, the UE needs to send a reception response for the downlink transmission unit set 1 on an uplink transmission unit (a transmission unit 3) corresponding to the downlink transmission unit set 1.

If Wt is greater than or equal to 2, and Wt on all downlink transmission units in the first downlink transmission unit set is the same, the reception response for the Wt downlink transmission unit sets includes: a reception response for a first set and a reception response for a third set, where the reception response for the first set includes a reception response for the first downlink transmission unit set; the reception response for the third set includes a reception response for Wt−1 downlink transmission unit sets; and the reception response for the Wt−1 downlink transmission unit sets includes: a response that is for the Wt−1 downlink transmission unit sets and that the network device indicates the UE to send on E uplink transmission units, where the E uplink transmission units are located before the first downlink transmission unit set, and E is less than or equal to Wt−1. Optionally, the E uplink transmission units are determined in (reverse) chronological order.

Figure 10A:
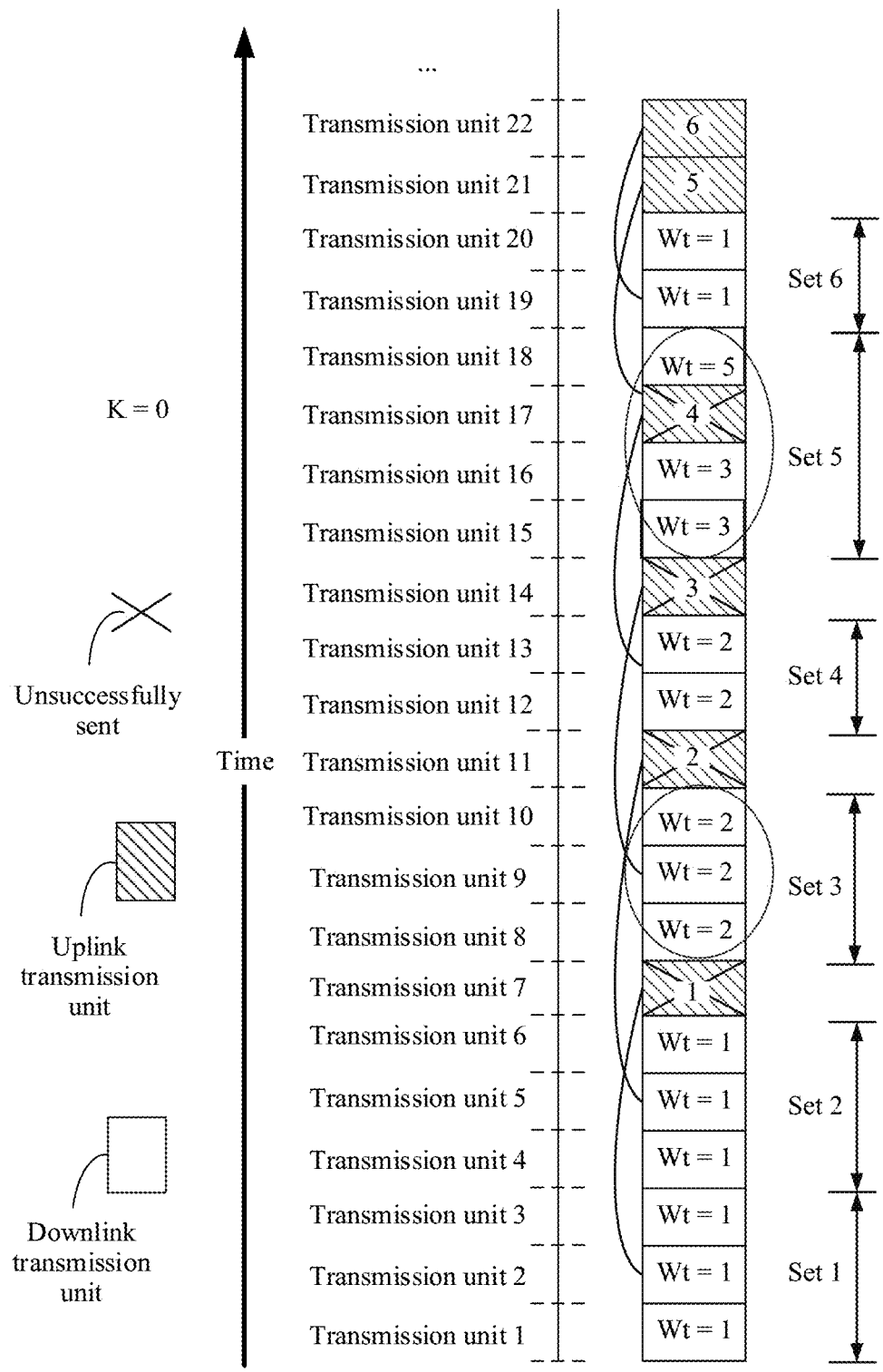
FIG. 10A to 10C are a schematic diagram of another indication method according to this application.

It may be understood that, to identify downlink transmission unit sets for which a reception response needs to be sent, the UE searches forward (in a specific order) for an uplink transmission unit. The specific order may be determined by time. Herein, determining by time may be determining in reverse chronological order. To be specific, an uplink transmission unit that is before the first downlink transmission unit set and that is closest to the first downlink transmission unit set, that is, an uplink transmission unit that is last scheduled in terms of time, is first searched for. If the quantity of downlink transmission unit sets for which the reception response needs to be sent by the UE on the uplink transmission unit is less than Wt−1, the UE searches forward, that is, searches for, on an uplink transmission unit before the last scheduled uplink transmission unit in terms of time, a quantity of downlink transmission unit sets and the specific downlink transmission unit sets for which a reception response needs to be sent by the UE. When an accumulative quantity of downlink transmission unit sets for which a response needs to be sent by the UE on an uplink transmission unit that is found forward is Wt−1 (repeated downlink transmission unit sets are counted only once), an uplink transmission unit is not searched for forward any more. The "forward" means being before the downlink transmission unit set in terms of time. FIG. 10A is used as an example. It may be considered that a transmission unit 7 is before transmission units 8, 9, and 10, the transmission unit 8 is before the transmission units 9 and 10, and the transmission unit 9 is before the transmission unit 10. When an actual situation is not considered, for clear description of an order only, it may be considered that for a downlink transmission unit set 4, a transmission unit 11 is first found. If a quantity of downlink transmission unit sets for which a reception response needs to be sent by the UE on the transmission unit 11 is less than Wt−1, the transmission unit 7 is found in reverse chronological order.

FIG. 10A is used as an example. A downlink transmission unit set 3 includes three downlink transmission units (the transmission units 8, 9, and 10), and information that indicates the quantity Wt and that is received by the UE on the transmission units 8, 9, and 10 is the same, that is, Wt is the same and is equal to 2. In this case, the reception response for the two downlink transmission unit sets includes: a reception response for a first set and a reception response for a third set, where the first set is the downlink transmission unit set 3. The network device indicates a reception response for 2−1 downlink transmission unit set, to be specific, a reception response that is for a downlink transmission unit set 1 and that is sent by the UE on an uplink transmission unit (the transmission unit 7) before the downlink transmission unit set 3. Therefore, the reception response for the third set includes a reception response for one downlink transmission unit set.

Further, optionally, for each downlink transmission unit set, a related field such as a counter DAI and/or a total DAI in the DCI signaling may be used to indicate a quantity of downlink transmission units that need to be responded to in the set at a current moment. FIG. 10A is used as an example. The downlink transmission unit set 1 includes three downlink transmission units (transmission units 1, 2, and 3). In this case, on the transmission unit 1, the total DAI is equal to 1; on the transmission unit 2, the total DAI is equal to 2, indicating that there are two downlink transmission units that need to be responded to currently; on the transmission unit 3, the total DAI is equal to 3, indicating that there are three downlink transmission units that need to be responded to currently. However, in the downlink transmission unit set 3, it indicates that there are two downlink transmission unit sets that need to be responded to, namely, the sets 1 and 3. In this case, a DAI index in the downlink transmission unit set 3 also needs to be adjusted/updated. To be specific, on the transmission unit 8, the total DAI is equal to 4; on the transmission unit 9, the total DAI is equal to 5, indicating that there are five downlink transmission units that need to be responded to currently; on the transmission unit 10, the total DAI is equal to 6, indicating that there are six downlink transmission units that need to be responded to currently. That is, the total DAI is used to indicate the total quantity of downlink transmission units that need to be responded to by the UE, where the quantity is equal to a total quantity of downlink transmission units included in one or more downlink transmission unit sets that need to be responded to.

It may be understood that indication of a quantity of response bits in a transmission unit set, for example, indication performed by using the DAI, may be all implemented in the foregoing manner in the present invention, and details are not described below again. Optionally, the indication of the quantity of response bits in the set may also be adjusted based on an existing DAI mechanism. This is not limited in the present invention.

If Wt is greater than or equal to 2, and Wt on all downlink transmission units in the first downlink transmission unit set changes for B times, the reception response for the Wt downlink transmission unit sets includes a reception response for a first set, a reception response for a second set, and a reception response for a third set, where the reception response for the first set includes a reception response for the first downlink transmission unit set; the reception response for the second set includes a reception response for A downlink transmission unit sets, and the reception response for the A downlink transmission unit sets includes: a reception response that is for C downlink transmission unit sets and that the network device indicates the UE to send on an uplink transmission unit before the $1^{st}$ downlink transmission unit existing after each of the B changes, where A, B, and C are integers greater than or equal to 1, B is less than or equal to A, and C is less than or equal to A; the third set includes a reception response for D downlink transmission unit sets, and the reception response for the D downlink transmission unit sets includes: a reception response that is for the D downlink transmission unit sets and that the network device indicates the UE to send on E uplink transmission units, where E and D are integers greater than or equal to 0, E is less than or equal to D, the D downlink transmission unit sets do not include a downlink transmission unit set included in the first set or the second set, and the E uplink transmission units are located before the first downlink transmission unit set; and A+D+1=Wt. Optionally, the E uplink transmission units are determined in (reverse) chronological order. Optionally, the uplink transmission unit before the $1^{st}$ downlink transmission unit existing after each of the B changes may specifically include: an uplink transmission unit exactly before the $1^{st}$ downlink transmission unit existing after each of the B changes. Optionally, $A=\Sigma_i C_i$, where i=1, ..., B, and $C_i$ is a reception response for Ci downlink transmission unit sets that is sent on an uplink transmission unit before the $1^{st}$ downlink transmission unit existing after the $i^{th}$ change in the B changes. When B=1, C=A.

With reference to the description that Wt on all the downlink transmission units in the first downlink transmission unit set is the same, it may be understood that, to identify downlink transmission unit sets for which a reception response needs to be sent, the UE searches forward (according to a time order, for example, in reverse chronological order) for an uplink transmission unit. First, the UE searches for, on an uplink transmission unit before (nearest) the $1^{st}$ downlink transmission unit existing after each of the B changes, a quantity of downlink transmission unit sets for which a reception response needs to be sent by the UE and the specific downlink transmission unit sets. If an accumulative quantity of downlink transmission unit sets for which a response needs to be sent on B found uplink transmission units is Wt−1 (repeated downlink transmission unit sets are counted only once), an uplink transmission unit that is out of the downlink transmission unit sets and that is before the first downlink transmission unit set is not searched any more. If an accumulative quantity of downlink transmission unit sets for which a response needs to be sent on B found uplink transmission units is less than Wt−1, an uplink transmission unit that is out of the downlink transmission unit sets and that is before the downlink transmission unit set is searched for. When an accumulative quantity of downlink transmission unit sets for which a response needs to be sent by the UE on an uplink transmission unit that is found forward is Wt−A−1 (repeated downlink transmission unit sets are counted only once), an uplink transmission unit is not searched for forward any more.

FIG. 10A is used as an example. Wt on all downlink transmission units (transmission units 15, 16, and 18) in a downlink transmission unit set 5 changes once, that is, changes from 3 on the transmission units 15 and 16 to 5 on the transmission unit 18. In this case, a reception response for the five downlink transmission unit sets includes a reception response for a first set, a reception response for a second set, and a reception response for a third set, where the reception response for the first set includes a reception response for the downlink transmission unit set 5. The network device indicates a reception response for two downlink transmission unit sets, to be specific, a reception response that is for a downlink transmission unit set 2 and a downlink transmission unit set 4 and that is sent by the UE on an uplink transmission unit (a transmission unit 17) before the $1^{st}$ downlink transmission unit (the transmission unit 18) existing after the last change. Therefore, the reception response for the second set includes a reception response for two downlink transmission unit sets. The network device indicates a reception response for two downlink transmission unit sets, to be specific, a reception response that is for the downlink transmission unit set 1 and a downlink transmission unit set 3 and that is sent by the UE on an uplink transmission unit before the downlink transmission unit set 5. Therefore, the third set includes a reception response for two downlink transmission unit sets. The UE sends a reception response for the five downlink transmission unit sets, that is, a reception response for the downlink transmission unit sets 1 to 5, on an uplink transmission unit (a transmission unit 21) corresponding to the downlink transmission unit set 5.

As described above, to identify downlink transmission unit sets for which a reception response needs to be sent, the UE searches forward for an uplink transmission unit. If the UE obtains information about an indication offset K, the UE needs to count back by K transmission units before searching for the uplink transmission unit. It may be understood that the UE may further obtain information about an indication delay J of the network device. Due to a limitation of a processing capability of the network device, the network device has an indication delay J (or referred to as a processing delay). If the network device unsuccessfully receives a reception response on a transmission unit n, the network device cannot immediately indicate the UE, and can indicate the UE only on a transmission unit n+J at the earliest. If the transmission unit n+J is not a downlink transmission unit, indication is performed on a downlink transmission unit immediately after the transmission unit n+J.

Figure 10B:
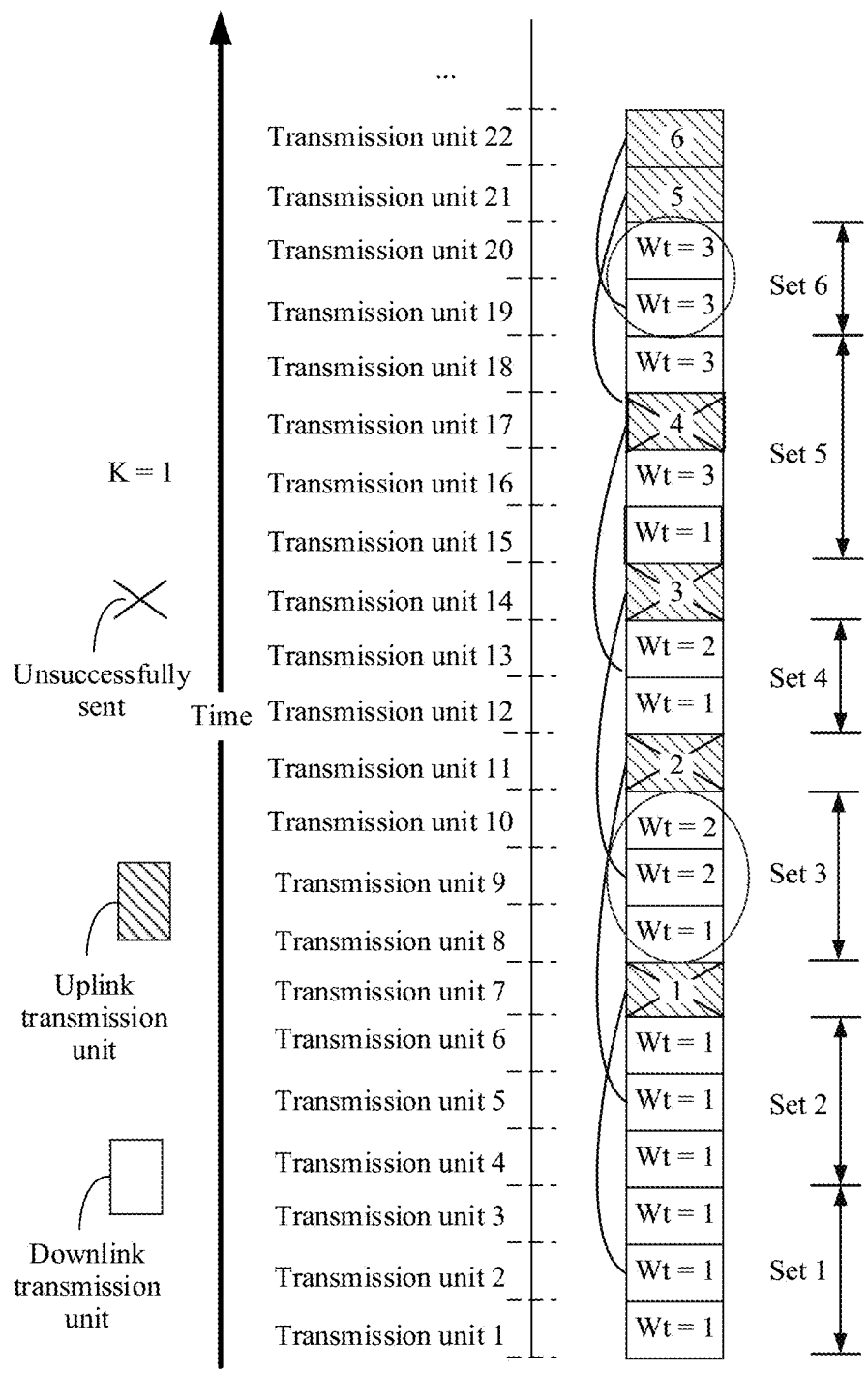
Figure 10C:
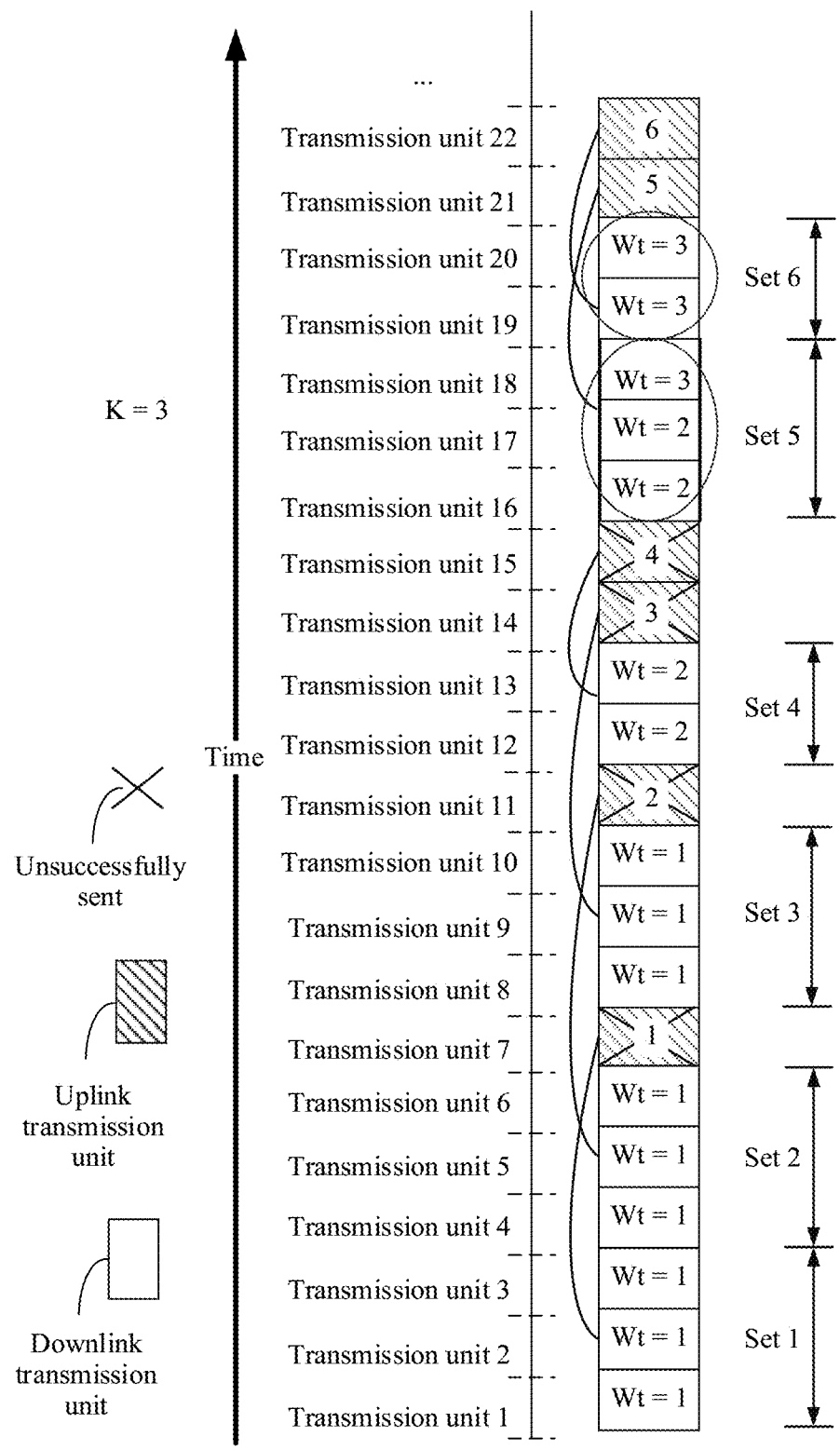

When the UE obtains the information about the indication offset K, the E uplink transmission units before the first downlink transmission unit set include: E uplink transmission units before a downlink transmission unit obtained by offsetting the first downlink transmission unit set forward by K transmission units. FIG. 10C is used as an example. K=3, and the UE receives Wt=2 on two downlink transmission units (transmission units 12 and 13) included in a downlink transmission unit set 4. The network device indicates a reception response for one downlink transmission unit set, to be specific, a reception response that is for a downlink transmission unit set 1 and that is sent by the UE on an uplink transmission unit (a transmission unit 7) before a downlink transmission unit (a transmission unit 9) obtained by offsetting the $1^{st}$ downlink transmission unit (the transmission unit 12), included in the downlink transmission unit set 4, forward by three downlink transmission units.

When the UE obtains the information indicating the indication delay J of the network device, where J is a positive integer greater than or equal to 0. If J is greater than or equal to 1, the E uplink transmission units before the first downlink transmission unit set include: E uplink transmission units before a downlink transmission unit obtained by offsetting the first downlink transmission unit set forward by J−1 transmission units. FIG. 10C is used as an example. J=4, and the UE receives Wt=2 on two downlink transmission units (transmission units 12 and 13) included in a downlink transmission unit set 4. The network device indicates a reception response for one downlink transmission unit set, to be specific, a reception response that is for a downlink transmission unit set 1 and that is sent by the UE on an uplink transmission unit (a transmission unit 7) before a downlink transmission unit (a transmission unit 9) obtained by offsetting the $1^{st}$ downlink transmission unit (the transmission unit 12), included in the downlink transmission unit set 4, forward by 4-1 downlink transmission units.

When the UE obtains the information about the indication offset K, the uplink transmission unit before the $1^{st}$ downlink transmission unit existing after each change includes: an uplink transmission unit before a downlink transmission unit obtained by offsetting the $1^{st}$ downlink transmission unit, existing after each change, forward by K transmission units. FIG. 10B is used as an example. K=1, a downlink transmission unit set 3 includes three downlink transmission units (transmission units 8, 9, and 10), and Wt changes once in the downlink transmission unit set 3. The network device indicates a reception response for one downlink transmission unit set, to be specific, a reception response that is for a downlink transmission unit set 1 and that is sent by the UE on an uplink transmission unit (a transmission unit 7) before a downlink transmission unit obtained by offsetting the $1^{st}$ downlink transmission unit (the transmission unit 9), obtained after one change, forward by one downlink transmission unit.

When the UE obtains the information indicating the indication delay J of the network device, where J is a positive integer greater than or equal to 0, the uplink transmission unit before the 1$^{st}$ downlink transmission unit existing after each change includes: an uplink transmission unit before a downlink transmission unit obtained by offsetting the 1$^{st}$ downlink transmission unit, existing after each change, forward by J−1 transmission units. FIG. 10B is used as an example. J=2, a downlink transmission unit set 3 includes three downlink transmission units (transmission units 8, 9, and 10), and Wt changes once in the downlink transmission unit set 3. The network device indicates a reception response for one downlink transmission unit set, to be specific, a reception response that is for a downlink transmission unit set 1 and that is sent by the UE on an uplink transmission unit (a transmission unit 7) before a downlink transmission unit obtained by offsetting the 1$^{st}$ downlink transmission unit (the transmission unit 9), obtained after one change, forward by 2−1 downlink transmission unit. Alternatively, it may be considered that, the network device indicates a reception response for one downlink transmission unit set, to be specific, a reception response that is for a downlink transmission unit set and that is sent by the UE on an uplink transmission unit (the transmission unit 9-2) obtained after the 1$^{st}$ downlink transmission unit (the transmission unit 9) that is obtained after one change minus J.

If the UE obtains an index, step 503 is: The UE sends, on an uplink transmission unit corresponding to the index, the reception response for the Wt downlink transmission unit sets based on the information that indicates the quantity Wt and that is received on the one or more downlink transmission units. The UE may receive the index of the downlink transmission unit set on one or more downlink transmission units. The one or more downlink transmission units may be the same as or different from the one or more downlink transmission units on which the information indicating the quantity Wt is sent. The UE may alternatively obtain the index in advance rather than receive the index sent by the network device.

According to the indication method provided in this application, the UE obtains the index, further improving accuracy of the indication method, and improving communication quality and efficiency.

Figure 6:
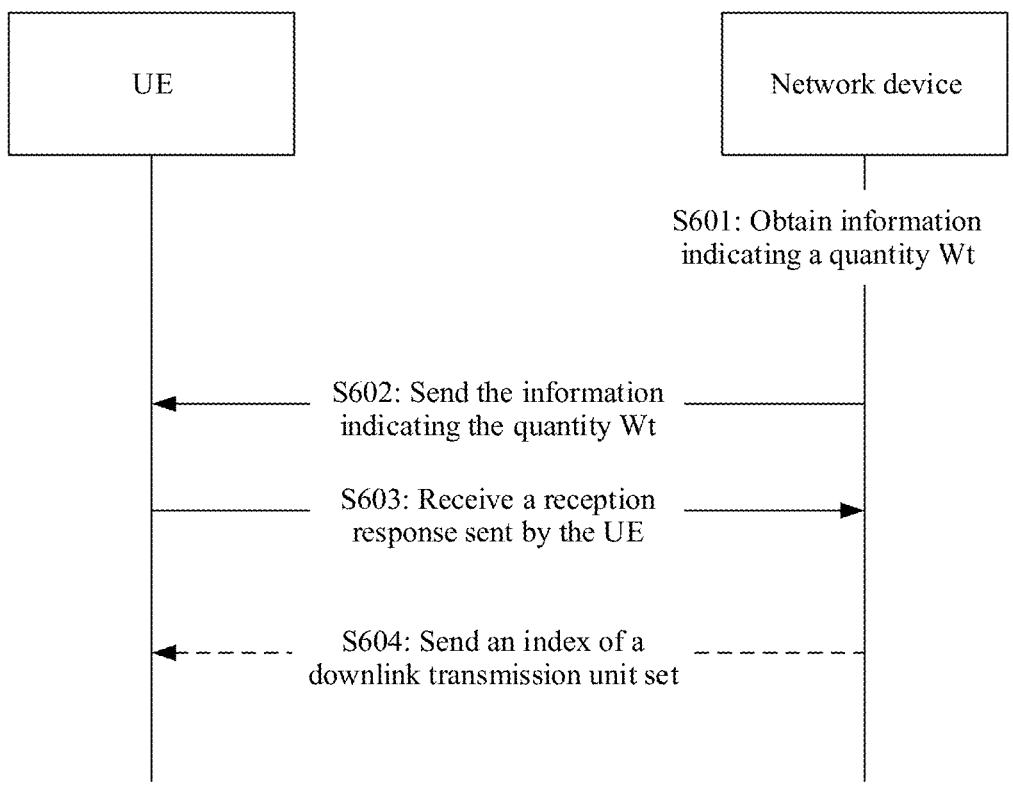
FIG. 6 is a schematic flowchart of another indication method according to this application.

FIG. 6 is a schematic flowchart of another indication method according to this application. As shown in FIG. 6, the indication method includes the following steps.

S601: A network device determines information indicating a quantity Wt, where Wt is a positive integer greater than or equal to 1. The information indicating the quantity Wt is used to indicate that the network device needs to receive a reception response for Wt downlink transmission unit sets. The reception response for the Wt downlink transmission unit sets that needs to be received includes: a reception response for a downlink transmission unit set to which a current downlink transmission unit belongs, and a reception response for Wt−1 downlink transmission unit sets that is unsuccessfully received by the network device historically. The reception response for the Wt−1 downlink transmission unit sets that is unsuccessfully received by the network device historically does not include: a reception response, sent by UE but unsuccessfully received by the network device, for one or more downlink transmission unit sets that have been indicated by the network device on one or more downlink transmission units before the downlink transmission unit set. FIG. 8C is used as an example. Information that is sent by the network device on a downlink transmission unit 7 and that indicates the quantity Wt indicates Wt=2. The reception response for the downlink transmission unit set to which the current downlink transmission unit belongs is a reception response for a downlink transmission unit set 4, and the reception response for the downlink transmission unit sets that is unsuccessfully received by the network device historically includes downlink transmission unit sets 1 and 2. However, because the network device has already indicated a reception response for the downlink transmission unit set 1 on two downlink transmission units (transmission units 4 and 5) before the downlink transmission unit set 4, the network device no longer indicates, on the downlink transmission unit 7, the UE to send the reception response for the downlink transmission unit set 1.

S602: The network device sends, to the user equipment UE, the information indicating the quantity Wt on one or more downlink transmission units included in a downlink transmission unit set.

Optionally, in S603, the network device receives, on an uplink transmission unit corresponding to the downlink transmission unit set, the reception response for the Wt downlink transmission unit sets that is sent by the UE, where one downlink transmission unit set corresponds to one uplink transmission unit.

Optionally, in S604, the network device further sends an index of the downlink transmission unit set to the UE on the one or more downlink transmission units included in the downlink transmission unit set, where one index corresponds to one downlink transmission unit set; the network device receives, on an uplink transmission unit corresponding to the index, the reception response for the Wt downlink transmission unit sets that is sent by the UE.

According to the indication method provided in this application, the network device sends the index, further improving accuracy of the indication method, and improving communication quality and efficiency.

Figure 9A:
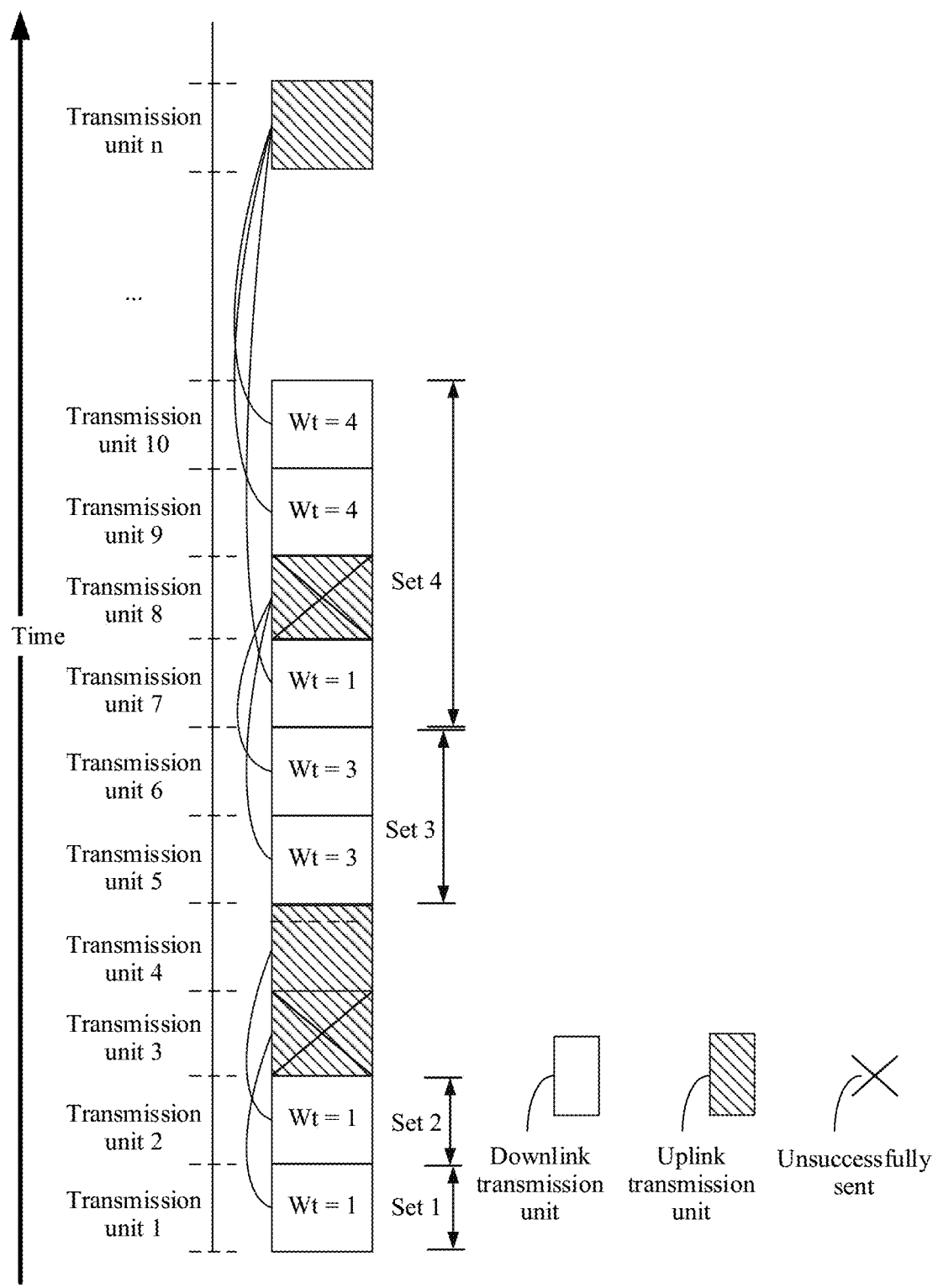
FIG. 9A to 9E are a schematic diagram of another indication method according to this application.

If the network device unsuccessfully receives a reception response for one or more downlink transmission unit sets on any one of a plurality of consecutive uplink transmission units, a reception response for one or more downlink transmission unit sets that needs to be received by the network device on each of the plurality of consecutive uplink transmission units is the reception response for the one or more downlink transmission unit sets that is unsuccessfully received. It should be understood that, "consecutive" herein refers to a case in which no downlink transmission unit is inserted between adjacent uplink transmission units. FIG. 9A is used as an example. Transmission units 3 and 4 are considered as consecutive uplink transmission units, and the transmission unit 4 and a transmission unit 8 are considered as inconsecutive uplink transmission units. The network device unsuccessfully receives the reception response for a downlink transmission unit set 1 on the transmission unit 3, and the network device successfully receives the reception response for a downlink transmission unit set 2 on the transmission unit 4. The transmission units 3 and 4 before a transmission unit 5 are two consecutive uplink transmission units. On one of the uplink transmission units, the network device unsuccessfully receives a reception response for one downlink transmission unit set. In this case, to prevent the UE from being confused, it is considered that the network device unsuccessfully receives a reception response for two downlink transmission unit sets that is sent by the UE on the transmission units 3 and 4. Therefore, the network device sends information indicating the quantity Wt on the transmission unit 5, to indicate that Wt=3.

According to the indication method provided in this application, the network device indicates downlink transmission unit sets for which a reception response needs to be received by the network device. This avoids a problem of communication disorder that occurs when a reception response is not sent by the UE or is not successfully received by the network device, reducing an error rate of an entire communications system, and improving communication quality and efficiency.

With reference to FIG. 5 and FIG. 6, the following describes the indication method in this application by using different transmission scenarios in a TDD mode as examples.

Before a specific indication method is described, FIG. 7A to FIG. 10C are described below. Lengths of time resources occupied by a downlink transmission unit and a transmission unit may be the same or may be different. Due to limited space, a downlink transmission unit set is referred to as a "set" for short. According to the drawings, a downlink transmission unit set seems to include a transmission unit. However, it should be understood that the downlink transmission unit set in this application includes only a downlink transmission unit, and does not include an uplink transmission unit. In FIG. 7A to FIG. 10C, a total quantity of downlink transmission unit sets for which feedback needs to be made by the UE on a transmission unit corresponding to a downlink transmission unit set to which a current downlink transmission unit belongs is denoted as Wt. Wt=1 indicates that the total quantity of downlink transmission unit sets for which feedback needs to be made by the UE on the transmission unit corresponding to the current downlink transmission unit set is 1, and that a reception response for one downlink transmission unit set needs to be sent.

FIG. 7A to FIG. 7D are a schematic diagram of an indication method according to this application. As shown in FIG. 7A to FIG. 7D, a transmission unit 1 and a transmission unit 2 form a downlink transmission unit set 1, a transmission unit 4 forms a downlink transmission unit set 2, a transmission unit 5 forms a downlink transmission unit set 3, and a transmission unit 7, a transmission unit 9, and a transmission unit 10 form a downlink transmission unit set 4. An uplink transmission unit 1 corresponding to the downlink transmission unit set 1 is a transmission unit 3, an uplink transmission unit 2 corresponding to the downlink transmission unit set 2 is a transmission unit 6, an uplink transmission unit 3 corresponding to the downlink transmission unit set 3 is a transmission unit 8, and an uplink transmission unit 4 corresponding to the downlink transmission unit set 4 is a transmission unit n, where n is a positive integer greater than or equal to 1.

As shown in FIG. 7A, the network device sends information indicating a quantity on the transmission units 1 and 2, and the UE obtains that Wt=1. In this case, the UE knows that a reception response for one downlink transmission unit set, that is, a downlink transmission unit set 1, is to be sent on the uplink transmission unit 1 (the transmission unit 3). The network device unsuccessfully receives the reception response for the downlink transmission unit set 1 on the transmission unit 3. The network device sends information indicating a quantity on the transmission unit 4, and the UE obtains that Wt=2. In this case, the UE knows that a reception response for two downlink transmission unit sets, that is, a reception response for the downlink transmission unit set 1 and the downlink transmission unit set 2, is to be sent on the uplink transmission unit 2 (the transmission unit 6). The network device sends information indicating a quantity on the transmission unit 5, and the UE obtains that Wt=1. In this case, the UE knows that a reception response for one downlink transmission unit set, that is, a reception response for the downlink transmission unit set 3, is to be sent on the uplink transmission unit 3 (the transmission unit 8). The UE successfully sends the reception response for the two downlink transmission unit sets on the transmission unit 6. The network device sends information indicating a quantity on the transmission unit 7, and the UE obtains that Wt=1. In this case, the UE knows that a reception response for one downlink transmission unit set, that is, a reception response for the downlink transmission unit set 4, is to be sent on the transmission unit n. The network device unsuccessfully receives, on the transmission unit 8, the reception response sent by the UE. The network device sends information indicating a quantity on the transmission unit 9, and the UE obtains that Wt=2. In this case, the UE knows that a reception response for two downlink transmission unit sets, that is, a reception response for the downlink transmission unit set 3 and the downlink transmission unit set 4, is to be sent on the transmission unit n. The network device sends information indicating a quantity on the transmission unit 10, and the UE obtains that Wt=2. In this case, the UE knows that a reception response for two downlink transmission unit sets, that is, a reception response for the downlink transmission unit set 3 and the downlink transmission unit set 4, is to be sent on the transmission unit n.

Figure 7B:
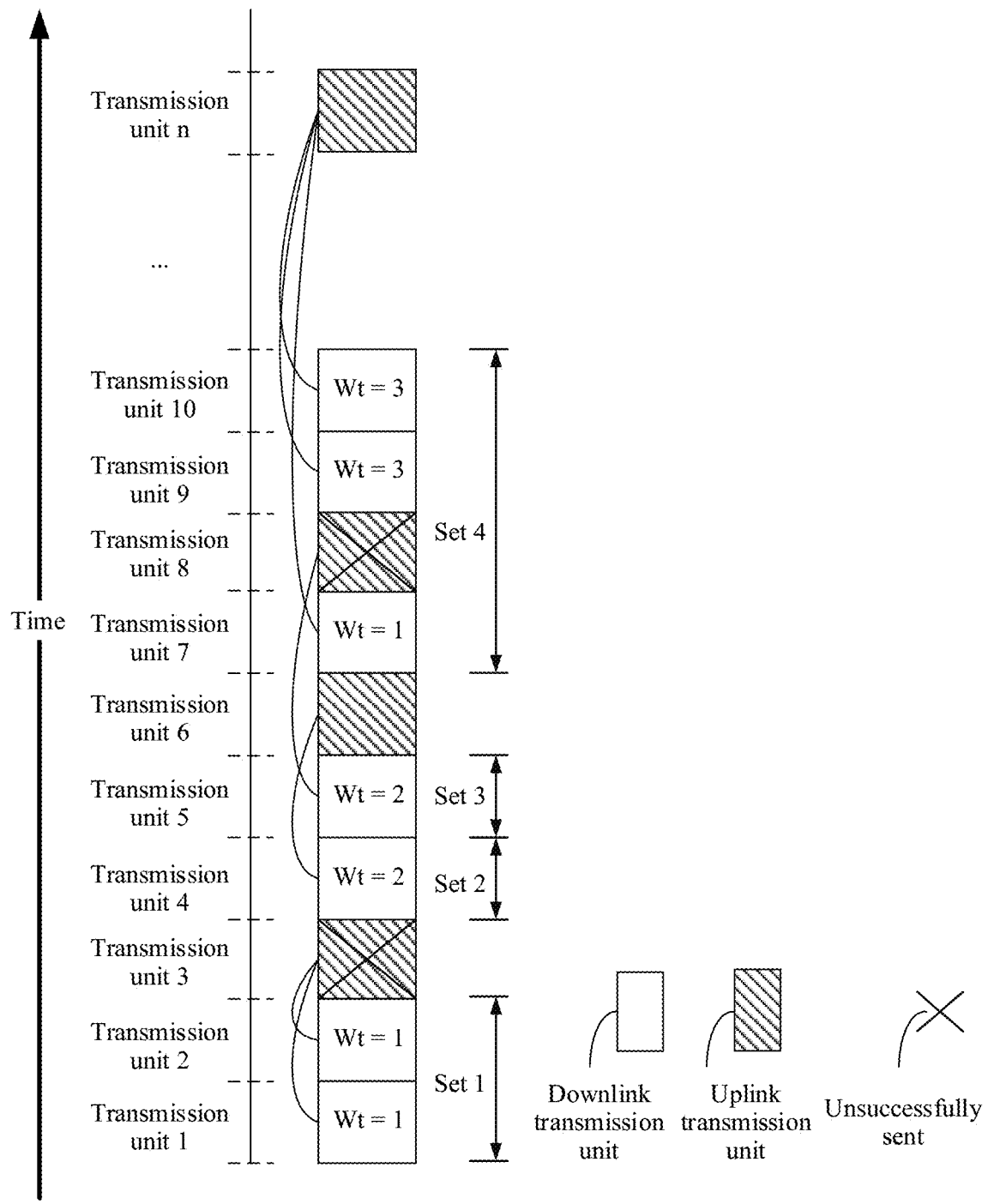

With reference to FIG. 7A, as shown in FIG. 7B, when the network device sends the information indicating the quantity on the transmission unit 5, because the network device does not receive a reception response that is for the two downlink transmission unit sets and that is sent by the UE on the transmission unit 6, it cannot be determined whether the reception response can be successfully received. Therefore, the network device may set Wt to 2. If the UE obtains that Wt=2, the UE knows that the reception response for two downlink transmission unit sets, that is, a reception response for the downlink transmission unit set 1 and the downlink transmission unit set 3, is to be sent on the transmission unit 8. The network device sends information indicating a quantity on the transmission unit 9 and the transmission unit 10, and the UE obtains that Wt=3. In this case, the UE knows that a reception response for three downlink transmission unit sets, that is, a reception response for the downlink transmission unit set 1, the downlink transmission unit set 3, and the downlink transmission unit set 4, is to be sent on the transmission unit n.

Figure 7C:
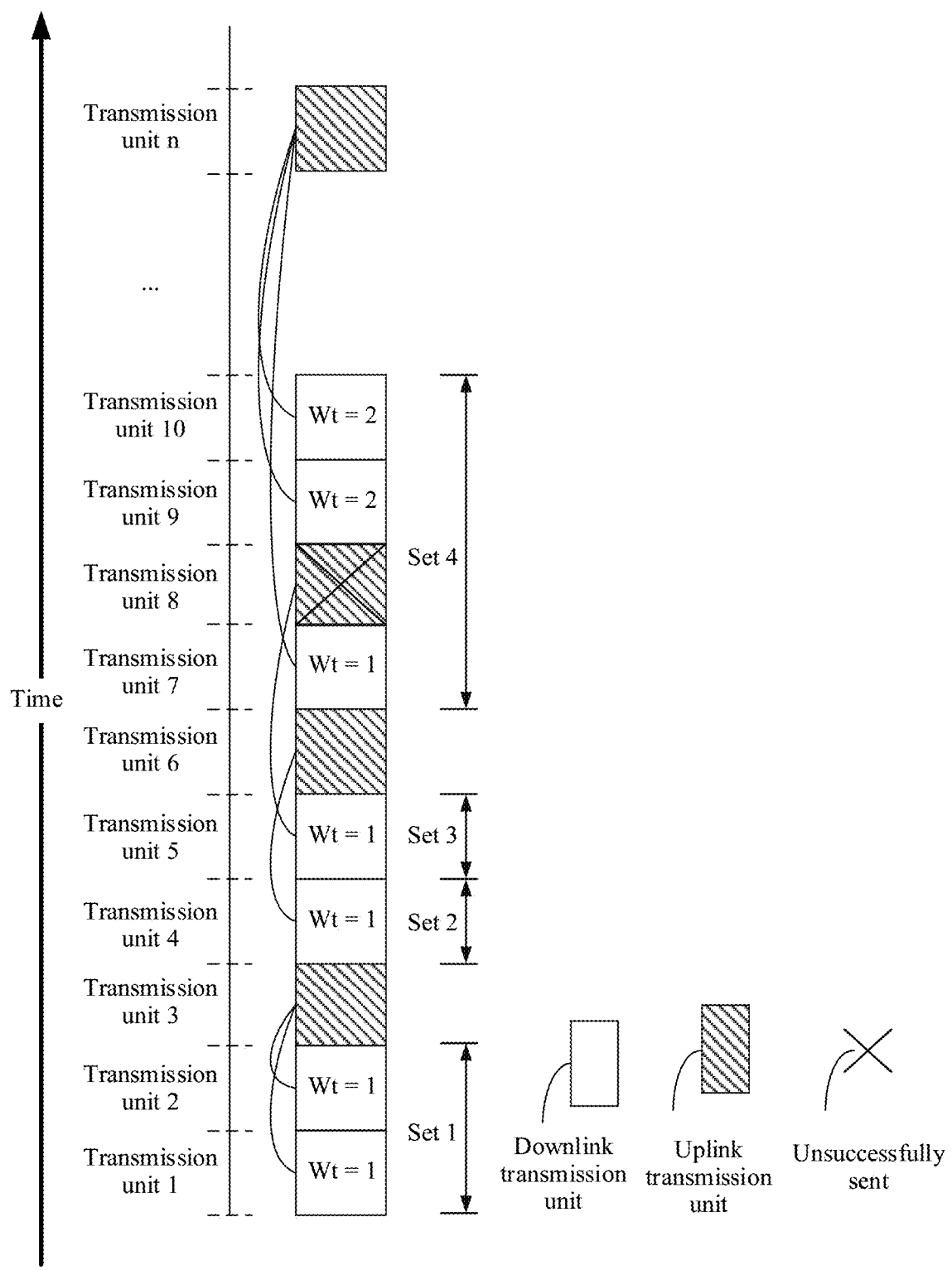

With reference to FIG. 7A, as shown in FIG. 7C, the UE successfully sends the reception response for the downlink transmission unit set 1 on the transmission unit 3. The network device sends information indicating a quantity on the transmission unit 4, and the UE obtains that Wt=1. In this case, the UE knows that a reception response for one downlink transmission unit set, that is, a reception response for the downlink transmission unit set 2, is to be sent on the transmission unit 6.

Figure 7D:
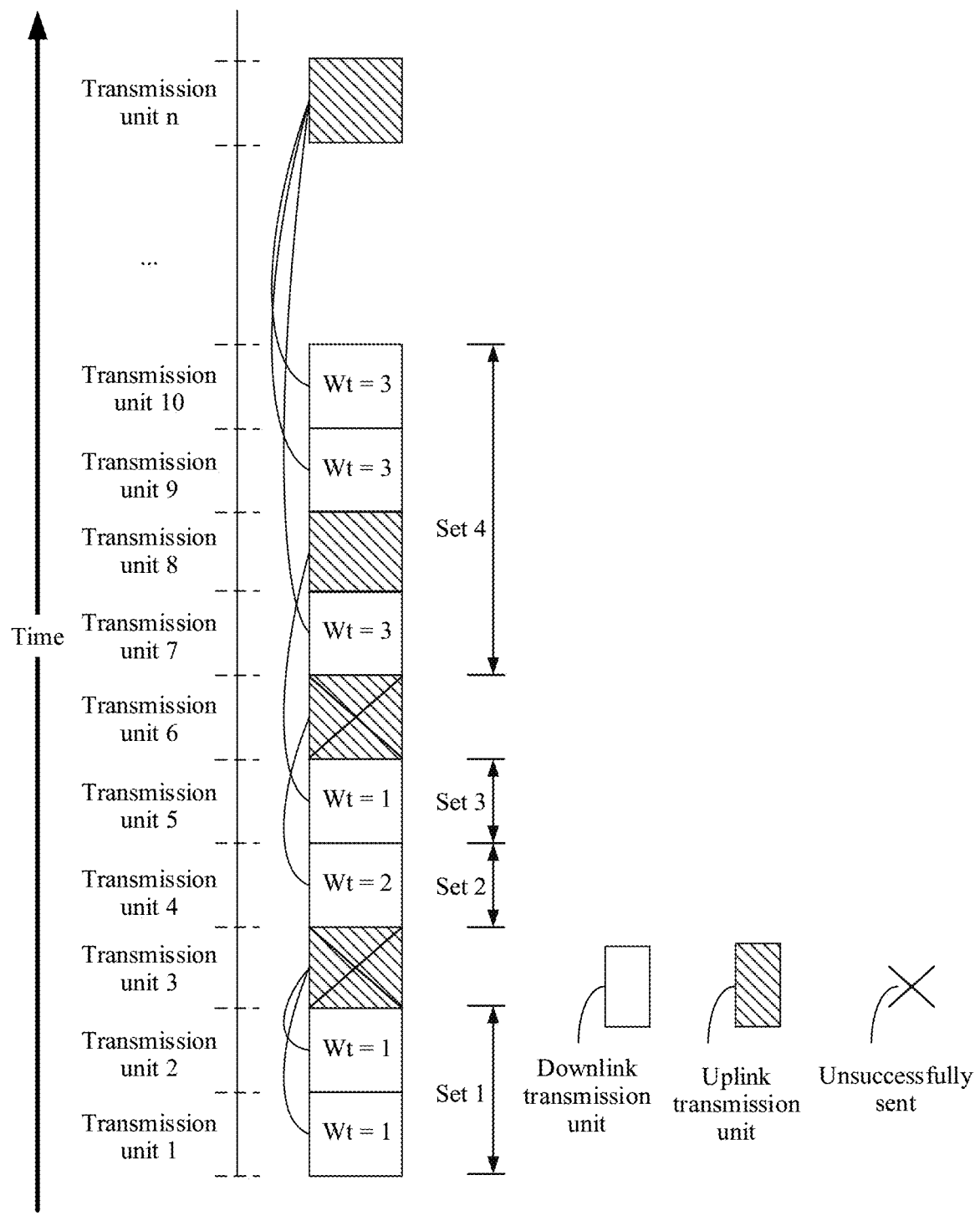

With reference to FIG. 7A, as shown in FIG. 7D, the network device unsuccessfully receives, on the transmission unit 6, the reception response for the two downlink transmission unit sets that is sent by the UE. The network device sends information indicating a quantity on the transmission unit 7, the transmission unit 9, and the transmission unit 10, and the UE obtains that Wt=3. In this case, the UE knows that a reception response for three downlink transmission unit sets, that is, a reception response for the downlink transmission unit set 1, the downlink transmission unit set 2, and the downlink transmission unit set 4, is to be sent on the transmission unit n.

With reference to the description in FIG. 7A to FIG. 7D, FIG. 8A to FIG. 8D are a schematic diagram of another indication method according to this application. As shown in FIG. 8A to FIG. 8D, a transmission unit 1 forms a downlink transmission unit set 1, a transmission unit 2 forms a downlink transmission unit set 2, a transmission unit 4 and a transmission unit 5 form a downlink transmission unit set 3, and a transmission unit 7, a transmission unit 9, and a transmission unit 10 form a downlink transmission unit set 4.

Figure 8A:
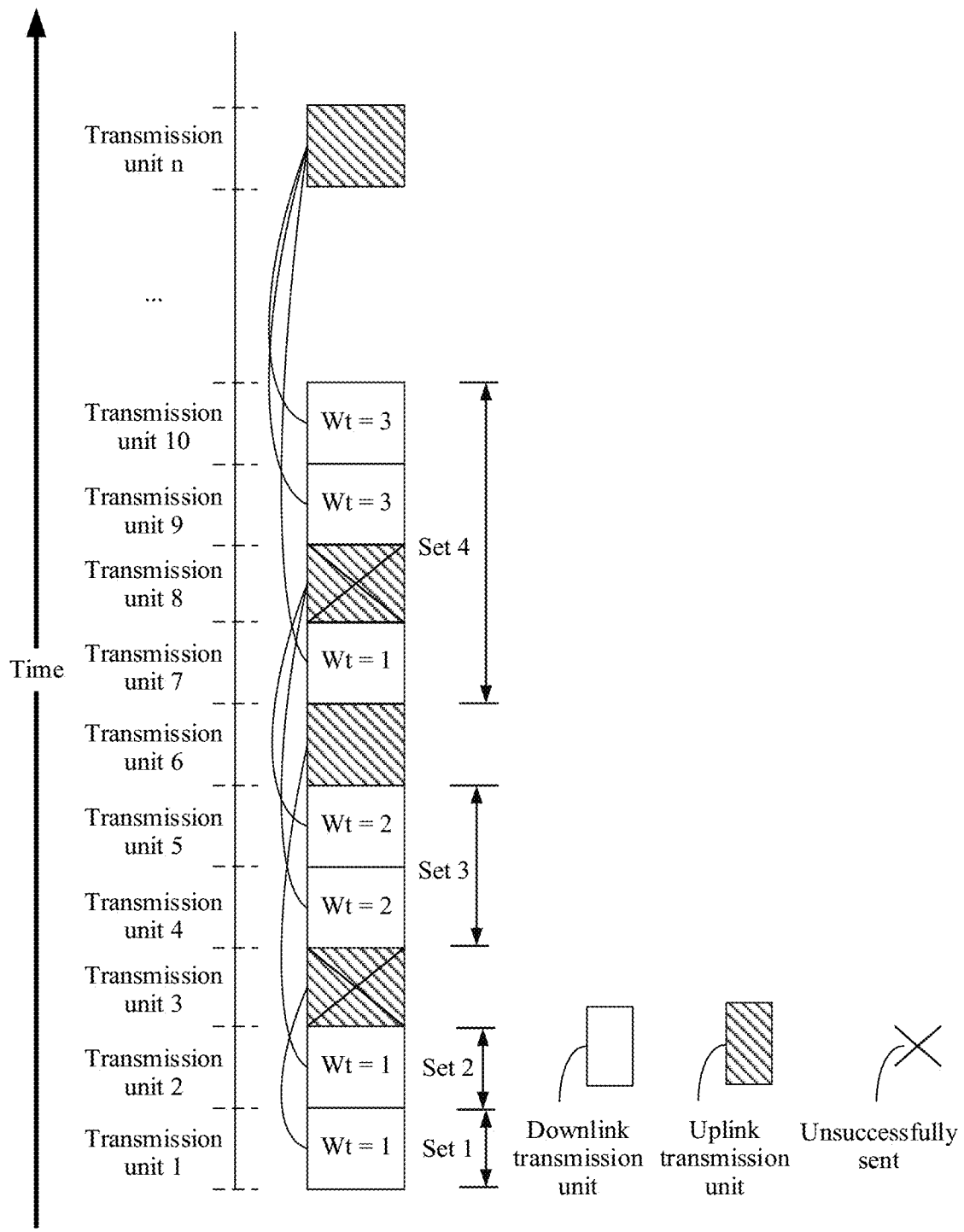
FIG. 8A to 8E are a schematic diagram of another indication method according to this application.

As shown in FIG. 8A, the network device sends information indicating a quantity on the transmission unit 2, and the UE obtains that Wt=1. In this case, the UE knows that a reception response for one downlink transmission unit set, that is, a reception response for the downlink transmission unit set 2, is to be sent on a transmission unit 6. The network device unsuccessfully receives, on the transmission unit 3, the reception response that is for the downlink transmission unit set 1 and that is sent by the UE. The network device sends information indicating a quantity on the transmission unit 4 and the transmission unit 5, and the UE obtains that Wt=2. In this case, the UE knows that a reception response for two downlink transmission unit sets, that is, a reception response for the downlink transmission unit set 1 and the downlink transmission unit set 3, is to be sent on the transmission unit 8. The UE successfully sends a reception response for one downlink transmission unit set, that is, the reception response for the downlink transmission unit set 2, on the transmission unit 6. The network device sends information indicating a quantity on the transmission unit 7, and the UE obtains that Wt=1. In this case, the UE knows that a reception response for one downlink transmission unit set, that is, a reception response for the downlink transmission unit set 4, is to be sent on the transmission unit n. Because the reception response for the downlink transmission unit set 1 has been scheduled in the indication information sent on the transmission units 4 and 5, Wt=1 on the transmission unit 7. The network device unsuccessfully receives, on the transmission unit 8, the reception response sent by the UE. The network device sends information indicating a quantity on the transmission unit 9 and the transmission unit 10, and the UE obtains that Wt=3. In this case, the UE knows that a reception response for three downlink transmission unit sets, that is, a reception response for the downlink transmission unit set 1, the downlink transmission unit set 3, and the downlink transmission unit set 4, is to be sent on the transmission unit n.

Figure 8B:
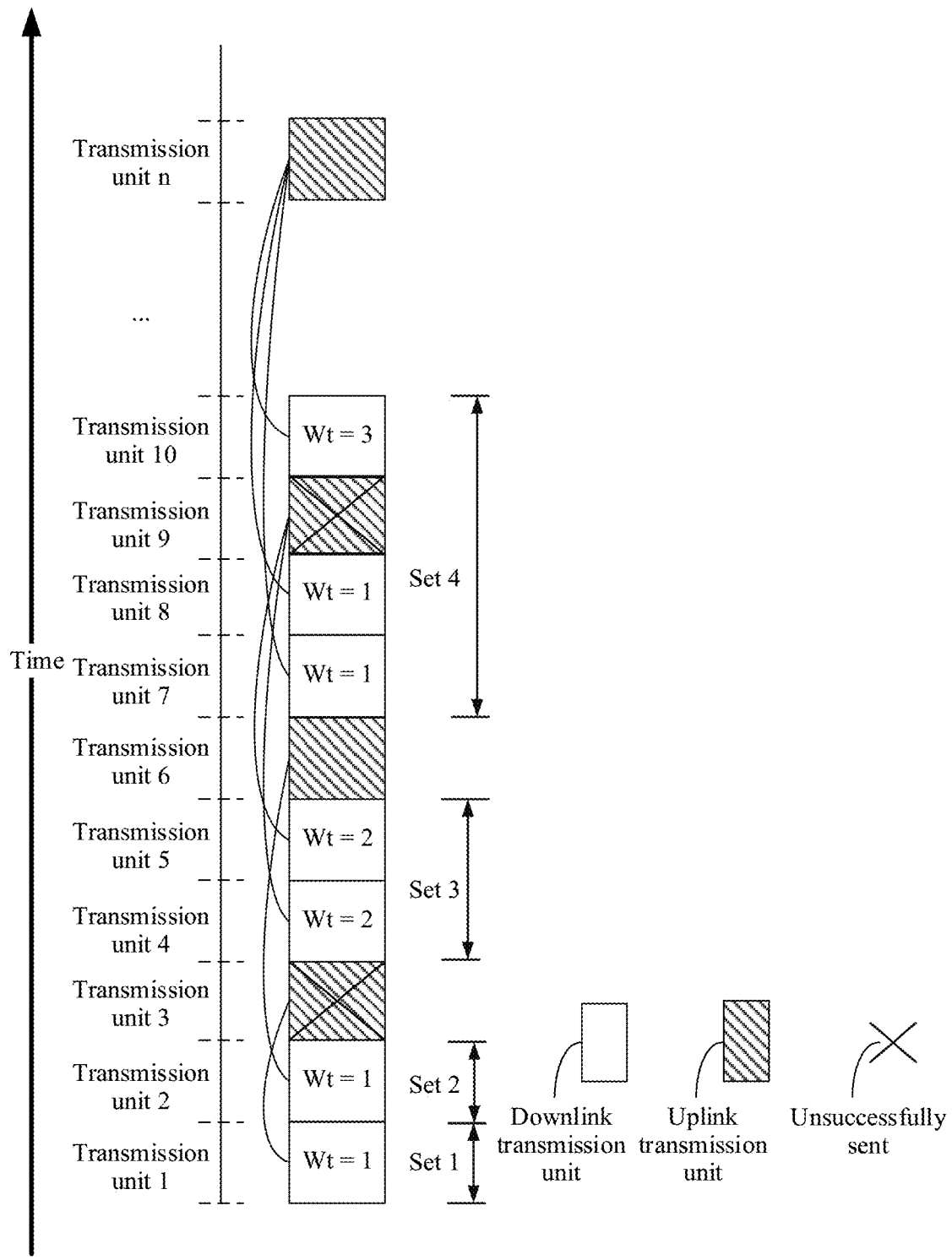
Figure 8C:
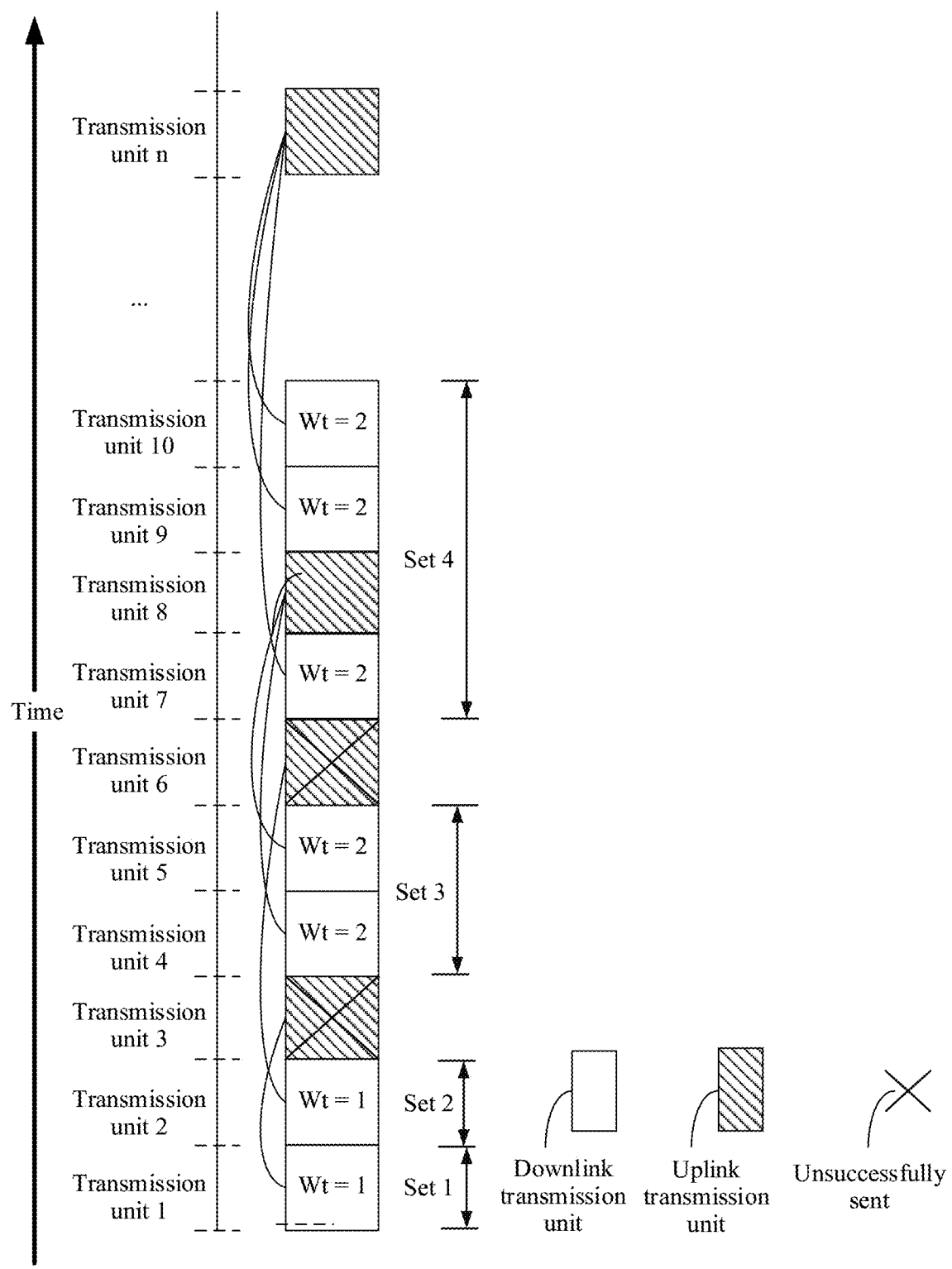

With reference to FIG. 8A, as shown in FIG. 8B, the network device sends the information indicating the quantity on the transmission unit 7 and the transmission unit 8, and the UE obtains that Wt=1. In this case, the UE knows that a reception response for one downlink transmission unit set, that is, a reception response for the downlink transmission unit set 4, is to be sent on the transmission unit n.

With reference to FIG. 8A, as shown in FIG. 8C, the network device unsuccessfully receives, on the transmission unit 6, the reception response that is for one downlink transmission unit set and that is sent by the UE, that is, unsuccessfully receives the reception response for the downlink transmission unit set 2. The network device sends information indicating a quantity on the transmission unit 7, the transmission unit 9, and the transmission unit 10, and the UE obtains that Wt=2. In this case, the UE knows that a reception response for two downlink transmission unit sets, that is, a reception response for the downlink transmission unit set 2 and the downlink transmission unit set 4, is to be sent on the transmission unit n. Because the reception response for the downlink transmission unit set 1 has been scheduled in the indication information sent on the transmission units 4 and 5, Wt=2 on the transmission unit 7. The UE successfully sends the reception response for the two downlink transmission unit sets, that is, the reception response for the downlink transmission unit set 1 and the downlink transmission unit set 3, on the transmission unit 8.

Figure 8D:
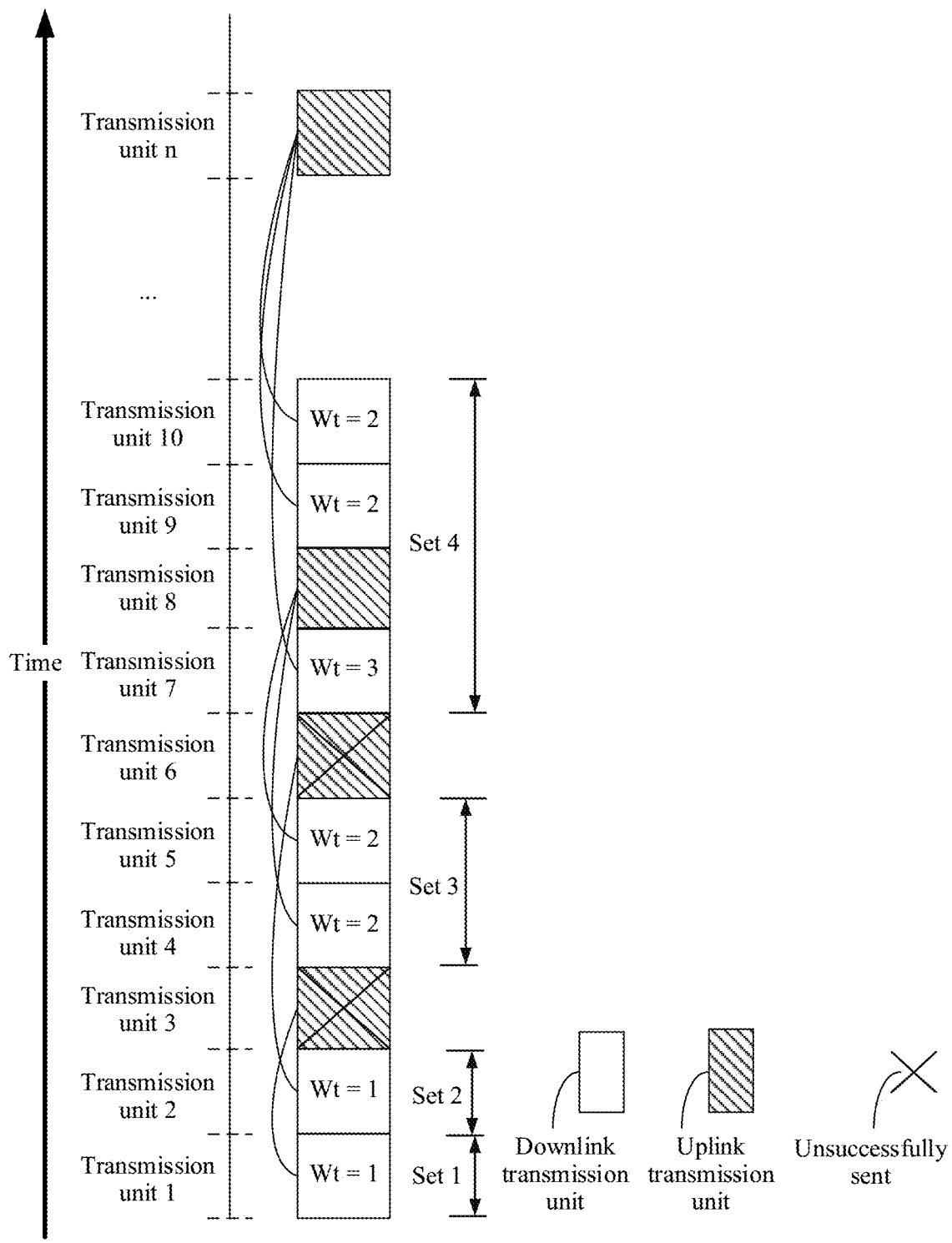

With reference to FIG. 8A, as shown in FIG. 8D, the network device unsuccessfully receives, on the transmission unit 6, the reception response that is for one downlink transmission unit set and that is sent by the UE, that is, unsuccessfully receives the reception response for the downlink transmission unit set 2. The network device sends information indicating a quantity on the transmission unit 7, and the UE obtains that Wt=3. In this case, the UE knows that a reception response for three downlink transmission unit sets, that is, a reception response for the downlink transmission unit set 1, the downlink transmission unit set 2, and the downlink transmission unit set 4, is to be sent on the transmission unit n. Because the network device has not successfully received the reception response for the downlink transmission unit sets 1 and 2 when the transmission unit 7 is scheduled, Wt=3. The UE successfully sends the reception response for the two downlink transmission unit sets, that is, the reception response for the downlink transmission unit set 1 and the downlink transmission unit set 3, on the transmission unit 8. The network device sends information indicating a quantity on the transmission unit 9 and the transmission unit 10, and the UE obtains that Wt=2. In this case, the UE knows that a reception response for two downlink transmission unit sets, that is, a reception response for the downlink transmission unit set 2 and the downlink transmission unit set 4, is to be sent on the transmission unit n.

Figure 8E:
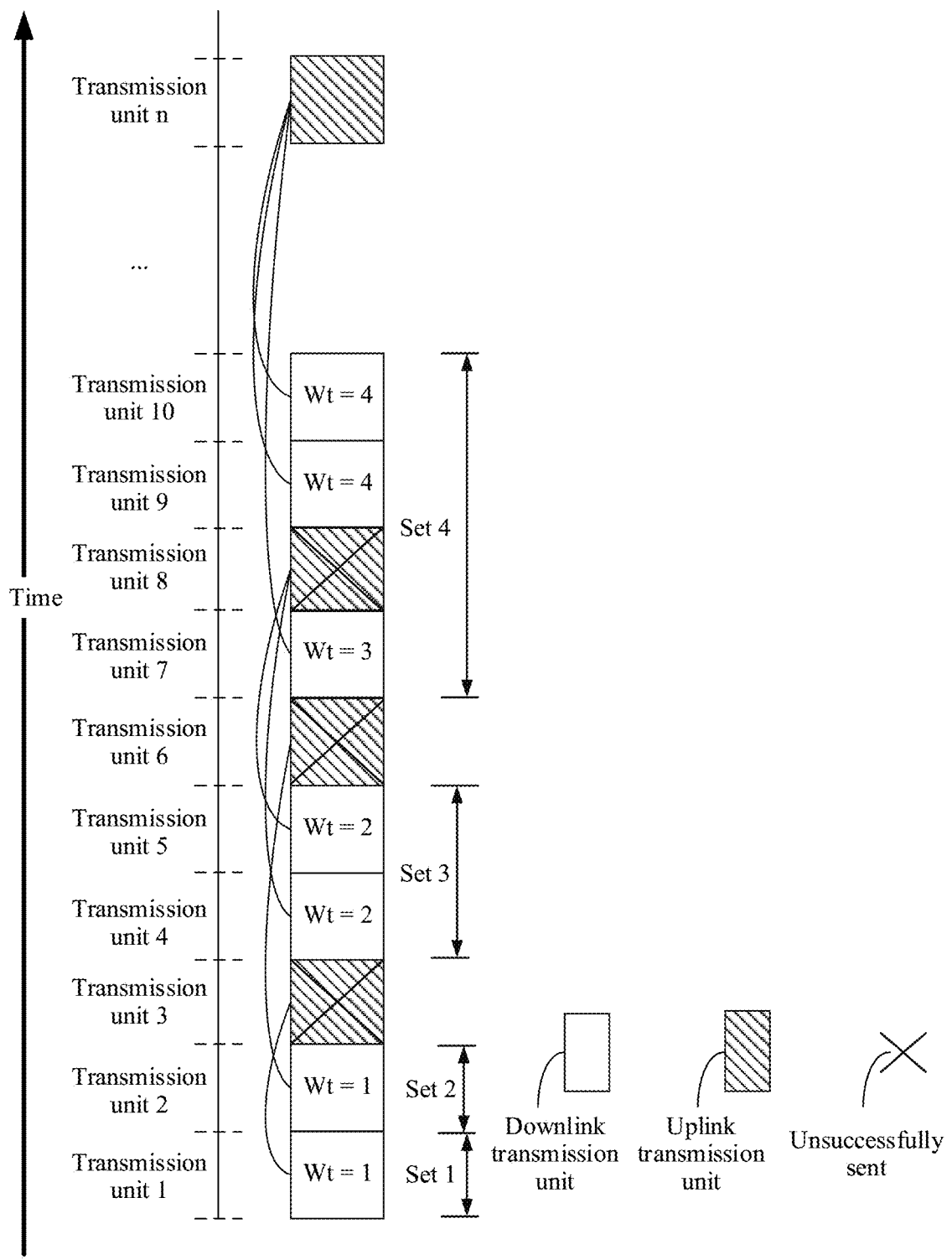

With reference to FIG. 8A, as shown in FIG. 8E, the network device unsuccessfully receives, on the transmission unit 6, the reception response that is for one downlink transmission unit set and that is sent by the UE, that is, unsuccessfully receives the reception response for the downlink transmission unit set 2. The network device sends information indicating a quantity on the transmission unit 7, and the UE obtains that Wt=3. In this case, the UE knows that a reception response for three downlink transmission unit sets, that is, a reception response for the downlink transmission unit set 1, the downlink transmission unit set 2, and the downlink transmission unit set 4, is to be sent on the transmission unit n. Because the network device has not successfully received the reception response for the downlink transmission unit sets 1 and 2 when the transmission unit 7 is scheduled, Wt=3. The network device unsuccessfully receives, on the transmission unit 8, a reception response that is for two downlink transmission unit sets and that is sent by the UE, that is, unsuccessfully receives the reception response for the downlink transmission unit set 1 and the downlink transmission unit set 3. The network device sends information indicating a quantity on the transmission unit 9 and the transmission unit 10, and the UE obtains that Wt=4. In this case, the UE knows that a reception response for four downlink transmission unit sets, that is, a reception response for the downlink transmission unit set 1, the downlink transmission unit set 2, the downlink transmission unit set 3, and the downlink transmission unit set 4, is to be sent on the transmission unit n.

With reference to the description in FIG. 7A to FIG. 7D and/or FIG. 8A to FIG. 8D, FIG. 9A to FIG. 9E are a schematic diagram of another indication method according to this application. As shown in FIG. 9A to FIG. 9E, a transmission unit 1 forms a downlink transmission unit set 1, a transmission unit 2 forms a downlink transmission unit set 2, a transmission unit 6 and a transmission unit 5 form a downlink transmission unit set 3, and a transmission unit 7, a transmission unit 9, and the transmission unit 10 form a downlink transmission unit set 4. An uplink transmission unit 1 corresponding to the downlink transmission unit set 1 is a transmission unit 3, an uplink transmission unit 2 corresponding to the downlink transmission unit set 2 is a transmission unit 4, an uplink transmission unit 3 corresponding to the downlink transmission unit set 3 is a transmission unit 8, and an uplink transmission unit 4 corresponding to the downlink transmission unit set 4 is a transmission unit n, where n is a positive integer greater than or equal to 1.

As shown in FIG. 9A, the network device sends information indicating a quantity on the transmission unit 1, and the UE obtains that Wt=1. In this case, the UE knows that a reception response for one downlink transmission unit set, that is, the downlink transmission unit set 1, is to be sent on the transmission unit 3. The network device sends information indicating a quantity on the transmission unit 2, and the UE obtains that Wt=1. In this case, the UE knows that a reception response for one downlink transmission unit set is to be sent on the transmission unit 4. The network device unsuccessfully receives, on the transmission unit 3, the reception response that is for the downlink transmission unit set 1 and that is sent by the UE. The UE successfully sends a reception response for the downlink transmission unit set 2 on the transmission unit 4. The network device sends information indicating a quantity on the transmission units 5 and 6, and the UE obtains that Wt=3. In this case, the UE knows that a reception response for three downlink transmission unit sets, that is, the downlink transmission unit sets 1, 2, and 3, is to be sent on the transmission unit 3. In this case, although the network device unsuccessfully receives only a reception response for the downlink transmission unit set 1, because there are the transmission unit 3 and the transmission unit 4 before the transmission unit 5, if Wt=2, the UE may feed back a reception response for the downlink transmission unit set 2 corresponding to the transmission unit 4, or cannot determine a transmission unit corresponding to a downlink transmission unit set, where feedback needs to be made for the downlink transmission unit set again. Therefore, the network device sends information indicating a quantity on the transmission units 5 and 6, to indicate that the UE needs to send a reception response for three downlink transmission unit sets. The network device sends information indicating a quantity on the transmission unit 7, and the UE obtains that Wt=1. In this case, the UE knows that a reception response for one downlink transmission unit set, that is, a reception response for the downlink transmission unit set 4, is to be sent on the transmission unit n. The network device unsuccessfully receives, on the transmission unit 8, the reception response that is for the downlink transmission unit sets 1, 2, and 3 and that is sent by the UE. The network device sends information indicating a quantity on the transmission units 9 and 10, and the UE obtains that Wt=4. In this case, the UE knows that a reception response for four downlink transmission unit sets, that is, a reception response for the downlink transmission unit sets 1, 2, 3, and 4, is to be sent on the transmission unit n.

Figure 9B:
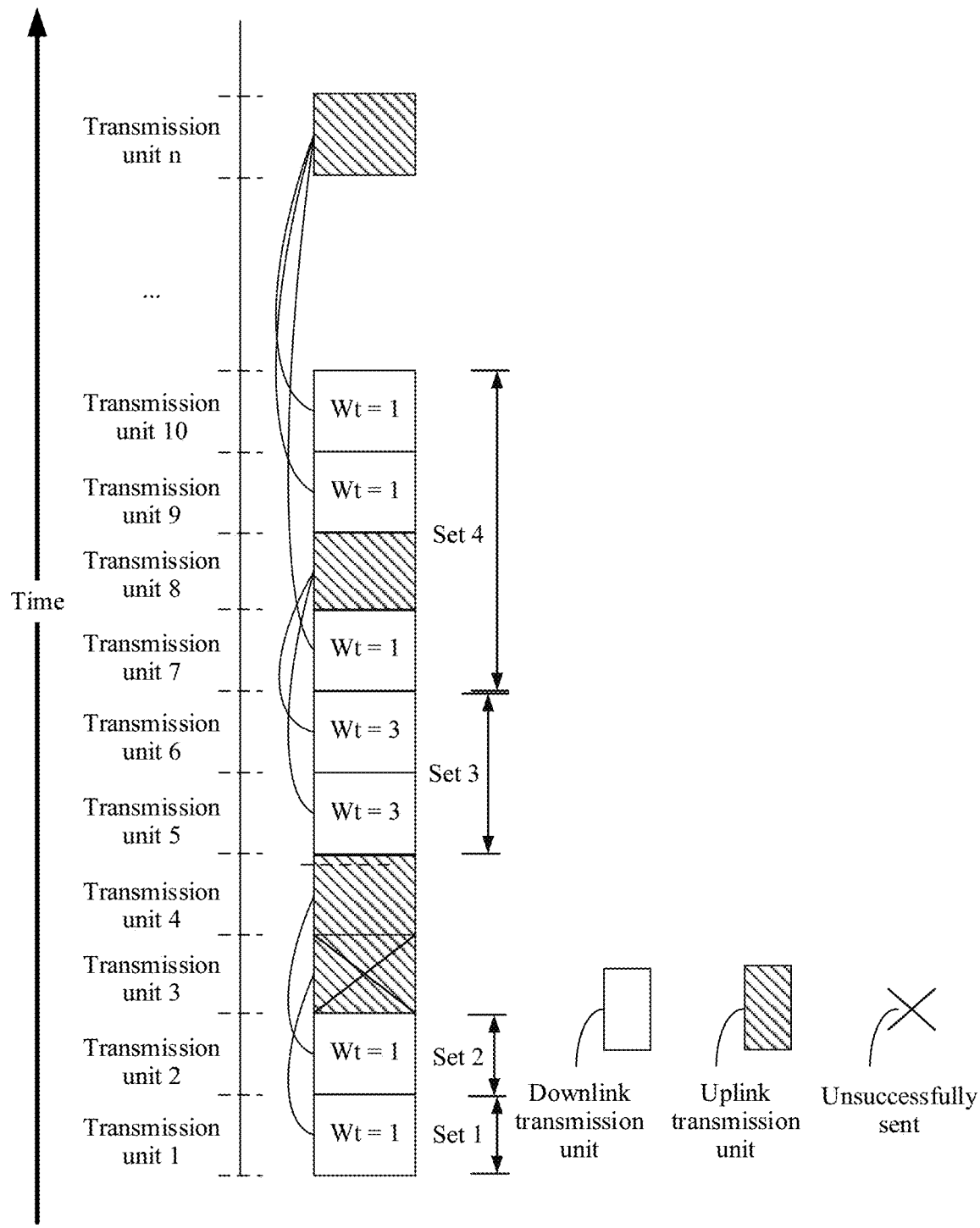

With reference to FIG. 9A, in FIG. 9B, the UE successfully sends the reception response for the downlink transmission unit set 1, 2, and 3 on the transmission unit 8. The network device sends information indicating the quantity on the transmission units 9 and 10, and the UE obtains that Wt=1. In this case, the UE knows that a reception response for one downlink transmission unit set, that is, a reception response for the downlink transmission unit set 4, is to be sent on the transmission unit n.

Figure 9C:
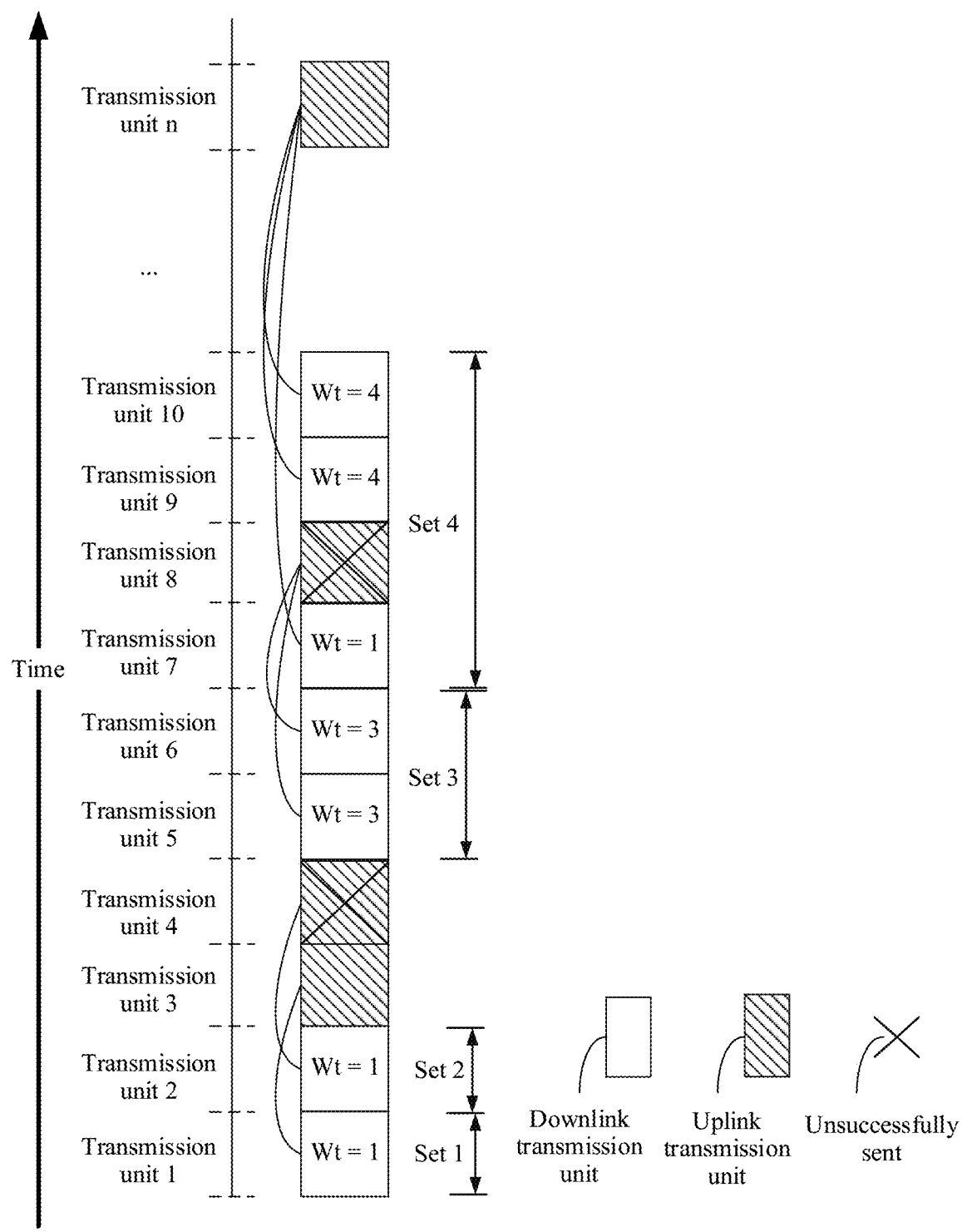

With reference to FIG. 9A, in FIG. 9C, the UE successfully sends the reception response for the downlink transmission unit set 1 on the transmission unit 3. The network device unsuccessfully receives, on the transmission unit 4, the reception response that is for the downlink transmission unit set 2 and that is sent by the UE. The network device sends information indicating a quantity on the transmission units 5 and 6, to indicate that the UE needs to send a reception response for three downlink transmission unit sets, that is, a reception response for the downlink transmission unit sets 1, 2, and 3.

Figure 9D:
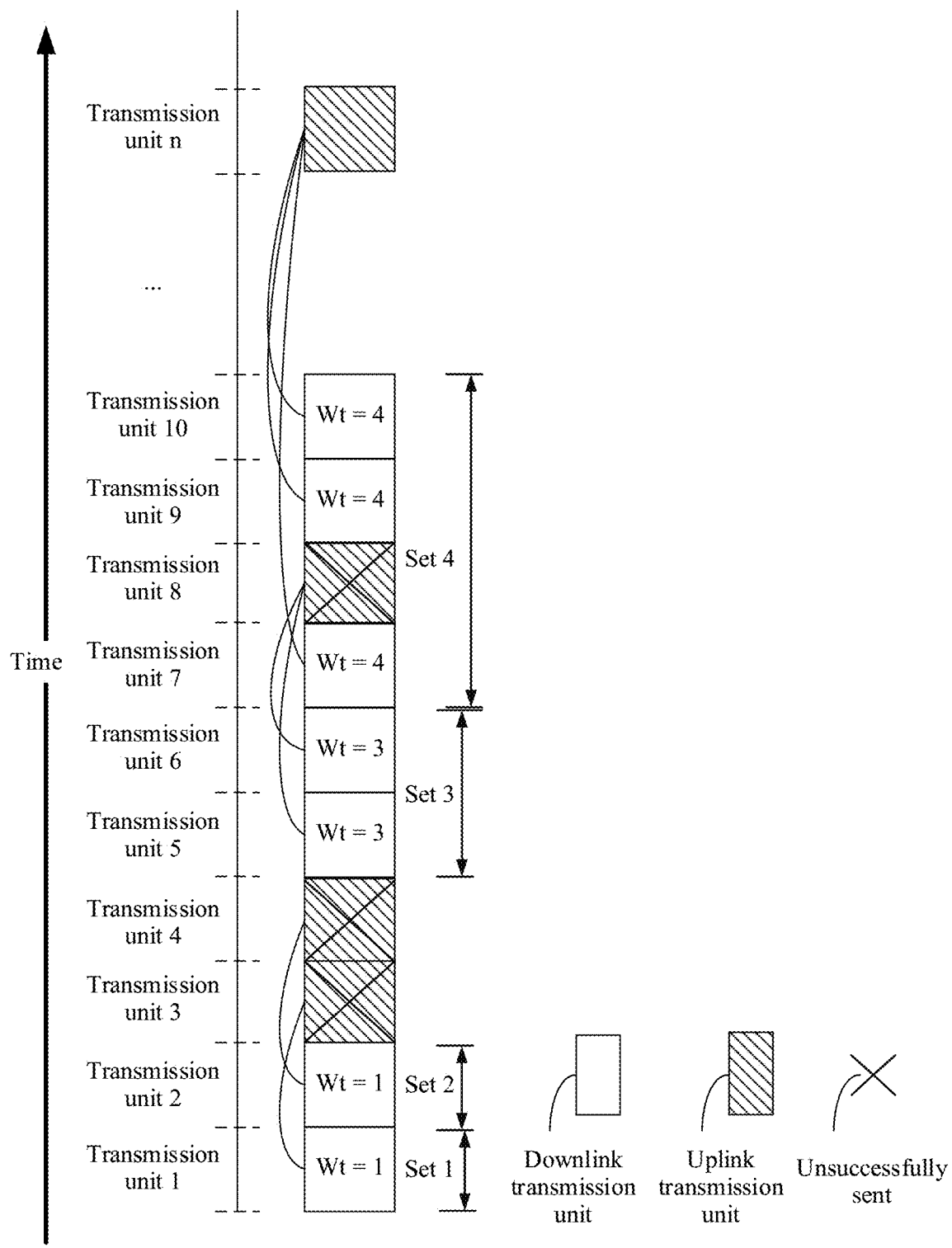

With reference to FIG. 9A, in FIG. 9D, the network device unsuccessfully receives, on the transmission unit 3, the reception response that is for the downlink transmission unit set 1 and that is sent by the UE. The network device unsuccessfully receives, on the transmission unit 4, the reception response that is for the downlink transmission unit set 2 and that is sent by the UE. The network device sends information indicating a quantity on the transmission units 5 and 6, to indicate that the UE needs to send a reception response for three downlink transmission unit sets, that is, a reception response for the downlink transmission unit sets 1, 2, and 3. The network device sends information indicating the quantity on the transmission unit 7, and the UE obtains that Wt=4. In this case, the UE knows that a reception response for four downlink transmission unit sets, that is, a reception response for the downlink transmission unit sets 1, 2, 3, and 4, is to be sent on the transmission unit n. The network device unsuccessfully receives, on the transmission unit 8, the reception response that is for the downlink transmission unit sets 1, 2, and 3 and that is sent by the UE. The network device sends information indicating the quantity on the transmission units 9 and 10, and the UE obtains that Wt=4. In this case, the UE knows that a reception response for four downlink transmission unit sets, that is, a reception response for the downlink transmission unit sets 1, 2, 3, and 4, is to be sent on the transmission unit n.

Figure 9E:
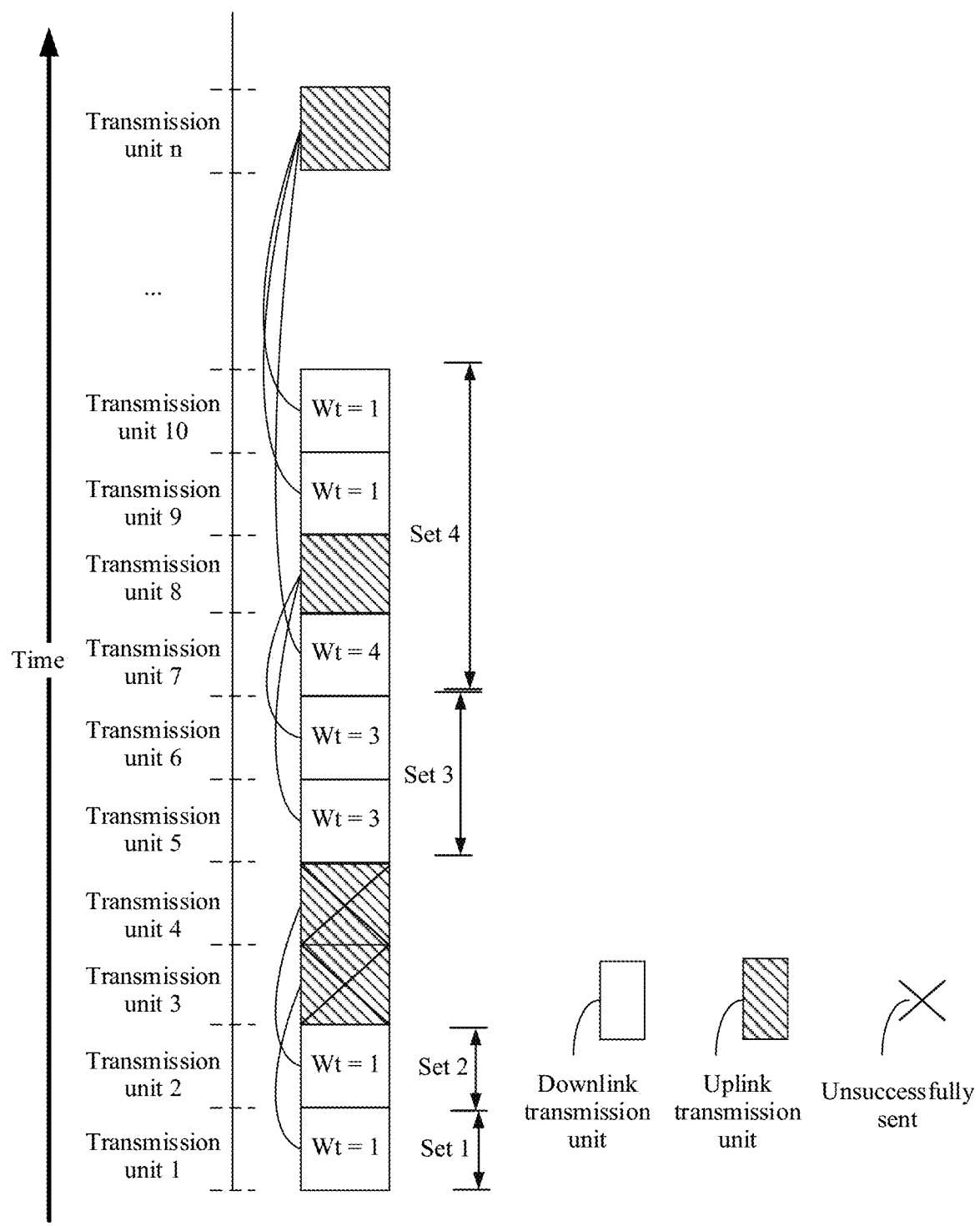

With reference to FIG. 9D, in FIG. 9E, the UE successfully sends the reception response for the downlink transmission unit set 1, 2, and 3 on the transmission unit 8. The network device sends information indicating the quantity on the transmission units 9 and 10, and the UE obtains that Wt=1. In this case, the UE knows that a reception response for one downlink transmission unit set, that is, a reception response for the downlink transmission unit set 4, is to be sent on the transmission unit n.

With reference to the description in any one of FIG. 7A to FIG. 9E, FIG. 10A to FIG. 10C are a schematic diagram of another indication method according to this application. As shown in FIG. 10A to FIG. 10C, transmission units 1, 2, and 3 form a downlink transmission unit set 1, transmission units 4, 5, and 6 form a downlink transmission unit set 2, transmission units 8, 9, and 10 form a downlink transmission unit set 3, transmission units 12 and 13 form a downlink transmission unit set 4, transmission units 15, 16 and 18 form a downlink transmission unit set 5, and transmission units 19 and 20 form a downlink transmission unit set 6. An uplink transmission unit 1 corresponding to the downlink transmission unit set 1 is a transmission unit 7, an uplink transmission unit 2 corresponding to the downlink transmission unit set 2 is a transmission unit 11, an uplink transmission unit 3 corresponding to the downlink transmission unit set 3 is a transmission unit 14, an uplink transmission unit 4 corresponding to the downlink transmission unit set 4 is a transmission unit 17, an uplink transmission unit 5 corresponding to the downlink transmission unit set 5 is a transmission unit 21, and an uplink transmission unit 6 corresponding to the downlink transmission unit set 6 is a transmission unit 22.

In FIG. 10A, the information about the indication offset K is equal to 0, that is, the network device has no indication delay. As shown in FIG. 10A, the network device sends information indicating a quantity on the transmission units 1, 2, and 3, and the UE obtains that Wt=1. In this case, the UE knows that a reception response for one downlink transmission unit set, that is, the downlink transmission unit set 1, is to be sent on the transmission unit 7. The network device sends information indicating a quantity on the transmission units 4, 5, and 6, and the UE obtains that Wt=1. In this case, the UE knows that a reception response for one downlink transmission unit set is to be sent on the transmission unit 11.

The network device unsuccessfully receives the reception response for the downlink transmission unit set 1 on the transmission unit 7. For an unsuccessfully received reception response that is for the downlink transmission unit set 1 and that is sent by the UE on the transmission unit 1, the network device may immediately perform indication on the transmission unit 8 again, that is, indicate, on the transmission unit 8, the UE to feed back the reception response for the downlink transmission unit sets 1 and 3 on the transmission unit 14. Therefore, Wt=2. The network device sends information indicating a quantity on the transmission units 8, 9, and 10, and the UE obtains that Wt=2. In this case, the UE knows that a reception response for two downlink transmission unit sets, that is, a reception response for the downlink transmission unit set 1 and the downlink transmission unit set 3, is to be sent on the transmission unit 14.

The network device unsuccessfully receives the reception response for the downlink transmission unit set 2 on the transmission unit 11. For an unsuccessfully received reception response that is for the downlink transmission unit set 2 and that is sent by the UE on the transmission unit 11, the network device may immediately perform indication on the transmission unit 12 again, that is, indicate, on the transmission unit 12, the UE to feed back the reception response for the downlink transmission unit sets 2 and 4 on the transmission unit 17. Therefore, Wt=2. The network device sends information indicating a quantity on the transmission units 12 and 13, and the UE obtains that Wt=2. In this case, the UE knows that a reception response for two downlink transmission unit sets, that is, a reception response for the downlink transmission unit set 2 and the downlink transmission unit set 4, is to be sent on the transmission unit 17.

The network device unsuccessfully receives the reception response for the downlink transmission unit sets 1 and 3 on the transmission unit 14. For an unsuccessfully received reception response that is for the downlink transmission unit sets 1 and 3 and that is sent by the UE on the transmission unit 14, the network device may immediately perform indication on the transmission unit 15 again, that is, indicate, on the transmission unit 15, the UE to feed back the reception response for the downlink transmission unit sets 1, 3, and 5 on the transmission unit 17. Therefore, Wt=3.

The network device unsuccessfully receives the reception response for the downlink transmission unit sets 2 and 4 on the transmission unit 17. For an unsuccessfully received reception response that is for the downlink transmission unit sets 2 and 4 and that is sent by the UE on the transmission unit 17, the network device may immediately perform indication on the transmission unit 18 again, that is, indicate, on the transmission unit 18, the UE to feed back the reception response for the downlink transmission unit sets 2 and 4 on the transmission unit 21. In addition, a reception response for the downlink transmission unit sets 1, 3, and 5 is not successfully received by the network device, either, and is not indicated again. Therefore, Wt=5. The network device sends information indicating the quantity on the transmission unit 18, and the UE obtains that Wt=5. In this case, the UE knows that a reception response for five downlink transmission unit sets, that is, a reception response for the downlink transmission unit sets 1, 2, 3, 4, and 5, is to be sent on the transmission unit 21. It should be understood that, because the transmission units 15, 16, and 18 belong to a same downlink transmission unit set, it is considered that, if sending of a reception response for the downlink transmission unit sets 1, 3, and 5 is indicated on the transmission unit 15 and 16, the network device considers that indication of the downlink transmission unit sets 1, 3, and 5 is repeated and is not new indication on the downlink transmission unit 18.

The network device sends information indicating the quantity on the transmission units 19 and 20, and the UE obtains that Wt=1. In this case, the UE knows that a reception response for one downlink transmission unit set, that is, the downlink transmission unit set 6, is to be sent on the transmission unit 22.

With reference to FIG. 10A, as shown in FIG. 10B, the information about the indication offset K in FIG. 10B indicates that K=1, that is, a delay of the network device is two transmission units. As shown in FIG. 10B:

The network device unsuccessfully receives the reception response for the downlink transmission unit set 1 on the transmission unit 7. For an unsuccessfully received reception response that is for the downlink transmission unit set 1 and that is sent by the UE on the transmission unit 7, the network device cannot immediately perform indication on the transmission unit 8 again. That is, Wt indicated on the transmission unit 8 is still 1. The network device may indicate on a transmission unit 7+2 that the UE needs to send a reception response for two downlink transmission unit sets, that is, indicate on a transmission unit 9 that the UE feeds back a reception response for the downlink transmission unit sets 1 and 3 on the transmission unit 14. The UE obtains that Wt=2. Because Wt changes once, a reception response that is for one downlink transmission unit set and that is obtained by the UE is a reception response that is for one downlink transmission unit set and that needs to be fed back on an uplink transmission unit (the transmission unit 7) before a downlink transmission unit obtained by offsetting the transmission unit 9 forward by one transmission unit, that is, a reception response for the downlink transmission unit set 1.

The network device unsuccessfully receives the reception response for the downlink transmission unit set 2 on the transmission unit 11. For an unsuccessfully received reception response that is for the downlink transmission unit set 2 and that is sent by the UE on the transmission unit 11, the network device cannot immediately perform indication on the transmission unit 12 again. That is, Wt indicated on the transmission unit 12 is still 1. The network device may indicate on a transmission unit 11+2 that the UE needs to send a reception response for two downlink transmission unit sets, that is, indicate on a transmission unit 13 that the UE feeds back a reception response for the downlink transmission unit sets 2 and 4 on the transmission unit 17. The UE obtains that Wt=2. Because Wt changes once, a reception response that is for 2-1 downlink transmission unit set and that is obtained by the UE is a reception response that is for one downlink transmission unit set and that needs to be fed back on an uplink transmission unit (the transmission unit 11) before a downlink transmission unit obtained by offsetting the transmission unit 13 forward by one transmission unit, that is, a reception response for the downlink transmission unit set 2.

The network device unsuccessfully receives the reception response for the downlink transmission unit sets 1 and 3 on the transmission unit 14. For an unsuccessfully received reception response that is for the downlink transmission unit sets 1 and 3 and that is sent by the UE on the transmission unit 14, the network device cannot immediately perform indication on the transmission unit 15 again. That is, Wt indicated on the transmission unit 15 is still 1. The network device may indicate on a transmission unit 14+2 that the UE needs to send a reception response for three downlink transmission unit sets, that is, indicate on a transmission unit 16 that the UE feeds back a reception response for the downlink transmission unit sets 1, 3, and 5 on the transmission unit 21. The UE obtains that Wt=3. Because Wt changes once, a reception response that is for 3-1 downlink transmission unit sets and that is obtained by the UE is a reception response that is for two downlink transmission unit sets and that needs to be fed back on an uplink transmission unit (the transmission unit 14) before a downlink transmission unit obtained by offsetting the transmission unit 16 forward by one transmission unit, that is, a reception response for the downlink transmission unit sets 1 and 3.

The network device unsuccessfully receives the reception response for the downlink transmission unit sets 2 and 4 on the transmission unit 17. For an unsuccessfully received reception response that is for the downlink transmission unit sets 2 and 4 and that is sent by the UE on the transmission unit 17, the network device cannot immediately perform indication on the transmission unit 18 again. That is, Wt indicated on the transmission unit 18 is still 3. The network device may indicate on a transmission unit 17+2 that the UE needs to send a reception response for three downlink transmission unit sets, that is, indicate on a transmission unit 19 that the UE feeds back a reception response for the downlink transmission unit sets 2, 4, and 6 on the transmission unit 22. The UE obtains that Wt=3. Because Wt does not change, a reception response that is for 3-1 downlink transmission unit sets and that is obtained by the UE is a reception response that is for two downlink transmission unit sets and that needs to be fed back on an uplink transmission unit (the transmission unit 17) before a downlink transmission unit obtained by offsetting the $1^{st}$ downlink transmission unit 19 in the downlink transmission unit set 6 forward by one transmission unit, that is, a reception response for the downlink transmission unit sets 2 and 4.

With reference to FIG. 10B, the information about the indication offset K in FIG. 10C indicates that K=3, that is, a delay of the network device is four transmission units. As shown in FIG. 10C:

The network device unsuccessfully receives the reception response for the downlink transmission unit set 1 on the transmission unit 7. For an unsuccessfully received reception response that is for the downlink transmission unit set 1 and that is sent by the UE on the transmission unit 7, the network device cannot immediately perform indication on the transmission units 8, 9, and 10 again. That is, Wt indicated on the transmission units 8, 9, and 10 is still 1. In addition, because a transmission unit 7+4 is an uplink transmission unit, the network device can indicate, at the earliest, on a transmission unit 12 that the UE needs to send a reception response for two downlink transmission unit sets, that is, indicate on a transmission unit 12 that the UE feeds back a reception response for the downlink transmission unit sets 1 and 4 on the transmission unit 15. The UE obtains that Wt=2. Because Wt does not change, a reception response that is for one downlink transmission unit set and that is obtained by the UE is a reception response that is for one downlink transmission unit set and that needs to be fed back on an uplink transmission unit (the transmission unit 7) before a downlink transmission unit obtained by offsetting the $1^{st}$ transmission unit 12 in the downlink transmission unit set 4 forward by three transmission units, that is, a reception response for the downlink transmission unit set 1.

The network device unsuccessfully receives the reception response for the downlink transmission unit set 2 on the transmission unit 11. For an unsuccessfully received reception response that is for the downlink transmission unit set 2 and that is sent by the UE on the transmission unit 11, the network device cannot immediately perform indication on the transmission unit 12 again. That is, Wt indicated on the transmission unit 12 is still 2. In addition, because a transmission unit 11+4 is an uplink transmission unit, the network device can indicate, at the earliest, on a transmission unit 16 that the UE needs to send a reception response for two downlink transmission unit sets. The downlink transmission unit set 5 includes three transmission units 16, 17 and 18. Therefore, based on the last downlink transmission unit (the transmission unit 18), the UE obtains a reception response that is for three downlink transmission unit sets and that needs to be sent on an uplink transmission unit (the transmission unit 21) corresponding to the downlink transmission unit set 5. The UE obtains that Wt=3 on the transmission unit 18. Because Wt changes once, a reception response that is for one downlink transmission unit set and that is obtained by the UE is a reception response that is for one downlink transmission unit set and that needs to be fed back on an uplink transmission unit (the transmission unit 14) before a downlink transmission unit obtained by offsetting the transmission unit 18 forward by three transmission units, that is, a reception response for the downlink transmission unit set 3. A reception response that is for another downlink transmission unit set and that is obtained by the UE is a reception response that is for one downlink transmission unit set and that needs to be fed back on an uplink transmission unit (the transmission unit 11) before a downlink transmission unit obtained by offsetting the $1^{st}$ downlink transmission unit (the transmission unit 16) in the downlink transmission unit set 5 forward by three transmission units, that is, a reception response for the downlink transmission unit set 2. In conclusion, the UE needs to send a reception response for a total of three downlink transmission unit sets, that is, the downlink transmission unit sets 2, 3, and 5 on the transmission unit 21.

The UE obtains that Wt=3 on the transmission unit 20. Because Wt does not change, a reception response that is for two downlink transmission unit sets and that is obtained by the UE is a reception response that is for two downlink transmission unit sets and that needs to be fed back on an uplink transmission unit (the transmission unit 15) before a downlink transmission unit obtained by offsetting the $1^{st}$ downlink transmission unit (the transmission unit 19) in the downlink transmission unit set 6 forward by three transmission units, that is, a reception response for the downlink transmission unit sets 1 and 4. In conclusion, the UE needs to send a reception response for a total of three downlink transmission unit sets, that is, the downlink transmission unit sets 1, 4, and 6 on the transmission unit 22.

Figure 11A:
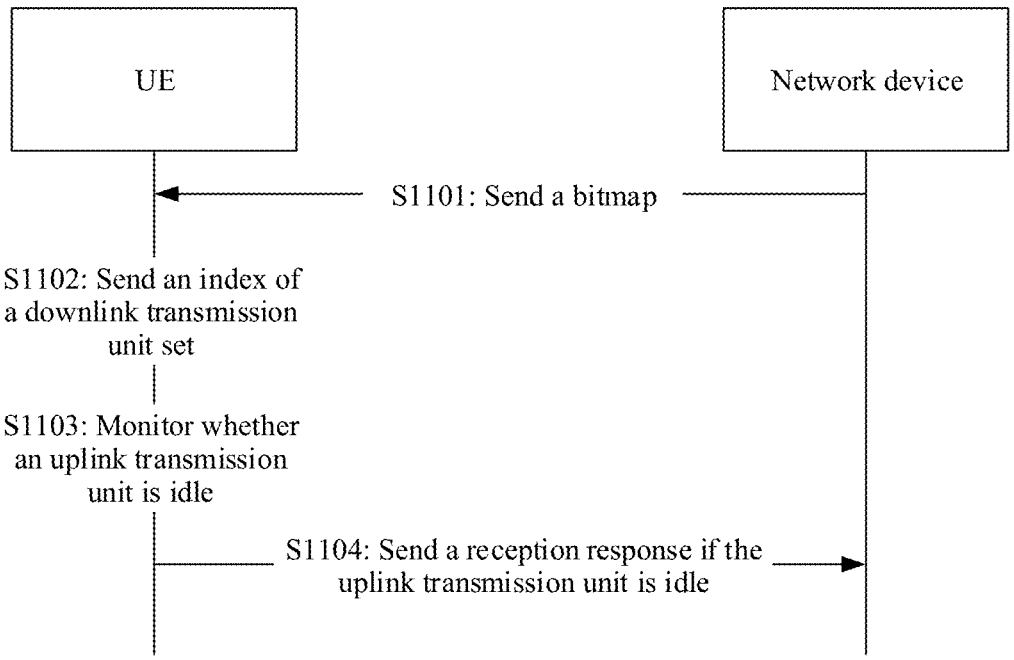
FIG. 11A is a schematic flowchart of another indication method according to this application.

FIG. 11A is a schematic flowchart of another indication method according to this application. As shown in FIG. 11A, the indication method includes the following steps.

S1101: UE receives, on one or more downlink transmission units included in a downlink transmission unit set, a bitmap sent by a network device. The bitmap may also be referred to as a bitmap.

The bitmap is used to indicate the UE to send a reception response for one or more downlink transmission unit sets on an uplink transmission unit corresponding to the downlink transmission unit set. The network device supports a maximum of M downlink transmission unit sets, where if M is a positive integer greater than or equal to 1, a quantity of bits in the bitmap is M. One bit in the bitmap is used to indicate whether the UE sends a reception response for one downlink transmission unit set.

A quantity of information bits (which may also be referred to as a quantity of bits in an HARQ-ACK feedback codebook in some implementation solutions) included in a reception response corresponding to each downlink transmission unit set may be determined based on a related indication in DCI signaling, for example, a DAI field defined in an LTE/NR system. Specifically, the DAI field includes a counter DAI and a total DAI index. Optionally, the indicators of the DAI field should be updated with reference to a total quantity of downlink transmission unit sets that need to be responded to. For example, the total DAI is used to indicate the total quantity of downlink transmission units that need to be responded to by the UE, where the quantity is equal to a total quantity of downlink transmission units included in the one or more downlink transmission unit sets that need to be responded to.

Figure 12:
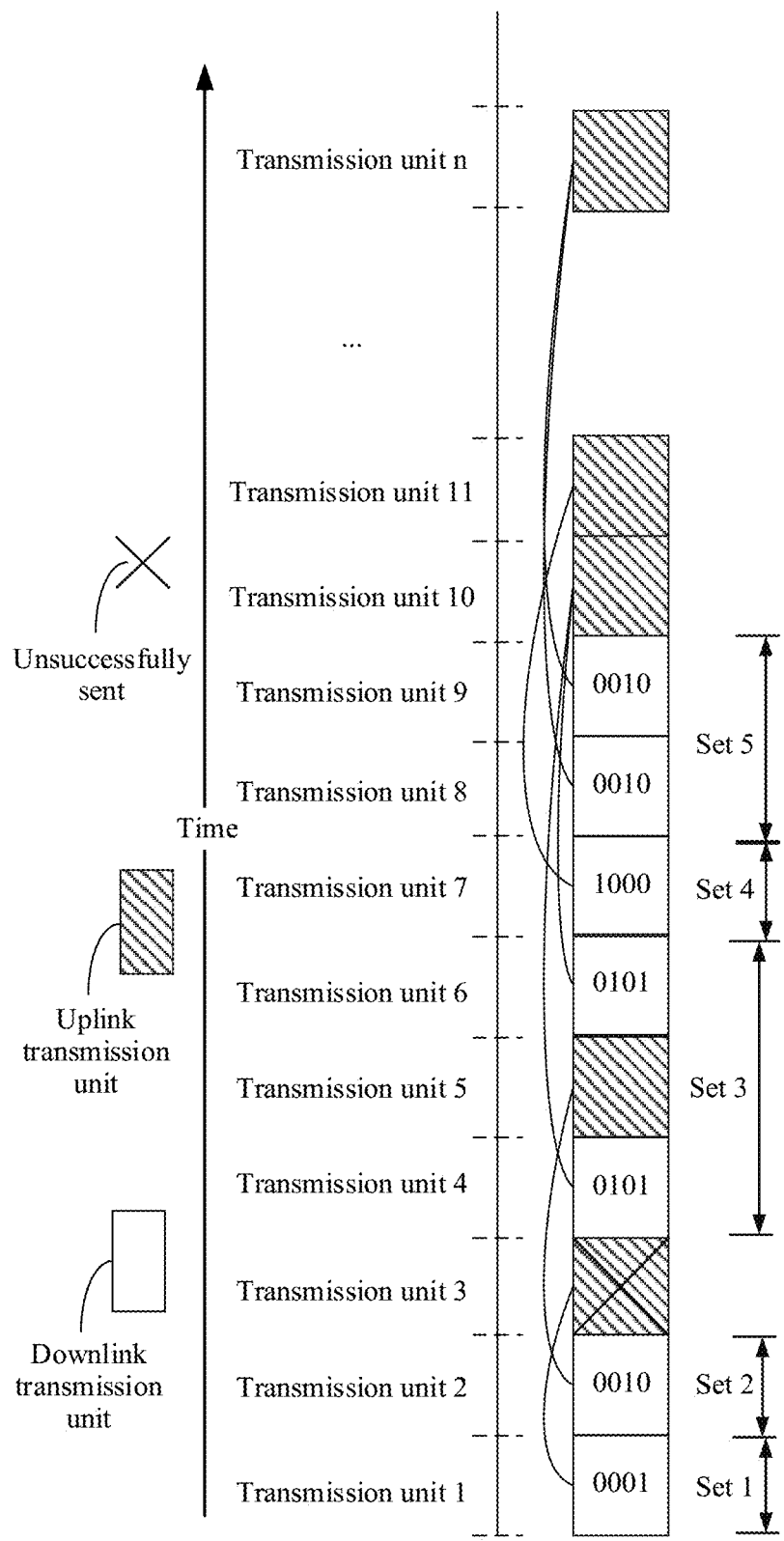
FIG. 12 is a schematic diagram of another indication method according to this application.

With reference to FIG. 12, if the network device supports a maximum of four downlink transmission unit sets, that is, M=4, the bitmap is a bitmap of four bits. The UE receives a bitmap 0001 on a downlink transmission unit 1 included in a downlink transmission unit set. The last bit in the bitmap is used to indicate whether the UE sends a reception response for the downlink transmission unit set 1. When the last bit in the bitmap is 1, the last bit is used to indicate the UE to send the reception response for the downlink transmission unit set 1. When the last bit in the bitmap is 0, the last bit is used to indicate that the UE does not send the reception response for the downlink transmission unit set 1.

According to the indication method provided in this application, downlink transmission unit sets for which a reception response is sent and an uplink transmission unit on which the reception response is sent are indicated to the UE. This avoids a problem of communication disorder that occurs when a reception response is not sent or is not successfully received by the network device, reducing an error rate of an entire communications system, and improving communication quality and efficiency.

Optionally, in S1102, the UE obtains an index of the downlink transmission unit set. One index corresponds to one downlink transmission unit set.

The UE may receive the index of the downlink transmission unit set on one or more downlink transmission units. The one or more downlink transmission units may be the same as or different from the one or more downlink transmission units on which the bitmap is sent. The UE may alternatively obtain the index in advance rather than receive the index sent by the network device.

With reference to FIG. 12, if an index of the downlink transmission unit set 1 is 1, the last bit in the bitmap is used to indicate whether the UE sends a reception response for the downlink transmission unit set 1 corresponding to the index 1.

According to the indication method provided in this application, the UE obtains the index, further improving accuracy of the indication method, and improving communication quality and efficiency.

Optionally, in S1103, the UE monitors whether the uplink transmission unit is idle. If the uplink transmission unit is idle, S1104 is performed. If the uplink transmission unit is not idle, S1104 is not performed.

Generally, before sending a signal, the UE monitors whether an uplink transmission unit (for example, an unlicensed spectrum or an unlicensed channel) is idle. A busy/idle state of the unlicensed spectrum/channel may be determined based on receive power on the unlicensed spectrum/channel. If the receive power is less than a threshold, it is considered that the unlicensed spectrum/channel is in an idle state, and a signal may be sent on the unlicensed spectrum/channel; otherwise, no signal is sent.

Optionally, in S1104, the UE sends, on the uplink transmission unit corresponding to the downlink transmission unit set, the reception response for the one or more downlink transmission unit sets indicated in the bitmap.

It should be understood that even if the UE performs S1104, the network device may fail to receive the reception response for the one or more downlink transmission unit sets.

With reference to FIG. 12, the UE sends, on an uplink transmission unit 1 (a transmission unit 3) corresponding to the downlink transmission unit set 1, the reception response for the downlink transmission unit set indicated in the bitmap.

On the unlicensed spectrum/channel/transmission unit, a probability that the UE unsuccessfully sends a reception response increases. When the UE unsuccessfully sends the reception response, the network device needs to indicate, to the UE in subsequent transmission, downlink transmission unit sets for which a reception response needs to be sent and an uplink transmission unit on which the reception response needs to be sent, thereby avoiding communication disorder and improving communication quality and efficiency.

Figure 11B:
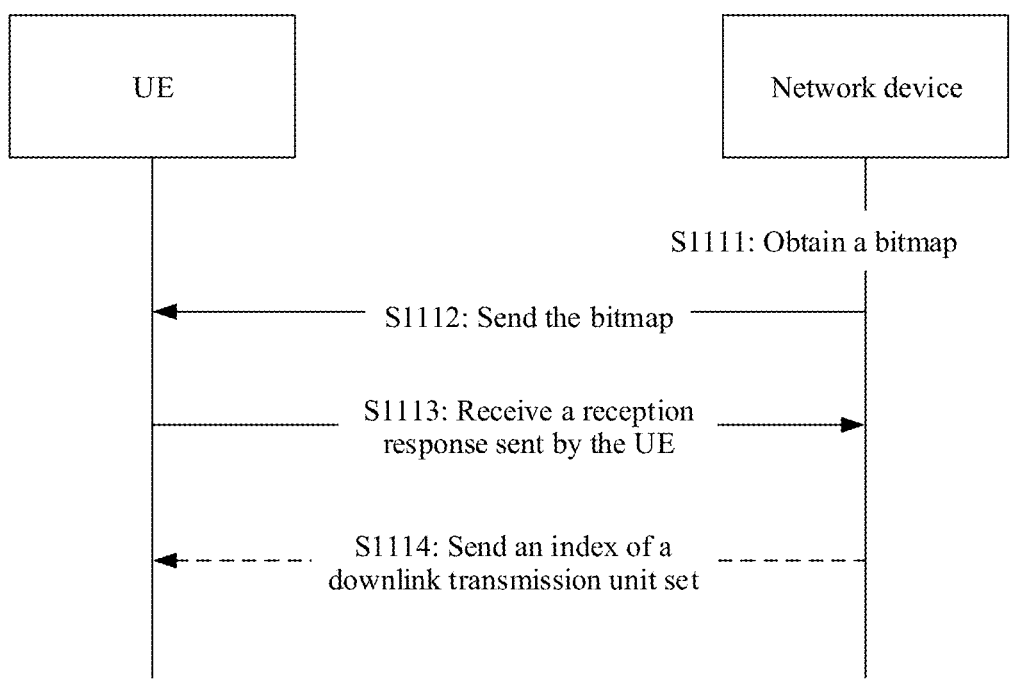
FIG. 11B is a schematic flowchart of another indication method according to this application.

FIG. 11B is a schematic flowchart of another indication method according to this application. With reference to the description of FIG. 11A, as shown in FIG. 11*i*, the indication method includes the following steps.

S1111: A network device determines a bitmap, where the bitmap is used to indicate that the network device needs to receive a reception response for one or more downlink transmission unit sets.

The reception response for the one or more downlink transmission unit sets that needs to be received includes: a reception response for a downlink transmission unit set to which a current downlink transmission unit belongs, and a reception response for one or more downlink transmission unit sets that is unsuccessfully received by the network device historically. The reception response for the one or more downlink transmission unit sets that is unsuccessfully received by the network device historically does not include: a reception response, unsuccessfully received by the network device, for one or more downlink transmission unit sets that have been indicated by the network device in a bitmap on one or more downlink transmission units before the downlink transmission unit set. With reference to FIG. 12, when the network device sends the bitmap on a transmission unit 4, the reception response for the downlink transmission unit set to which the current downlink transmission unit belongs is a reception response for a transmission unit set 3. The reception response for the one or more downlink transmission unit sets that is unsuccessfully received by the network device historically includes a reception response for a downlink transmission unit set 1. Therefore, a bitmap 0101 sent on the transmission unit 4 indicates the downlink transmission unit sets 1 and 3. When the network device sends the bitmap on a downlink transmission unit 7, the reception response for the downlink transmission unit set to which the current downlink transmission unit belongs is a reception response for a downlink transmission unit set 4. The reception response for the one or more downlink transmission unit sets that is unsuccessfully received by the network device historically includes a reception response for downlink transmission unit sets 1 and 3. However, because the network device has indicated the downlink transmission unit sets 1 and 3 by using a bitmap on the downlink transmission units 4 and 6, a bitmap 1000 sent on the downlink transmission unit 7 is not used to indicate the downlink transmission unit sets 1 and 3 any more, but is used to indicate only the downlink transmission unit set 4.

S1112: The network device sends the bitmap to user equipment UE on one or more first downlink transmission units included in a downlink transmission unit set.

With reference to FIG. 12, the network device sends bitmaps on the transmission units 1, 2, 4, and 6 to 9.

Optionally, in S1113, the network device receives the reception response for the one or more downlink transmission unit sets on an uplink transmission unit corresponding to the downlink transmission unit set.

With reference to FIG. 12, the network device receives the reception response for the one or more downlink transmission unit sets on transmission units 3, 5, 10, 11, and n.

According to the indication method provided in this application, the network device indicates downlink transmission unit sets for which a reception response needs to be received by the network device. This avoids a problem of communication disorder that occurs when a reception response is not sent or is not successfully received by the network device, reducing an error rate of an entire communications system, and improving communication quality and efficiency.

Optionally, in S1114, the network device sends an index of the downlink transmission unit set to the UE on the one or more downlink transmission units included in the downlink transmission unit set. One index corresponds to one downlink transmission unit set.

According to the indication method provided in this application, the network device sends the index, further improving accuracy of the indication method, and improving communication quality and efficiency.

Optionally, in S1115, if the network device successfully receives the reception response for the one or more downlink transmission unit sets, the network device unbinds the one or more downlink transmission unit sets from an index or indexes of the one or more downlink transmission unit sets.

With reference to FIG. 12, if the network device successfully receives a reception response for a downlink transmission unit set 2 on the transmission unit 5, the downlink transmission unit set 2 is unbound from an index 2. A binding relationship is established between the index 2 and a downlink transmission unit set 5.

According to the indication method provided in this application, a correspondence between a downlink transmission unit set and an index is unbound and rebound, to reduce a quantity of bits in a bitmap, thereby alleviating communication load and improving communication efficiency.

With reference to FIG. 11A and FIG. 11B, the following describes the indication method in this application by using a transmission scenario in a TDD mode as an example. Before a specific description is provided, FIG. 12 is described below. Lengths of time resources occupied by a downlink transmission unit and a transmission unit may be the same or may be different. Due to limited space, a downlink transmission unit set is referred to as a "set" for short. According to the drawings, a downlink transmission unit set seems to include a transmission unit. However, it should be understood that the downlink transmission unit set in this application includes only a downlink transmission unit, and does not include an uplink transmission unit.

FIG. 12 is a schematic diagram of an indication method according to this application. A reception response that the UE needs to send on a transmission unit corresponding to the current downlink transmission unit set is indicated by using a bitmap. As shown in FIG. 12, 0001, 0010, 0101, 1000, and the like are bitmaps in this application. It is assumed that the network device supports a maximum of four downlink transmission unit sets, that is, the network device supports processes of a maximum of four downlink transmission unit sets at a same time. Each downlink transmission unit set may further have a corresponding index.

A transmission unit 1 forms a downlink transmission unit set 1, and an index of the downlink transmission unit set 1 is 1. A transmission unit 2 forms a downlink transmission unit set 2, and an index of the downlink transmission unit set 2 is 2. A transmission unit 4 and a transmission unit 6 form a downlink transmission unit set 3, and an index of the downlink transmission unit set 3 is 3. A transmission unit 7 forms a downlink transmission unit set 4, and an index of the downlink transmission unit set 4 is 4. Because the network device successfully receives the reception response for the downlink transmission unit set 2 on the transmission unit 5, an index of a downlink transmission unit set formed by the transmission units 8 and 9 is 2. The downlink transmission unit set 1 (and/or the index 1) corresponds to the transmission unit 3, the downlink transmission unit set 2 (and/or the index 2) corresponds to the transmission unit 5, the downlink transmission unit set 3 (and/or the index 3) corresponds to the transmission unit 10, the downlink transmission unit set 4 (and/or the index 4) corresponds to the transmission unit 11, and the new downlink transmission unit set 2 (or referred to as the downlink transmission unit set 5) (and/or the index 2) corresponds to a transmission unit n, where n is a positive integer greater than or equal to 1.

The network device sends a bitmap 0001 on the transmission unit 1, and uses 0001 to indicate that the UE sends a reception response for the downlink transmission unit set 1 on the transmission unit 3. The network device sends a bitmap 0010 on the transmission unit 2, and uses 0010 to indicate that the UE sends a reception response for the downlink transmission unit set 1 on the transmission unit 5. If the network device unsuccessfully receives the reception response for the downlink transmission unit set 1 on the transmission unit 3, the index 1 of the transmission unit 1 cannot be released. In other words, the index 1 cannot be allocated to another downlink transmission unit set. The network device sends a bitmap 0101 on the transmission units 4 and 6, and uses 0101 to indicate that the UE sends a reception response for the downlink transmission unit sets 1 and 3 on the transmission unit 10. If the network device successfully receives the reception response for the downlink transmission unit set 2 on the transmission unit 5, the index 2 of the transmission unit 2 is released by the network device. In other words, the index 2 can be allocated to another downlink transmission unit set. The network device sends a bitmap 1000 on the transmission unit 7, and uses 1000 to indicate that the UE sends a reception response for the downlink transmission unit set 4 on the transmission unit 11. The network device sends a bitmap 0010 on the transmission units 8 and 9, and uses 0010 to indicate that the UE sends a reception response for the new downlink transmission unit set 2 (or referred to as the downlink transmission unit set 5) on the transmission unit n. An index of the new downlink transmission unit set 2 (or referred to as the downlink transmission unit set 5) is the previously released index 2. The UE can determine, by using an existing NDI field, whether transmission corresponding to the transmission unit is new transmission or retransmission. Therefore, the UE can accurately send a reception response for the new downlink transmission unit set 2. If the network device successfully receives reception responses for the downlink transmission unit sets 3, 4, and 2 respectively on the transmission units 10, 11, and n, the indexes 3, 4, and 2 that are of the transmission units 3, 4, and 2 and that previously correspond to the downlink transmission unit sets 3, 4, and 5 can be released by the network device. In other words, the indexes 3, 4, and 2 can be allocated to another downlink transmission unit set.

With reference to the foregoing one or more indication methods, the following describes, by using an example, a method for determining, by the UE, the reception response for the downlink transmission unit set. The UE determines the reception response for the downlink transmission unit set based on the information indicating the quantity Wt and/or the bitmap. For example, when $\tilde{o}_0^{ACK}, \tilde{o}_1^{ACK}, \ldots, \tilde{o}_{o^{ACK}-1}^{ACK}$, the determining can be implemented based on pseudocode. It should be understood that this application focuses on an indication of a window/downlink transmission unit set by the network device, that is, a part of an outermost loop in the pseudocode. An existing procedure in 36.213 or 38.213 may be used or a procedure in 36.213 or 38.213 may be adaptively modified/adjusted to implement an inner-layer loop.

For example, the following pseudocode may be used for implementation:

Initialization:
  let w=0—Window index: corresponds to a feedback window or an index of a downlink transmission unit set, where optionally, the index may be explicitly or implicitly indicated
  let c=0—Serving cell index: indicates an index of a cell, where optionally, the index is indicated in RRC signaling
  let m=0—Subframe index/PDCCH with DCI format 1_0 or DCI format 1_1 monitoring occasion index: indicates an index of a subframe/slot, or indicates an index of a received PDCCH monitoring occasion
  let j=0
  let $V_{temp}$=0
  let $V_{temp2}$=0
  let $V_s$=Ø
  let $N_{cells}^{DL}$ be a total quantity of cells configured for the UE
  let M be a total quantity of PDCCH monitoring occasions
  let Wt be the indicated feedback window or a quantity of downlink transmission unit sets Pseudocode:

```
while w<Wt
  while m<M
    while c < N_cells^DL
      if in a cell c, there is downlink transmission scheduled on a PDCCH corresponding
to the PDCCH monitoring occasion m, or in a cell c, there is a PDCCH used to indicate semi-
persistent scheduling SPS release, where
        if V_{C-DAI,c,m,w}^DL ≤ V_temp
          j = j + 1
        end if
        V_temp = V_{C-DAI,c,m,w}^DL
        if V_{T-DAI,m,w}^DL = Ø
          V_temp2 = V_{C-DAI,c,m,w}^DL
        else
          V_temp2 = V_{T-DAI,m,w}^DL
        end if
        if higher layer signaling HARQ-ACK-spatial-bundling-PUCCH = FALSE and m
corresponds to two transport blocks
          õ_{8j+2(V_{C-DAI,c,m,w}^{DL}-1)}^{ACK} = HARQ-ACK information of the 1^st transport block in the cell
          õ_{8j+2(V_{C-DAI,c,m,w}^{DL}-1)+1}^{ACK} = HARQ-ACK information of the 2^nd transport block in the cell
          V_s = V_s ∪ {8j + 2(V_{C-DAI,c,m,w}^DL − 1), 8j + 2(V_{C-DAI,c,m,w}^DL − 1) + 1
        elseif higher layer signaling HARQ-ACK-spatial-bundling-PUCCH = TRUE and
m corresponds to two transport blocks
          õ_{4j+V_{C-DAI,c,m,w}^{DL}-1}^{ACK} = Perform a binary AND operation on HARQ information of two
transport blocks in the cell
            V_s = V_s ∪ {4j + V_{C-DAI,c,m,w}^DL − 1}
        else
          õ_{4j+V_{C-DAI,c,m,w}^{DL}-1}^{ACK} = HARQ-ACK information in the cell
            V_s = V_s ∪ {4j + V_{C-DAI,c,m,w}^DL − 1}
        end if
      end if
      c=c+1
    end while
    m=m+1
  end while
  w=w+1
end while
```

Figure 17:
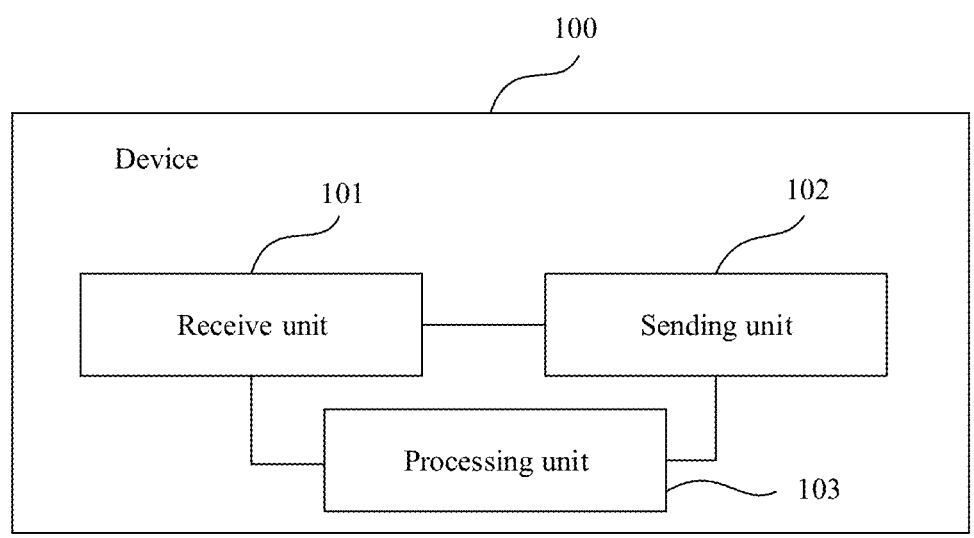
FIG. 17 is a schematic structural diagram of a device 100 according to this application.

The network device or the UE in this application is divided into functional transmission units in the following with reference to one or more of the foregoing indication methods. For example, the functional transmission units may be obtained through division based on corresponding functions, or two or more functions may be integrated into one transmission unit. All or some of the foregoing integrated transmission units may be implemented by using software, hardware, firmware, or any combination thereof. It should be noted that, in this application, division into transmission units is an example, and is merely a logical function division. In an actual implementation, another division manner may be used. FIG. 17 is a schematic structural diagram of a device 100 according to this application. The device 100 may be applied to implement the network device or the UE in this application. Referring to FIG. 17, the device 100 includes a receiving unit 101, a sending unit 102, and a processing unit 103.

When the device 100 is configured to implement a function of the network device, the processing unit 103 is configured to determine information indicating a quantity Wt, and the sending unit 102 is configured to send, to user equipment UE, the information indicating the quantity Wt on one or more downlink transmission units included in a downlink transmission unit set. Optionally, the sending unit 102 is further configured to: send an index of the downlink transmission unit set to the UE on the one or more downlink transmission units included in the downlink transmission unit set. Optionally, the receiving unit 101 is configured to receive, on an uplink transmission unit corresponding to the downlink transmission unit set, the reception response for the Wt downlink transmission unit sets that is sent by the UE.

When the device 100 is configured to implement another function of the network device, the processing unit 103 is configured to determine a bitmap, and the sending unit 102 is configured to send the bitmap to user equipment UE on one or more first downlink transmission units included in a downlink transmission unit set. Optionally, the sending unit 102 is further configured to: send an index of the downlink transmission unit set to the UE on the one or more downlink transmission units included in the downlink transmission unit set. Optionally, the receiving unit 101 is configured to receive the reception response for the one or more downlink transmission unit sets on an uplink transmission unit corresponding to the downlink transmission unit set.

When the device 100 is configured to implement a function of the UE, the receiving unit 101 is configured to receive, on one or more downlink transmission units included in a first downlink transmission unit set, information that is sent by a network device and that indicates a quantity Wt. Optionally, the processing unit 103 is further configured to monitor whether the uplink transmission unit is idle. Optionally, the device 100 may further include a monitoring unit 104 (not shown), configured to monitor whether the uplink transmission unit is idle. Optionally, the receiving unit 101 further configured to receive an index of the downlink transmission unit set. Optionally, the processing unit 103 is configured to obtain the index of the downlink transmission unit set. Optionally, the sending unit 102 is configured to send, on the uplink transmission unit corresponding to the first downlink transmission unit set, the reception response for the Wt downlink transmission unit sets based on the information that indicates the quantity Wt and that is received on the one or more downlink transmission units.

When the device 100 is configured to implement another function of the UE, the receiving unit 101 is configured to receive, on one or more downlink transmission units included in a first downlink transmission unit set, a bitmap sent by a network device. Optionally, the receiving unit 101 further configured to receive an index of the downlink transmission unit set. Optionally, the processing unit 103 is configured to obtain the index of the downlink transmission unit set. Optionally, the processing unit 103 is further configured to monitor whether the uplink transmission unit is idle. Optionally, the device 100 may further include an obtaining unit (not shown), configured to obtain the index of the downlink transmission unit set. Optionally, the device 100 may further include a monitoring unit 104 (not shown), configured to monitor whether the uplink transmission unit is idle. Optionally, the sending unit 102 is configured to send, on the uplink transmission unit corresponding to the downlink transmission unit set, the reception response for the one or more downlink transmission unit sets indicated in the bitmap.

It should be understood that, with reference to any one or more of the foregoing indication methods, the network device and the UE may further include more functional units, to implement more functions, thereby avoiding communication confusion and improving communication quality and efficiency.

When the network device or the UE is implemented by using hardware, for a concept, an explanation, a detailed description, an indication method, a procedure, and a step related to this application, refer to a description about the content in the foregoing description. In this application, the receiving unit may be implemented by a communications interface, a receiver, a receiver circuit, or the like. The sending unit may be implemented by a communications interface, a transmitter, a transmitter circuit, or the like. It should be understood that functions of the receiving unit and the sending unit may alternatively be integrated together, and are implemented by a communications interface, a transceiver, or a transceiver circuit. The communications interface is a general term, and two or more interfaces may be included.

It may be understood that the foregoing description is only a simplified example of a hardware form. In actual application, hardware for implementing the network device or the UE is not limited to the foregoing structure. For example, the hardware may further include a processor, a memory, an antenna array, a duplexer, and a baseband processing part. The processor may be a central processing unit (CPU), a general-purpose processor, a digital signal processor (DSP), an application-specific integrated circuit (ASIC), a field programmable gate array (FPGA), another programmable logical device or hardware component, or a combination thereof. Alternatively, the processor may be a combination of processors implementing a computing function, for example, a combination including one or more microprocessors, or a combination of a DSP and a microprocessor. The memory may be disposed in the processor, or may exist independently. The duplexer is configured to implement an antenna array, and is configured to send and receive signals. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. Sometimes, the receiver and the transmitter may also be collectively referred to as a transceiver. The baseband processing part is configured to implement processing of a sent or received signal, such as layer mapping, precoding, modulation/demodulation, and encoding/decoding, and separately process a physical control channel, a physical data channel, a physical broadcast channel, a reference signal, and the like. In an implementation, functions of the receiver and the transmitter may be considered to be implemented by using a transceiver circuit or a dedicated transceiver chip. It may be considered that the processor is implemented by using a dedicated processing chip, processing circuit, or processor, or a general-purpose chip. In another implementation, program code for implementing functions of the processor, the receiver, and the transmitter is stored in the memory, and the general-purpose processor implements the functions of the processor, the receiver, and transmitter by executing the code in the memory.

Figure 13:
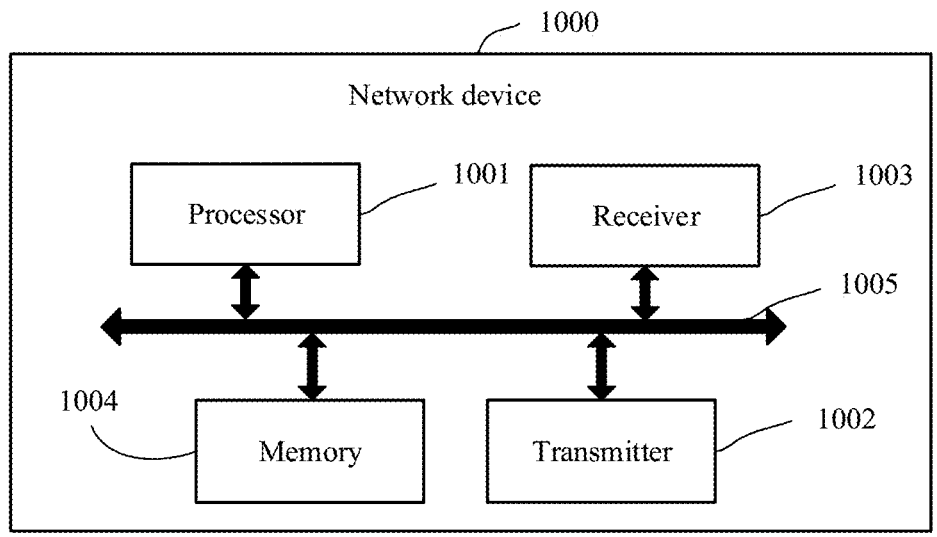
FIG. 13 is a schematic structural diagram of a network device according to this application.
Figure 14:
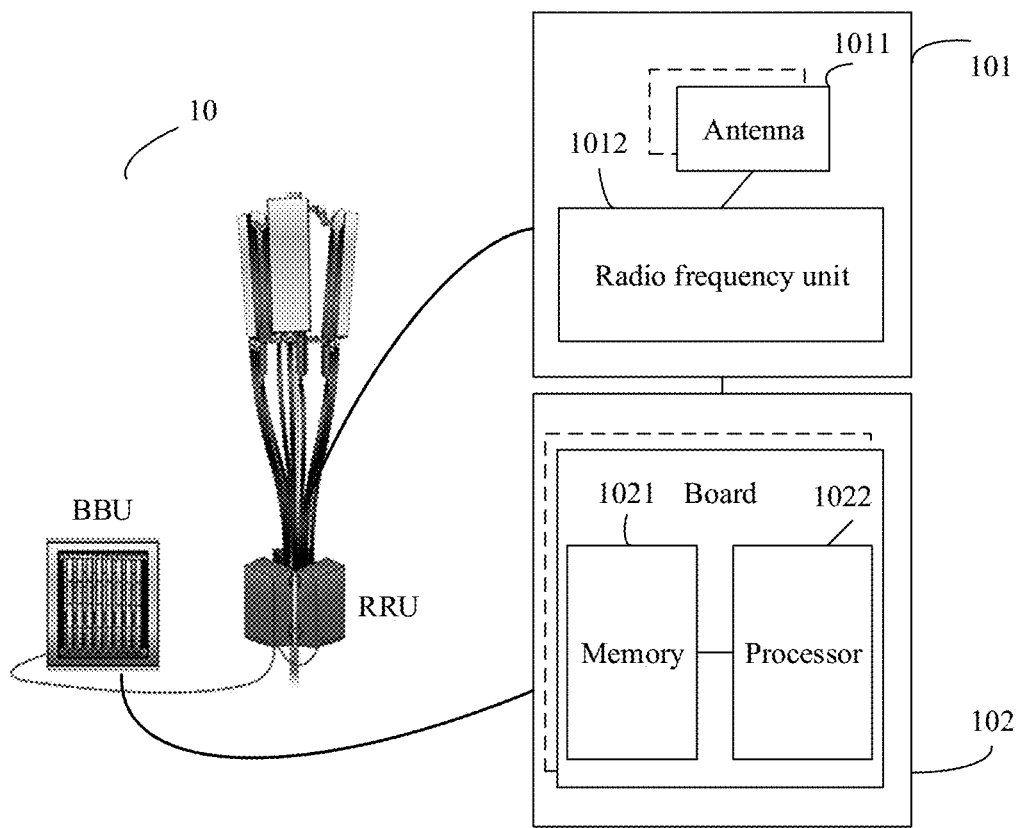
FIG. 14 is a schematic structural diagram of a network device according to this application.

For example, for an implementation of the network device, refer to FIG. 13. As shown in FIG. 13, a network device 1000 is provided, and includes a processor 1001, a memory 1004, a receiver 1003, and a transmitter 1002. The receiver 1003 and the transmitter 1002 are configured to communicate with another network element, the memory 1004 is configured to store a program that can be executed by the processor 1001, and the program includes an instruction for implementing any indication method, step, or procedure in this application. For a specific indication method, procedure, step, beneficial effect, and the like, refer to a description about the content in the foregoing embodiments. Details are not described herein again. For another example, for an implementation of the network device, refer to FIG. 14.

Figure 15:
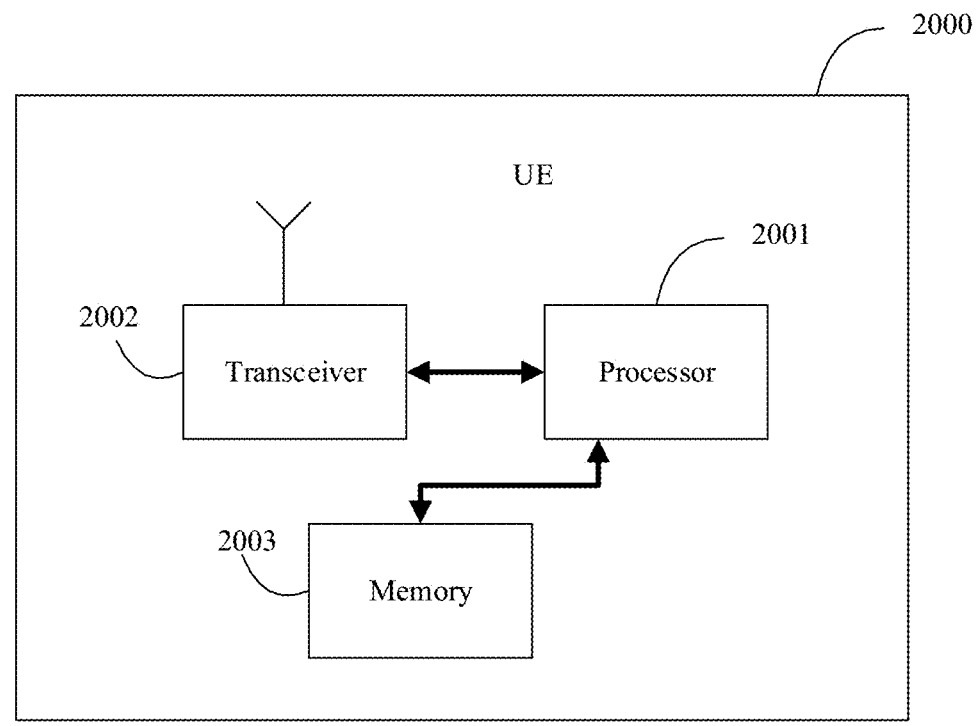
FIG. 15 is a schematic structural diagram of UE according to this application.
Figure 16:
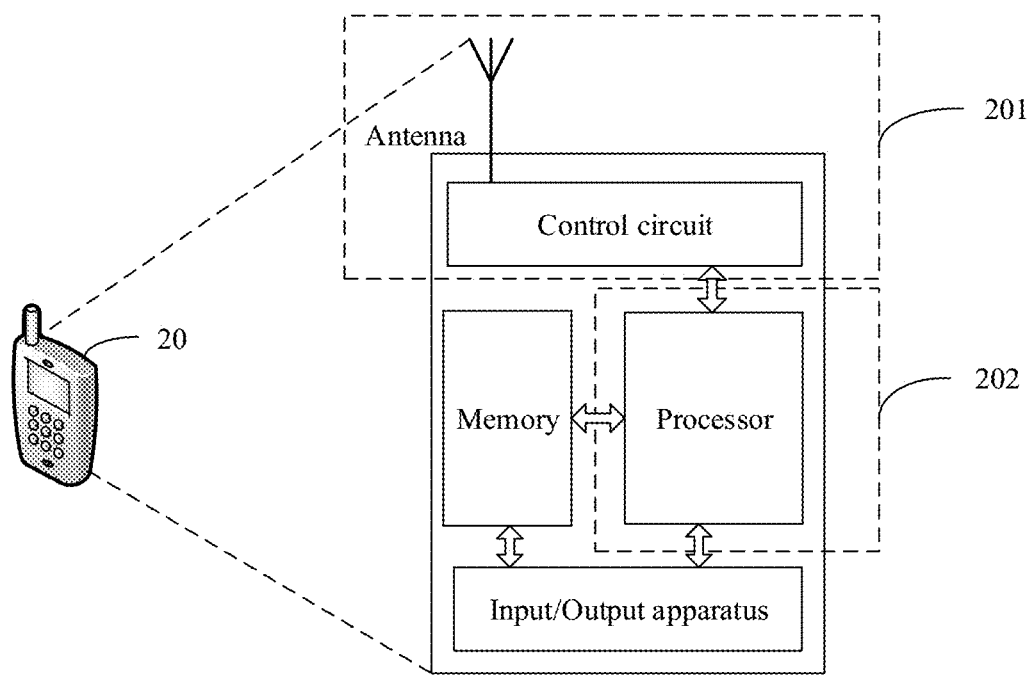
FIG. 16 is a schematic structural diagram of UE according to this application.

For example, for an implementation of the UE, refer to FIG. 15. As shown in FIG. 15, UE 2000 is provided, and includes a processor 2001, a memory 2003, and a transceiver 2002. The transceiver 2002 is configured to communicate with another network element (where the transceiver 2002 may communicate with another network element by using an antenna), the memory 2003 is configured to store a program that can be executed by the processor 2001, and the program includes an instruction for implementing any indication method, step, or procedure in this application described above. For a specific indication method, procedure, step, beneficial effect, and the like, refer to a description about the content in the foregoing embodiments. Details are not described herein again. For another example, for an implementation of the UE, refer to FIG. 16.

When the network device or the UE is implemented by using software, for a concept, an explanation, a detailed description, and a step related to this application, refer to a description about the content in the foregoing indication methods. The method in this application may be implemented completely or partially in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD), or the like. The storage medium may be integrated in a device, a module, or a processor, or may be disposed separately.

According to the indication method provided in this application, this application further provides a communications system, and the communications system includes the network device and the UE that are described above.

It is clearly that a person skilled in the art can make various modifications and variations to this application without departing from the scope of this application. If these modifications and variations of this application fall within the scope of the claims of this application and their equivalent technologies, this application is also intended to cover these modifications and variations.

What is claimed is:

1. An indication method comprising:
   receiving, by a user equipment (UE) on one or more first downlink transmission units, first information that is sent by a network device and that indicates a quantity (Wt), wherein the Wt is 0 or a positive integer, and the Wt indicates a quantity of second downlink transmission unit sets for which a reception response needs to be fed back by the UE, and wherein a second downlink transmission unit set comprises one or more second downlink transmission units;
   sending, by the UE, the reception response on an uplink transmission unit corresponding to the second downlink transmission unit sets, wherein the reception response corresponds to Wt second downlink transmission unit sets; and
   receiving, by the UE on the one or more first downlink transmission units, second information that is sent by the network device and that indicates a quantity Wu, the quantity Wu is indicated by using a downlink assignment index (DAI) in downlink control information (DCI) carried on the one or more first downlink transmission units, a total DAI in the DAI is used to indicate the UE to send a reception response for Wu second downlink transmission units on the uplink transmission unit corresponding to the second downlink transmission unit sets.

2. The method according to claim 1, wherein one second downlink transmission unit set corresponds to one uplink transmission unit.

3. The method according to claim 1, wherein in response to the Wt being equal to 2, the reception response corresponding to Wt second downlink transmission unit sets comprises: a reception response for a second downlink transmission unit set corresponding to an uplink transmission unit and a reception response for a second downlink transmission unit set corresponding to another uplink transmission unit.

4. The method according to claim 1, wherein the one or more first downlink transmission units are a physical downlink control channel (PDCCH).

5. The method according to claim 1, wherein the second downlink transmission unit sets are physical downlink shared channel (PDSCH) sets.

6. The method according to claim 1, wherein the first information is carried in downlink control information (DCI) carried on the one or more first downlink transmission units.

7. The method according to claim 1, further comprising:
obtaining, by the UE, an index, wherein the index corresponds to one second downlink transmission unit set.

8. The method according to claim 1, before sending, by the UE, the reception response on an uplink transmission unit corresponding to the second downlink transmission unit sets, the method comprises:
monitoring, by the UE, whether an uplink transmission unit corresponding to the second downlink transmission unit sets is idle; and
if the uplink transmission unit is idle, sending, by the UE, a reception response on the uplink transmission unit corresponding to the second downlink transmission unit sets.

9. An indication apparatus comprising:
a memory having a storage medium, wherein the memory stores a program; and
a processor that is connected to the memory, wherein the program, when executed by the processor, causes the indication apparatus to:
receive on one or more first downlink transmission units, first information that is sent by a network device and that indicates a quantity (Wt), wherein the Wt is 0 or a positive integer, and the Wt indicates a quantity of second downlink transmission unit sets for which a reception response needs to be fed back by a user equipment (UE), and wherein a second downlink transmission unit set comprises one or more second downlink transmission units;
send the reception response on an uplink transmission unit corresponding to the second downlink transmission unit sets, wherein the reception response corresponds to Wt second downlink transmission unit sets; and
receive, on the one or more first downlink transmission units, second information that is sent by the network device and that indicates a quantity Wu, the quantity Wu is indicated by using a downlink assignment index (DAI) in downlink control information (DCI) carried on the one or more first downlink transmission units, a total DAI in the DAI is used to indicate the indication apparatus to send a reception response for Wu second downlink transmission units on the uplink transmission unit corresponding to the second downlink transmission unit sets.

10. The apparatus according to claim 9, wherein one second downlink transmission unit set corresponds to one uplink transmission unit.

11. The apparatus according to claim 9, wherein in response to the Wt being equal to 2, the reception response corresponding to Wt second downlink transmission unit sets comprises: a reception response for a second downlink transmission unit set corresponding to an uplink transmission unit and a reception response for a second downlink transmission unit set corresponding to another uplink transmission unit.

12. The apparatus according to claim 9, wherein the one or more first-downlink transmission units are a physical downlink control channel (PDCCH).

13. The apparatus according to claim 9, wherein the second downlink transmission unit sets are physical downlink shared channel (PDSCH) sets.

14. The apparatus according to claim 9, wherein the first information is carried in downlink control information (DCI) carried on the one or more first downlink transmission units.

15. The apparatus according to claim 9, wherein the processor is configured to execute the program to cause the indication apparatus to:
obtain an index, wherein the index corresponds to one second downlink transmission unit set.

16. The apparatus according to claim 9, wherein, before sending the reception response on an uplink transmission unit corresponding to the second downlink transmission unit sets, the processor is configured to execute the program to cause the indication apparatus to:
monitor whether an uplink transmission unit corresponding to the second downlink transmission unit sets is idle; and
if the uplink transmission unit is idle, send the reception response on the uplink transmission unit corresponding to the second downlink transmission unit sets.

17. An indication apparatus comprising:
a memory having a storage medium, wherein the memory stores a program; and
a processor that is connected to the memory, wherein the program when executed by the processor causes the indication apparatus to:
send on one or more first downlink transmission units, first information indicating a quantity (Wt) to a user equipment (UE), wherein the Wt is 0 or a positive integer, and the Wt indicates a quantity of second downlink transmission unit sets for which a reception response needs to be fed back by the UE;
receive the reception response from the UE on an uplink transmission unit corresponding to the second downlink transmission unit sets, wherein the reception response corresponds to Wt second downlink transmission unit sets; and
send on the one or more first downlink transmission units, second information that indicates a quantity Wu, the quantity Wu is indicated by using a downlink assignment index (DAI in downlink control information (DCI) carried on the one or more first downlink transmission units, a total DAI in the DAI is used to indicate the UE to send a reception response for Wu second downlink transmission units on the uplink transmission unit corresponding to the second downlink transmission unit sets.

18. The apparatus according to claim 17, wherein one second downlink transmission unit set corresponds to one uplink transmission unit.

19. The apparatus according to claim 17, wherein in response to the Wt being equal to 2, the reception response corresponding to Wt second downlink transmission unit sets comprises: a reception response for a second downlink transmission unit set corresponding to an uplink transmission unit and a reception response for a second downlink transmission unit set corresponding to another uplink transmission unit.

20. The apparatus according to claim 17, wherein the one or more first downlink transmission units are a physical downlink control channel (PDCCH).

21. The apparatus according to claim 17, wherein the second downlink transmission unit sets are physical downlink shared channel (PDSCH) sets.

22. The apparatus according to claim 17, wherein the first information is carried in a downlink control information (DCI) carried on the one or more first downlink transmission units.

23. The apparatus according to claim 17, wherein the processor is configured to execute the program to cause the indication apparatus to:

send an index, wherein the index corresponds to one second downlink transmission unit set.

* * * * *